(12) United States Patent
Fox et al.

(10) Patent No.: US 11,288,609 B2
(45) Date of Patent: Mar. 29, 2022

(54) SYSTEMS AND METHODS FOR EXECUTING A PLAN ASSOCIATED WITH MULTIPLE EQUIPMENT BY USING RULE-BASED INFERENCE

(71) Applicant: Schlumberger Technology Corporation, Sugar Land, TX (US)

(72) Inventors: Maria Fox, Fen Drayton (GB); Derek Long, Fen Drayton (GB); Rustam Isangulov, Beijing (CN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 58 days.

(21) Appl. No.: 16/208,633

(22) Filed: Dec. 4, 2018

(65) Prior Publication Data
US 2020/0174455 A1   Jun. 4, 2020

(51) Int. Cl.
*G05B 19/418* (2006.01)
*G06N 5/04* (2006.01)
(Continued)

(52) U.S. Cl.
CPC ....... *G06Q 10/06315* (2013.01); *G06N 5/046* (2013.01); *B25J 9/1661* (2013.01); *G05B 19/4188* (2013.01); *G05B 2219/25422* (2013.01)

(58) Field of Classification Search
CPC ...... G05B 19/4188; G05B 2219/25422; G05B 13/0275; G05B 13/0285; G05B 13/0295;
(Continued)

(56) References Cited

U.S. PATENT DOCUMENTS

| 4,642,782 A * | 2/1987 | Kemper ............. G05B 23/0297 706/53 |
| 8,775,347 B2 | 7/2014 | Goel et al. |
| (Continued) | | |

FOREIGN PATENT DOCUMENTS

| WO | 2016172031 A1 | 10/2016 |
| WO | 2019222033 A1 | 11/2019 |

OTHER PUBLICATIONS

Fox, M. et al., "PDDL2.1: An extension to PDDL for expressing temporal planning domains", J. Artif. Int. Res., 2003, 20(1), pp. 61-124.
(Continued)

*Primary Examiner* — M. N. Von Buhr

(57) ABSTRACT

A recursive structure of inference rules is disclosed that enables translation of sensed data into high level predicates, e.g. to authorize the starts and ends of actions and detect violation of invariants, hence enabling coordination at different levels and/or across different domains at the same level within a multi-domain architecture. In embodiments, a processor may receive a condition configured to authorize an action of a system having equipment; identify a rule as a potential supporter of the condition in response to determining that the rule is associated with the condition; infer an implicant of the rule to be true when prerequisites of an antecedent of the rule are determined to be true; activate the rule in response to determining that the antecedent is true, wherein a validity of the condition is based on activation of the rule; and instruct the equipment to perform the action based on the validity of the condition.

18 Claims, 23 Drawing Sheets

(51) Int. Cl.
*B25J 9/16* (2006.01)
*G06Q 10/06* (2012.01)

(58) Field of Classification Search
CPC ....... G06Q 10/06315; G06Q 10/06313; G06Q
10/06311; G06Q 10/0631; G06Q 10/063;
G06N 5/048; G06N 5/046; G06N 5/04;
Y02P 90/02; E21B 44/00; E21B 41/00;
E21B 41/0092; E21B 43/00; E21B 43/16;
B25J 9/1661
See application file for complete search history.

(56) References Cited

U.S. PATENT DOCUMENTS

| | | | |
|---|---|---|---|
| 9,665,090 | B2 * | 5/2017 | Loganathan ....... G05B 19/4184 |
| 10,268,453 | B1 | 4/2019 | Ong et al. |
| 2002/0062156 | A1 | 5/2002 | Yamakawa et al. |
| 2003/0208392 | A1 | 11/2003 | Shekar et al. |
| 2004/0088115 | A1 | 5/2004 | Guggari et al. |
| 2005/0209836 | A1 | 9/2005 | Klumpen et al. |
| 2005/0209912 | A1 | 9/2005 | Veeningen et al. |
| 2008/0275594 | A1 | 11/2008 | De Guzman |
| 2008/0281525 | A1 | 11/2008 | Boone |
| 2008/0294387 | A1 | 11/2008 | Anderson et al. |
| 2008/0306803 | A1 | 12/2008 | Vaal et al. |
| 2009/0132458 | A1 | 5/2009 | Edwards et al. |
| 2009/0152005 | A1 | 6/2009 | Chapman et al. |
| 2010/0299172 | A1 | 11/2010 | Nottoli et al. |
| 2011/0155463 | A1 | 6/2011 | Khromov et al. |
| 2011/0251932 | A1 | 10/2011 | Early et al. |
| 2012/0054246 | A1 | 3/2012 | Fischer |
| 2013/0231787 | A1 | 9/2013 | Chapman et al. |
| 2014/0208253 | A1 | 7/2014 | Pettus et al. |
| 2014/0214469 | A1 | 7/2014 | Callow et al. |
| 2014/0237487 | A1 | 8/2014 | Prasanna et al. |
| 2014/0246238 | A1 | 9/2014 | Abbassian et al. |
| 2015/0193711 | A1 | 7/2015 | Lavrov et al. |
| 2015/0278734 | A1 | 10/2015 | Grant et al. |
| 2016/0026940 | A1 | 1/2016 | Johnson |
| 2016/0189318 | A1 | 6/2016 | Hein et al. |
| 2016/0253634 | A1 | 9/2016 | Thomeer et al. |
| 2016/0326846 | A1 | 11/2016 | Rashid et al. |
| 2016/0356125 | A1 | 12/2016 | Bello et al. |
| 2017/0370191 | A1 | 12/2017 | Fox et al. |
| 2018/0012310 | A1 | 1/2018 | Fox et al. |
| 2018/0032928 | A1 | 2/2018 | Li et al. |
| 2018/0075544 | A1 | 3/2018 | Passolt et al. |
| 2018/0100392 | A1 | 4/2018 | Kleingueti et al. |
| 2018/0299849 | A1 | 10/2018 | Martin et al. |
| 2019/0153701 | A1 | 5/2019 | Gates |
| 2019/0226314 | A1 | 7/2019 | Dasys et al. |
| 2019/0302310 | A1 | 10/2019 | Fox et al. |
| 2019/0325534 | A1 | 10/2019 | Perry et al. |
| 2019/0333164 | A1 | 10/2019 | Fox et al. |
| 2019/0354911 | A1 | 11/2019 | Alaniz et al. |
| 2020/0081882 | A1 * | 3/2020 | Cheriton ............. G06F 16/2379 |
| 2020/0175443 | A1 | 6/2020 | Fox et al. |
| 2020/0291764 | A1 * | 9/2020 | Chahine .................. E21B 47/06 |
| 2020/0410622 | A1 | 12/2020 | Bhat et al. |

OTHER PUBLICATIONS

Firby, "Adaptive Execution in Complex Dynamic Worlds", Ph.D. Thesis, Yale University Department of Computer Science, 1989.
Simmons et al., "A Task Description Language for Robot Control", Proceedings of the Conference on Intelligent Robotics and Systems, Vancouver, Canada, Oct. 1998, pp. 1931-1937.
Gat, E., "ESL: A Language for Supporting Robust Plan Execution in Embedded Autonomous Agents", Proceedings of the AAAI Fall Symposium on Plan Execution, 1996, pp. 319-324.
Berry, G., "The esterel v5 Language Primer, version 5.21 release 2.0", Centre de Mathematiques Appliquees, Ecole des Mines and INRIA, Apr. 1999, 140 pages.

Ingham et al., "A Reactive Model-Based Programming Language for Robotic Space Explorers", Proceedings of ISAIRAS-01, 2001, 8 pages.
Berry et al., "The ESTEREL synchronous programming language: design, semantics, implementation", Science of computer Programming, 1992, 19(2), pp. 87-152.
Doles et al., "Forward-chaining partial-order planning", Proceedings of the 20th International Conference on Automated Planning and Scheduling (ICAPS), Toronto, Ontario, Canada, May 12-16, 2010, pp. 42-49.
Henzinger, "The Theory of Hybrid Automata", Proceedings of the 11th Annual IEEE Symposium on Logic in Computer Science, 1996, pp. 278-292.
Lamport, "Time, clocks, and the ordering of events in a distributed system", Communications of the ACM, 1978, 21(7), pp. 558-565.
Williams et al., "Model-based programming: Controlling embedded systems by reasoning about hidden state", Principles and Practice of Constraint Programming, 8th International Conference, Ithaca, NY, USA, Sep. 9-13, 2002, pp. 508-524.
Apt et al., "Towards a theory of declarative knowledge", Foundations of Deductive Databases and Logic Programming, 1988, pp. 89-148.
Bacchus et al., "Downward Refinement and the Efficiency of Hierarchical Problems-Solving", Artificial Intelligence, vol. 71,1994, pp. 43-100.
Bernardini et al., "Leveraging Probabilistic Reasoning in Deterministic Planning for Large-Scale Autonomous Search-and-Tracking", Proc. 26th International Conference on Automated Planning and Scheduling (ICAPS), 2016, pp. 17-55.
Bonasso et al., "Experiences with an Architecture for Intelligent Reactive Agent", Journal of Experimental and Theoretical Artificial Intelligence (JETAI), 1997, 9, 24 pages.
Coddington et al., "Madbot: A motivated and goal directed robot", Proc. of National conference on AI (AAAI), 2005, vol. 20, p. 1680.
Fox et al., "Exploration of the Robustness of Plans", Proc. 21st National Conference on Artificial Intelligence (AAAI), 2006, pp. 834-839.
Gat, "On Three-Layer Architecutes", Artificial Intelligence and Mobile Robots, 1998, vol. 195, 11 pages.
Gregory et al., "Planning Modulo Theories: Extending the Planning Paradigm", Proc. 22nd International Conference on Automated Planning and Scheduling (ICAPS), 2012, 9 pages.
Hoffmann et al., "The FF Planning Systems: Fast Plan Generation Through Heuristic Search", J. Artif. Intell. Res. (JAIR), 2001, vol. 14, pp. 253-302.
Howey et al., "VAL: automatic plan validation, continuous effects and mixed initiative planning using PDDL", Proc. 16th IEEE International Conference on Tools with Artificial Intelligence (ICTAI), 2004, pp. 294-301.
Koymans, "Specifying Real-Time Properties with Metric Temporal Logic", Real-Time Systems, 1990, 2(4), pp. 255-299.
McGann et al., "A Deliberative architecture for AUV Control", Proc. IEEE International Conference on Robotics and Automation (ICRA), 2008, pp. 1049-1054.
Nieuwenhuis, "SAT modulo theories: Enhancing SAT with special-purpose algorithms", Proc. 12th International Conference on Theory and Applications of Satisfiability Testing (SAT), 2009, p. 1.
Williams et al., "Model-based Programming of Intelligent Embedded Systems and Robotic Space Explorers", Proceedings of the IEEE, 2003, 91(1), pp. 212-237.
Yoon et al., "FF-Replan: A Baseline for Probabilistic Planning", Proc. 17th International Conference on Automated Planning and Scheduling (ICAPS), 2007, 8 pages.
Bajada, J. et al., "Load Modelling and Simulation of Household Electricity Consumption for the Evaluation of Demand-Side Management Strategies," 4th IEEE PES Innovative Smart Grid Technologies Europe, Oct. 6-9, 2013, Copenhagen, 5 pages.
Coles, A. et al., "Managing concurrency in temporal planning using planner-scheduler interaction", Artificial Intelligence 173, 2009, pp. 1-44.
Erol, K. et al., "UMCP: A Sound and Complete Procedure for Hierarchical Task-Network Planning", AIPS 1994 Proceedings, pp. 249-254.

(56) References Cited

OTHER PUBLICATIONS

Fox, M. et al., "Explainable Planning", IJCAI-17 Workshop on Explainable AI, Melbourne, Aug. 2017, 7 pages.
International Search Report and Written Opinion issued in International Patent Application No. PCT/US2019/031645, dated Aug. 20, 2019, 17 pages.
Office Action issued in U.S. Appl. No. 16/208,644, dated Jun. 22, 2020, 23 pages.
Office Action issued in U.S. Appl. No. 16/208,644, dated Jan. 12, 2021, 28 pages.
International Preliminary Report on Patentability issued in International Patent Application No. PCT/US2019/031645, dated Nov. 26, 2020, 12 pages.
Office Action issued in U.S. Appl. No. 16/208,625 dated Mar. 30, 2021, 29 pages.
Johnsen, S.O.O. et al., "Proactive Indicators To Control Risks in Operations of Oil and Gas Fields", SPE-126560, SPE Economics & Management, Apr. 2012, 4(2), pp. 90-105.
Awasthi, A. et al., "Closing the Gap Between Reservoir Simulation and Production Optimization", SPE-107463, presented at the Digital Energy Conference and Exhibition, Houston, Texas, U.S.A., Apr. 11-12, 2007, 20 pages.
Office Action in U.S. Appl. No. 16/208,625, dated Oct. 26, 2021, 35 pages.
Office Action issued in U.S. Appl. No. 16/412,479, dated Aug. 17, 2021, 43 pages.
Office Action issued in U.S. Appl. No. 16/208,644, dated Aug. 20, 2021, 35 pages.

\* cited by examiner

285

197  97  297

287 — 0.00000: (getoutofslips) [1.00000]
1.00100: (breakcirculation c0) [3.00000]
4.00200: (senddownlinkoffbottomanydepth c0) [5.50000]
9.50299: (takesurveyoffbottom c0) [5.00000]
14.50399: (goonbottom c0) [10.00000]
24.50499: (drilltosteeringdemand steeringdemand1 survey2 c0) [19.37499]
43.88099: (sendsteeringdemandonbottom c0 steeringdemand1 steeringdemand2) [19.99999]
43.88199: (drilltosurvey steeringdemand2 survey2 survey3 c0) [43.74999]
87.63199: (comeoffbottom c0) [0.50000]
88.13299: (takesurveyoffbottom c0) [5.00000]
93.13399: (goonbottom c0) [10.000]
103.13499: (drilltosteeringdemand2 survey3 survey4 c0) [56.24999]
159.38499: (comeoffbottom c0) [0.50000]
159.88599: (takesurveyoffbottom c0) [5.00000]
164.88699: (goonbottom c0) [10.00000]
283 — 174.88799: (drilltosteeringdemand steeringdemand2 survey4 c0) [21.24999]
284 — 196.13899: (sendsteeringdemandonbottom c0 steeringdemand2 steeringdemand3) [20.00000]
196.13999: (drilltoconnection c0 steeringdemand3 survey4) [30.62499]
226.76499: (comeoffbottom c0) [0.50000]
227.26599: (workthepipe c0) [8.00000]
286 — 235.26699: (gotoconnectionpoint c0) [7.99999]
288 — 243.26699: (turnoffpumps c0) [8.00000]
243.26799: (getinslips c0) [11.99999]
255.26899: (connectpipe c0 c1) [2.50000]

FIG. 14

SYSTEMS AND METHODS FOR EXECUTING A PLAN ASSOCIATED WITH MULTIPLE EQUIPMENT BY USING RULE-BASED INFERENCE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to automated planning, an example of which is described in US Patent Application Publication No. 2018/0012310, which is incorporated by reference herein in entirety for all purposes. More particularly, the present disclosure relates to a scalable infrastructure for supporting multi-domain and multi-layered plan-based control of an autonomous system.

Automated planning may be used monolithically, at a single level in a single domain. For example, using a monolithic approach for drilling a borehole, a single domain model would cover both drilling and mud management activities (and/or other activities, e.g. casing and cementing). Such a model would become very unwieldy and difficult to maintain. Alternatively, automated planning may use a non-monolithic approach where domains are broken down into sub-components. For example, using a non-monolithic approach for drilling a borehole, a drilling plan detailing various drilling actions to perform may be automatically generated. Similarly, when applying mud or drilling fluid to the borehole, a mud plan detailing various mud application actions may be automatically generated. However, because the drilling plan and mud plan are not developed or coordinated together, the individually generated plans may be inefficient by not accounting for each other's actions. Moreover, the lack of coordination between the two plans may cause the plans to be inflexible and unable to react to changes in the other plan. Accordingly, there is a need for a flexible, efficient, yet robust and manageable system for planning and coordinating activities, including real-time responses to changing actions, among multiple domains and/or sub-domains.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to automated planning and uses scalable infrastructure for supporting multi-domain and multi-layered plan-based control of an autonomous and/or robotic system. Automated planning systems may generate concurrent sequences of actions, called plans, to achieve a desired future state of the autonomous system. The plans may be automatically generated given an initial state, a goal, and a set of constraints associated with the task. Additionally, the automated planning systems may perform re-planning operations when unexpected changes (e.g., with respect to expected states) occur. Unlike scripted behaviors, the ability to dynamically generate plans supports robust execution of tasks to complete a project in the face of changes that were not anticipated in advance.

The present disclosure provides an efficient, logically-structured, modular design or architecture, with communication enabled through defined interfaces to coordinate operations between or among different automated planning systems and/or domains. The architecture includes components that may perform certain tasks, such as for example deliberative reasoning, plan dispatch, execution and monitoring, and interpretation of state via inference systems. The architecture also provides for uniform design of components, which may be reproduced, in a modular and scalable way, to reflect decomposition of knowledge in any complex behavioral system. For example, a relationship between first and second levels (or parent-child levels or supervisor-subordinate levels and/or the like) can occur multiple times within a hierarchy, i.e., a hierarchy can be repeated and propagate. For example, a second level relative to a first level can itself serve as a first level for another second level. That is, first and second levels when considered locally, relative to each other, also may be considered higher-ordered levels in relation to a larger part of the hierarchy or of the whole. In other words, the architecture may include hierarchical (multi-domain and/or multi-level), modular components that include the same or similar structures, enabling robustness to address projects of any scale.

Specifically, a plan-based execution and control system, or planning system, may include a planner component that generates a plan (e.g., a sequence of tasks), and dispatches the plan to an execution engine, which implements the plan via machinery and/or control system(s) and/or the like. The planner component may be highly flexible and may act on multiple levels or domains, enabling the planner component to make broad strategic plans for an entire project or operation, as well as individual tactical subplans that contribute to the project. The planning system may respond to a variety of operations, and particularly, to situations in which specific tasks may take a variable amount of time to complete. The planning system may also periodically and/or constantly check that execution of plans and/or subplans is properly progressing by comparing an expected state to an actual state based on one or more measurements received via an inference system, sensors, and/or the like. The planning system may further initiate a re-plan of the plan and/or subplans when there is an amount of deviation between the perceived state of a plan or subplan and/or the expected state exceeds some threshold. In some embodiments, the planning system may increasingly relinquish more control to a user in stages based on the amount of deviation or the amount in which the expected state exceeds the threshold, and reengage planning and execution processes when prompted by the user. Additional details with regard to the operations of the planning system will be provided below with reference to FIGS. 1-25.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein:

FIG. 14 is an example textual rendition of a plan to drill a single stand produced by an automation platform that executes section drilling by automating a driller's tasks, according to one or more embodiments of the present disclosure;

DETAILED DESCRIPTION

Figure 1:
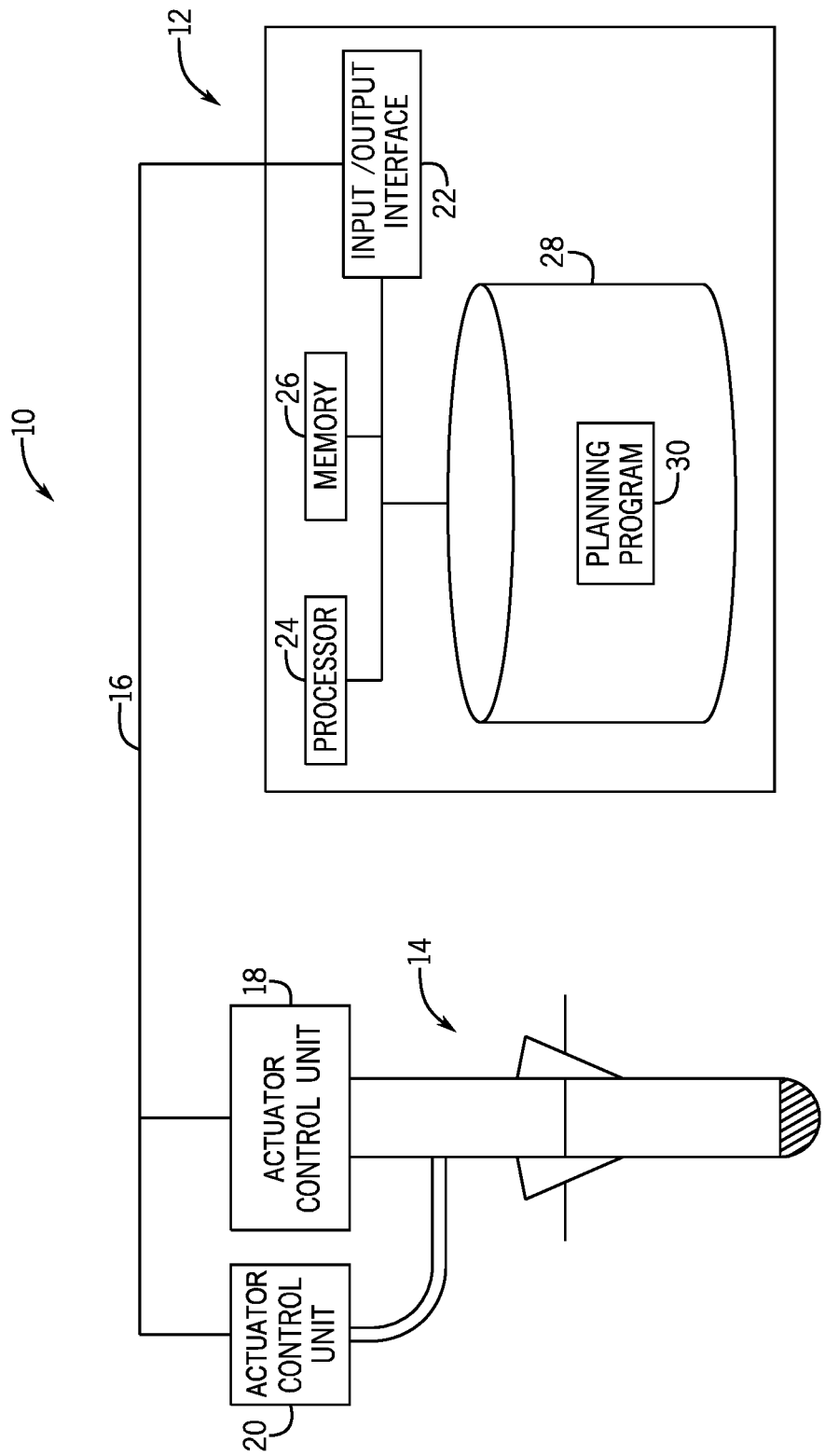
FIG. 1 is a block diagram of a plan-based execution and control system or planning system, according to one or more embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The drawing figures are not necessarily to scale. Certain features of the embodiments may be shown exaggerated in scale or in somewhat schematic form, and some details of conventional elements may not be shown in the interest of clarity and conciseness. Although one or more embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

When introducing elements of various embodiments of the present disclosure, the articles "a," "an," and "the" are intended to mean that there are one or more of the elements. The terms "including" and "having" are used in an open-ended fashion, and thus should be interpreted to mean "including, but not limited to . . . ." Any use of any form of the term "couple," or any other term describing an interaction between elements, is intended to mean either an indirect or a direct interaction between the elements described. Directional terms "vertical", "horizontal", "up", "down", "upward", "downward", or the like are not intended to suggest or correlate to particular physical directions but rather are intended to provide a relative conceptual relationship, e.g. "vertical" being different than "horizontal" and "up" being different from "down", for ease of describing relative and/or different domains, levels, layers, process flows, or the like.

Certain terms are used throughout the description and claims to refer to particular features or components. As one skilled in the art will appreciate, different persons may refer to the same feature or component by different names. This document does not intend to distinguish between components or features that differ in name but not function, unless specifically stated.

Embodiments of the present disclosure relate to an automated planning system that uses a scalable infrastructure for supporting multi-domain and multi-layered plan-based control of an autonomous system. Automated planning systems and methods may automate generation of concurrent sequences of actions, called plans, to achieve the desired future state of an autonomous system from the current state of the autonomous system, while respecting certain constraints. Each automated planning system may control operation of equipment to perform respective plans and/or subplans. An action or activity performed by equipment may include a transition between states, where a state may include a conjunction of facts describing a situation. These facts may include equipment modes (e.g., whether equipment is operating, turned on, turned off, and/or the like), relationships between objects, assignments to numeric variables, and/or the like. For an action to be applicable, certain preconditions may be detected via sensors to be in a first state, and, after application, its effects may result in a desired second state. The plan may include a concurrent sequence of actions that starts in an initial state and ends in a goal or final state.

The multi-domain multi-level automated planning systems and methods of the present disclosure may be used in any number of industries and applications, including for example logistics, transportation, automated manufacturing, automated design, medicine, robotic systems, energy distribution, oil and gas (e.g., well construction, well stimulation and production, exploration and field development, remote monitoring), or any other industry or application in which coordination among multiple domains for automation and control may be implemented.

For illustrative purposes only and without limitation, in an example pertaining to a well drilling application in the oil and gas industry, an autonomous planning system of the present disclosure may coordinate drilling activities of a borehole and mud flow rates while drilling the borehole. For example, an automated planning system may specify a plan when drilling a borehole to a certain depth (e.g., a well drilling operation plan) for the drilling operation and send instructions to other automated planning systems to formulate subplans. For further example, a well operation may include constructing a well, operating the well (e.g., to generate a desired amount of hydrocarbons from the well in a desired amount of time), ceasing operation of the well, or any other suitable operation of the well. As such, in the case of a well operation plan, the plan may include, for example, a concurrent sequence of actions to construct a well, operate an existing well, modify construction of a well, cease operating a well, generate a desired amount of hydrocarbons from the well in a desired amount of time, and/or the like. For further example, the concurrent sequence of actions may include constructing the well from an initial state where the well does not yet exist and a borehole has not been drilled to a goal state where the well has been constructed, in a desired amount of time. In alternative or additional embodiments, the concurrent sequence of actions may include, for example, operating the well to generate a desired amount of hydrocarbons from the well in a desired amount of time.

In addition, automated planning systems may employ intelligent guided search to explore a variety of alternative choices and arrangements of actions and may produce plans that optimize one or more target metrics (e.g., cost or total plan duration). Plans may be automatically generated given any state, goal, or domain description and set of constraints. A goal may include a set of expected conditions in the final state of the plan. A domain may include a description of the actions that are available within a specific area of application. In some embodiments, re-planning may be triggered when unexpected changes occur during execution of the plan. Unlike scripted behaviors, plans generated by the automated planning systems and methods of the present disclosure can be failed and regenerated quickly when changes are encountered that were not anticipated in advance. The automated planning systems and methods of the present disclosure may therefore provide an agile and robust basis for intelligent automation of the autonomous system. In the multi-domain context, failures and re-planning can be isolated to sub-components of the system, only propagating to supervisory levels when global constraints are violated.

The presently disclosed scalable infrastructure or plan-based execution and control system or architecture, or planning system, may support multi-domain and multi-layered plan-based control of an autonomous system. A planner component of the planning system may automate generation of a plan, given a domain, an initial state, a goal, and a set of constraints. In some embodiments, the planner component may be implemented as a Partial-Order Planning EXtended (POPEX) component, which is a planning system based on a forward search heuristic planning system, such as the Partial-Order Planning Forward (POPF) system. The planner component may plan based on time and numeric quantities, reasoning about continuous change and temporal coordination of concurrent activity. The planner component may determine when a set goal is unreachable and return an indication that the goal cannot be met. Otherwise, the planner component may search for a plan until one is found, or until either time or memory limitations are exceeded.

For example, the planner component may attempt to automatically determine a plan to drill a borehole given a schedule (e.g., a deadline for drilling the borehole and/or deadlines related to phases of drilling the borehole) and available resources (e.g., drilling equipment, mud injection equipment, mud flow rates of the mud injection equipment, availability of the drilling equipment and the mud injection equipment, and/or the like). The planner component may determine the plan within given time and/or memory limitations, or else indicate that a plan could not be determined with the time and/or memory limitations.

By way of introduction, FIG. 1 is a block diagram of a plan-based execution and control system 10, or planning system, according to an embodiment of the present disclosure. The planning system 10 may include a computing device 12 communicatively coupled to equipment 14 via a data link 16, which may be a wired link, a fiber link, any other suitable physical data link, or any suitable wireless data link. The equipment 14 may include one or more equipment components, control units, and/or actuator control units 18, 20. Specifically, the computing device 12 may be communicatively coupled to actuator control units 18, 20 used to control operations of components in the equipment 14. Actuator control units 18, 20 may be in the form of, for example, physical components, software systems, software updates, engineering hardware, data manipulation systems, any combination thereof, and/or the like, and may be co-located with, a distance from, or remote from the planning system 10.

For illustration only, and without limitation, equipment 14 may be well construction equipment such as or including a drill string, mudding equipment, and/or the like. As such, in some embodiments, the planning system 10 may be a well construction system. For instance, the computing device 12 may be communicatively coupled to a drilling control unit 18 that may control operation of well construction equipment 14 (e.g., drilling equipment). For example, the drilling control unit 18 may control a motor to drive or stop drill equipment, receive data from sensors that detect drilling action, control pumps, and/or control any other suitable components used by the well construction equipment 14. The computing device 12 may also be communicatively coupled to a mud control unit 20 that may control operation of mud flow in the well construction equipment 14. For example, the mud control unit 20 may control a flow rate of mud directed through and out of the well construction equipment 14.

The computing device 12 may include any suitable device capable of executing the planning system 10, such as a desktop computer, a laptop, a mobile electronic device, a server, and/or the like. However, it should be noted that the computing device 12 may be specially designed to enable different components to interact with each other to update plans based on actions and/or data from other components. The computing device 12 may include an input/output interface 22 that couples to the data link 16. The computing device 12 may also include any type or number of computer processors or microprocessors 24 capable of executing computer-executable code. The computing device 12 may further include one or more volatile memory (e.g., random access memory) devices 26 and/or one or more non-volatile memory (e.g., solid-state disk hard disk or flash memory) devices 28 that may serve as media to store processor-executable code, data, and/or the like. These articles of manufacture may represent non-transitory computer-readable media (i.e., any suitable form of memory or storage) that may store the processor-executable code, such as an execution and control program or planning program 30, used by the processor 24, among other things, to perform operations that may be used to execute the planning system 10.

Generally, the planning program 30 may receive certain goals/states (e.g., drilling a borehole in a target time), generate a plan (e.g., a well operation plan) based on the goals/states, and send actions (e.g., drilling to a target depth in a target time, injecting mud for a target duration beginning at a target time, and/or the like) of the generated plan to be carried out by an equipment element or control unit 18, 20 (e.g., a drilling control unit 18 and/or a mud control unit 20 and/or any number of other control units (not shown)). In some cases, based on data relating to one or more control unit(s) 18, 20, the goals/states, and/or the like, the planning program 30 may re-plan or retime certain actions of the generated plan.

Figure 2:
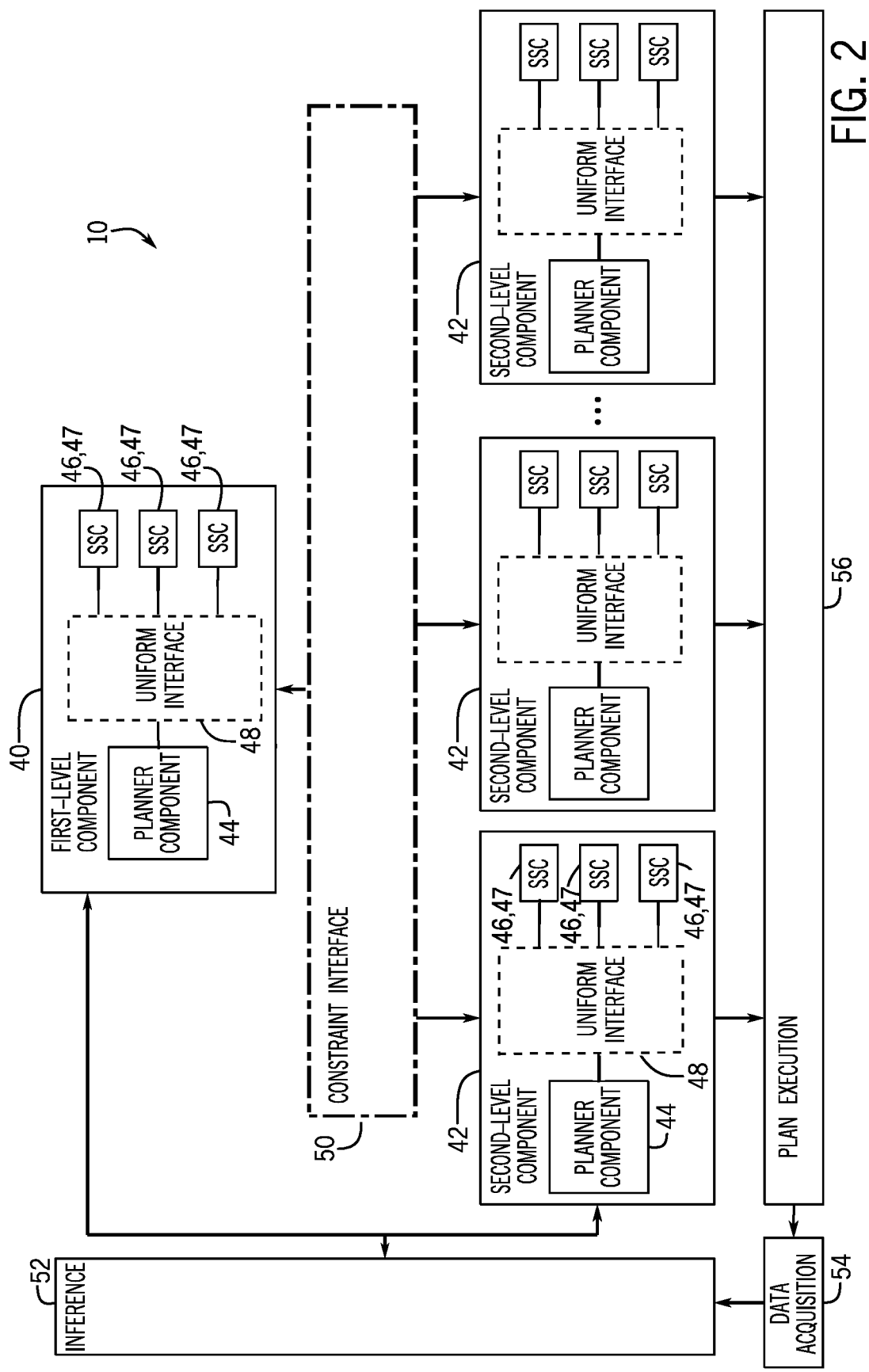
FIG. 2 is a block diagram of the planning system of FIG. 1, according to one or more embodiments of the present disclosure.

FIG. 2 is a block diagram of the planning system 10 of FIG. 1, according to an embodiment of the present disclosure. The planning system 10 may include different modules or components that operate using the processor 24. For example, the planning system 10 may include instances of first-level components 40 and second-level components 42. Each first-level component 40 and second-level component 42 may include a planner component 44 that may automate generation of a plan, given a domain, an initial state, a goal, and a set of constraints. In some embodiments, the planner component 44 may be implemented as a copy of POPEX, which may interact with a collection of specialized subject components (SSCs) 46 (e.g., physics models) through a uniform interface 48. Individual SSCs 46 may employ the same or different types of solvers from each other. Individual planner components 44 may be the same or different than each other.

In particular, the specialized subject component (SSC) 46 may provide one or more properties 47 of state (discussed further with reference to FIG. 3 below) to the planner component 44. The state may include a conjunction of facts describing a situation, and each fact may include equipment modes, relationships between objects, assignments to numeric variables, and/or the like. As such, the specialized subject component 46 may include and/or provide specialized data and/or modes to assist the planner component 44 to perform operations. The uniform interface 48 may provide a communication gateway between the planner component 44 and the specialized subject components 46.

While first-level components 40 and second-level components 42 are illustrated, the multi-domain planning systems of the present disclosure may include components in any number of levels, e.g., three levels, four levels, five levels, or on the order of tens, hundreds, or more levels. In other words, while the present disclosure illustrates the planning system 10 as a two-level architecture (e.g., the first-level component 40 and the second-level components 42), it should be understood that any suitable number of levels is contemplated (e.g., with multiple first-level components 40, multiple levels of first-level components 40, multiple levels of second-level components 42, higher levels of components, multiple levels of higher-level components, and so on). Additionally or alternatively, a relationship between first and second levels (or parent-child levels or supervisor-subordinate levels and/or the like) can occur multiples of times within a hierarchy, i.e., a hierarchy can be repeated and propagate. That is, a second level relative to a first level can itself serve as a first level for another (different) second level, i.e., local first/second levels may be considered higher-ordered levels (e.g., randomly speaking, levels 27/28, 107/108, etc.) in the context of a larger or whole tree, structure, or hierarchy.

As illustrated, a first-level component 40 may communicate with each second-level component 42 through a constraint-based uniform interface or constraint interface 50. The constraint interface 50 may provide a communication gateway between the first-level component 40 and each second-level component 42, thereby providing for a coordination of actions or activities belonging to different second-level components 42. The first-level component 40 may plan and coordinate actions at a higher level as compared to a second-level component 42, while the second-level components 42 may plan and coordinate actions in their particular domains of expertise, or metiers. For illustrative and non-limiting example, the first-level component 40 may plan and coordinate actions with respect to drilling a borehole, and the second-level components 42 may plan and coordinate actions with respect to drilling, mud injection, casing, cementing, and/or the like, and/or any other planning component(s) at this level (e.g., multiple siblings).

In embodiments, the first-level component 40 may coordinate strategic planning and plan execution to achieve goals of some application (e.g., in the oil and gas industry by way of non-limiting illustration, drilling a well for extracting hydrocarbons, fracturing a rock formation for improvement of the extraction of hydrocarbons from a wellbore, etc.), and each second-level component 42 may include a tactical planning and execution system that performs a portion or part of the operations for the respective application. Each portion or part of the operations may correspond to how the first-level component 40 provides detailed development of plans corresponding to its actions. When the planner component 44 of the first-level component 40 communicates with a second-level component 42 (e.g., sends a higher-level plan to the second-level component 42), the second-level component 42 may respond with one or more plans.

The first-level component 40 and the second-level components 42 may each develop a plan with respect to a domain description and set of goals specific to its own area of responsibility. The domain descriptions, state descriptions and sets of goals may be written in a planning domain language, for example the Planning Domain Description Language (PDDL), e.g. PDDL2.1. Where input to the planning components is written in a standard version of PDDL, there is no requirement for hierarchical domain descriptions, as needed in Hierarchical Task Network (HTN) planning and/or method expansion, and therefore use of such PDDL (or similar) language enables hierarchical coordination of the multi-level system to be managed by constraint passing and asynchronous execution of activities, as presently disclosed.

The planning system 10 may enable several multiple second-level components 42 to communicate with the first-level component 40 through a constraint interface 50 by means of an expressive constraint language. In embodiments, a constraint interface 50 may be a language to enable passage of XPlans and timeline constraints. In embodiments, the constraint interface 50 may be based on a logic-based communication layer, for example the standard Boolean logic-based communication layer used in SAT Modulo Theories (an approach which enables variables in Boolean formulae to be evaluated using specialized theories such as Peano Arithmetic).

Methods and systems of the present disclosure may include hierarchical coordination of a multi-level system managed by constraint passing and asynchronous execution of activities, and/or a multiple domain model decomposed into areas of local expertise with local constraints. Each planning component may have its own domain and its own constraints. Planning components may be independent of each other but capable of communication with each other via their constraints. Such methods and systems may provide scalability and modularity and with them, for example, capability to address isolated failure using localized expertise with responsibility for the failure.

The planning system 10 may include a modular, hierarchically-structured design, with the first-level component 40 and the second-level components 42 operating at different levels, having the same or similar structure or components, and enabling communication through the constraint interface 50. The planning system 10 may thus achieve scalability and generality of plan-based control, without depending on domain-specific content.

As such, while certain types of applications (e.g., hydrocarbon extraction related applications including without limitation drilling, mud injection, hydraulic fracturing (e.g., pumping stages, sand or proppant delivery), cementing, well construction, etc.) associated with the second-level components 42 are illustrated in the present disclosure, it should be understood that these types of applications are used as examples only, and that any suitable types of applications in any industry or field are contemplated.

Moreover, the locations of the functionalities illustrated in the planning system 10 (e.g., specialized subject components 46 in each first-level component 40 and second-level component 42) are also used as examples only, and any suitable locations for the functionalities are also contemplated. Indeed, the planning system 10 may be sufficiently flexible for domain experts to use it in a plug-and-play fashion for a variety of industries and domain and/or sub-domain applications.

In some embodiments, the planning system 10 may incorporate both deliberative reasoning systems and plan execution and control systems involved in overall plan-based autonomous behavior, as will be discussed below in further detail. An inference system 52 may receive signals (e.g., that include sensor information) from sensors (e.g., via a data acquisition system 54) and interpret an associated state to send to the first-level component 40 and the second-level components 42. Interpretation may involve several layers of filtering and conditioning before the associated state may be determined. The inference system 52 may facilitate translating data (e.g., received via the data acquisition system 54) to abstract modes in the PDDL (planning domain description language) models. A plan execution system 56 may execute a plan output by each second-level component 42. In particular, the plan execution system 56 may send instructions to the equipment 14 and/or actuator control unit(s) 18, 20 based on the plan or actions of the plan. For example, if the equipment 14 is well construction equipment, the plan execution system 56 may send instructions to a drilling control unit 18 to start, stop, or adjust drilling, instructions to a mud control unit 20 to start, stop, or adjust injecting mud, and/or the like, based on the plan or the actions of the plan. As such, each planner component 44 of the second-level components 42 may be communicatively coupled to a respective control system, unit, or equipment (e.g., the drilling control unit 18, the mud control unit 20, and/or the like).

Continuing this example, the first-level component 40 may coordinate activities of the second-level components 42 that assist in drilling a borehole. For instance, a first second-level component 42 may be a drilling platform that executes section drilling by providing commands to the drilling control unit 18. A second second-level component 42 may be a mud system (e.g., the mud control unit 20) that coordinates the deposit and supply of mud during the drilling operations of the drilling control unit 18. In some embodiments, each second-level component 42 may reside within a rig-integrated drilling execution system, built on an acquisition, aggregation and recording platform.

Figure 3:
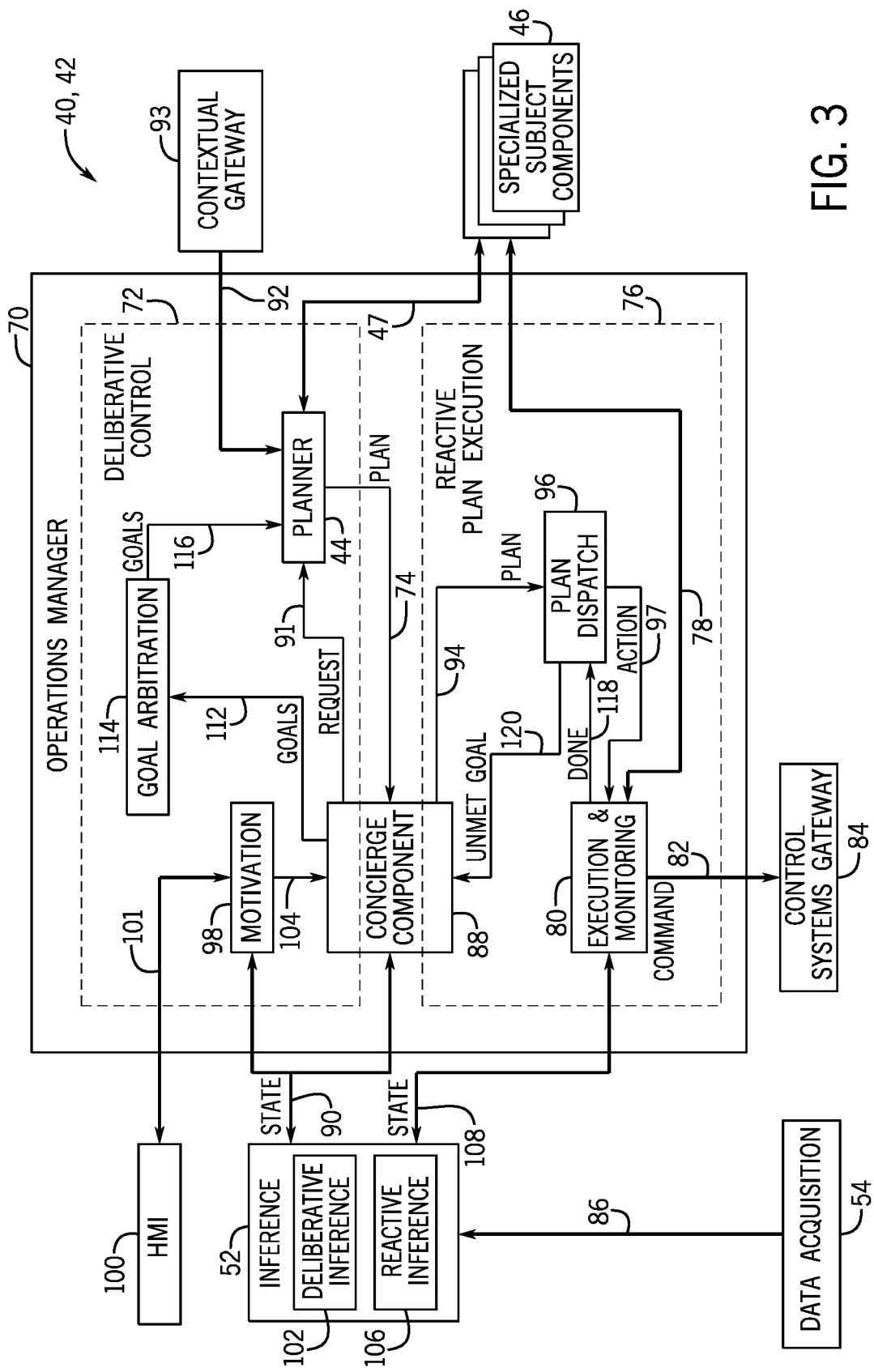
FIG. 3 is a block diagram of example internal components of a first-level component or second-level components of the planning system of FIG. 2, according to one or more embodiments of the present disclosure.

FIG. 3 is a block diagram of example internal components of the first-level component(s) 40 or second-level components 42 of the planning system of FIG. 2, according to an embodiment of the present disclosure. Each internal component of a first-level component 40 and the second-level components 42 may focus on performing a respective operation, such that the ordered combination of the operations enable the first-level component 40 and the second-level components 42 to efficiently coordinate machine (e.g. equipment 14) operations and plan generation. The first-level component 40 and second-level components 42 each may include an operations manager 70 that manages operations of the respective first-level component 40 or second-level component 42. The operations manager 70 may include a deliberative control layer 72 that generates plans 74 and coordinates the components that provide inputs to the deliberative control layer 72. The operations manager 70 may also include a reactive plan execution layer 76 that may dispatch actions 78 to an execution and monitoring component 80, which, in turn, may send actions or commands 82 to a control systems gateway 84. The control systems gateway 84 may then control operations of the equipment 14 based on the actions or commands 82. For illustrative example, if equipment 14 is well construction equipment, the plan execution system 56 may send commands 82 to a drilling control unit 18 to start, stop, or adjust (e.g., speed, torque) drilling, to a mud control unit 20 to start, stop, or adjust (e.g., material, flow rate) injecting mud, and/or the like.

The inference system 52, discussed in detail below, may receive data or signals 86 from sensors (e.g., of the data acquisition system 54) and infer a state of the planning system 10 based on the received data or signals 86. The sensors may record data (e.g., pressure, flow, temperature, or any appropriate parameter capable of being sensed) that may be associated with the operation of the respective machine.

A concierge component 88, which may be disposed between the deliberative control layer 72 and the reactive plan execution layer 76, may receive input (e.g., states) 90 from the inference layer or system 52 and determine when to send re-planning and rescheduling requests 91 to the planner component 44. The concierge component 88 may ensure that the planner component 44 has completed its current planning task before issuing a new plan request 91. In some embodiments, the concierge component 88 may coordinate operations (e.g., pass requests) between the deliberative control layer 72 and the reactive plan execution layer 76. The layers 72 and 76 (and others) may or may not include series or loops of activities at different operational frequencies. For example, the deliberative control layer 72 may operate at a lower frequency (e.g., minutes or hours), while reactive sensing and control through the control systems gateway 84 may operate at a higher frequency (e.g., milliseconds), and the reactive plan execution layer 76 may monitor execution at an intermediate frequency (e.g., seconds).

A contextual gateway 93 may generate and/or provide plan-related parameters 92, such as domain models, macros, initial states, constants, and/or the like, to the planner component 44. The planner component 44 may also receive input (e.g., properties 47 of state, output from physics models, and/or the like) from the specialized subject components 46. The planner component 44 may send plans 74 back to the concierge component 88, which may forward the plans 94 to a plan dispatch component or dispatcher 96. The dispatcher 96 may ensure that any plan 94 that is currently under dispatch is cleared prior to starting the dispatch of a new plan 94, for example, the dispatcher 96 may not dispatch a new plan 94 until a plan 94 that is currently under dispatch has completed. The plan dispatcher 96 may output actions 97 to the execution and monitoring component 80 to be executed via the control systems gateway 84.

The deliberative control layer 72 may also include a motivation component 98 that receives input from a human-machine interface 100 (e.g., a graphical user interface) and a deliberative inference component 102 of the inference system 52. The human-machine interface 100 may communicate input 101 from and output to a user. For example, the user may adjust goals, priorities, or any other suitable parameters related to the first-level component 40 and/or a second-level component 42 via the human-machine interface 100. The deliberative inference component 102 may generate states 90 based on inferences based on the data or signals 86 received from the data acquisition system 54, while the reactive inference component 106 may generate states 108 based on the data or signals 86 received from the data acquisition system 54. In particular, the state 90 generated by the deliberative inference component 102 may be associated with interpreting and/or converting signals (e.g., data or signals 86 from the data acquisition system 54) to an appropriate level (e.g., associated with the first-level component 40, a second-level component 42, and/or the like). The state 108 generated by the reactive inference component 106 may be associated with signals (e.g., data or signals 86 from the data acquisition system 54) that are typically used in a direct form (e.g., without interpretation or conversion).

As such, the motivation component 98 may output goal-related parameters 104 (e.g., domain descriptions, state descriptions, sets of goals, priorities, and/or the like) to the concierge component 88 based on input 101 received from the human-machine interface 100 and/or the state information 90 received from the deliberative inference component 102 of the inference system 52.

The concierge component 88 may generate goals 112 based on the state 90 generated by the deliberative inference component 102 and/or the goal-related parameters 104. The goals 112 may be sent to a goal arbitration component 114. The goal arbitration component 114 may determine which goal or goals to implement (e.g., based on the planner component's 44 determination that a goal cannot be met), or in what sequence goals may be implemented, and send resulting goals 116 to the planner component 44. The planner component 44 may then generate a plan 74 based on the goals 116, the plan-related parameters 92, and/or the properties 47 of state from the specialized subject components 46. The planner component 44 may send the plan 74 to the concierge component 88, which may in turn send the plan 94 to the dispatcher 96.

The execution and monitoring component 80 may report to the dispatcher 96 if and when an action 97 (dispatched by the dispatcher 96 to be executed by the control systems gateway 84) and/or command 82 has been executed 118. In cases where the action 97 and/or command 82 was not able to be performed, the dispatcher 96 may report an indication 120 of an unmet goal to the concierge component 88.

With continuing reference to FIG. 3, the illustrated three-layer architecture (e.g., the deliberative control layer 72 and the reactive plan execution layer 76 of the operations manager 70, and the inference layer or system 52) may be implemented in each first-level component 40 and second-level component 42. Implementing each first-level component 40 and the second-level components 42 using the same three-layer architecture improves scalability in the planning system 10. Moreover, each component of the first-level component 40 and the second-level components 42 may focus on performing a respective operation, such that the specifically ordered combination of the operations enable the first-level component 40 and the second-level components 42 to efficiently coordinate machine (e.g., the equipment 14) operations and plan generation. The illustrated architecture may be based on any suitable three-layer architecture, for example the MADBOT three-layer architecture or another three-layer architecture in use in plan-based robot control capable of constructing a plan, refining the actions into execution sequences, and re-planning when failures occur at execution time.

Figure 4:
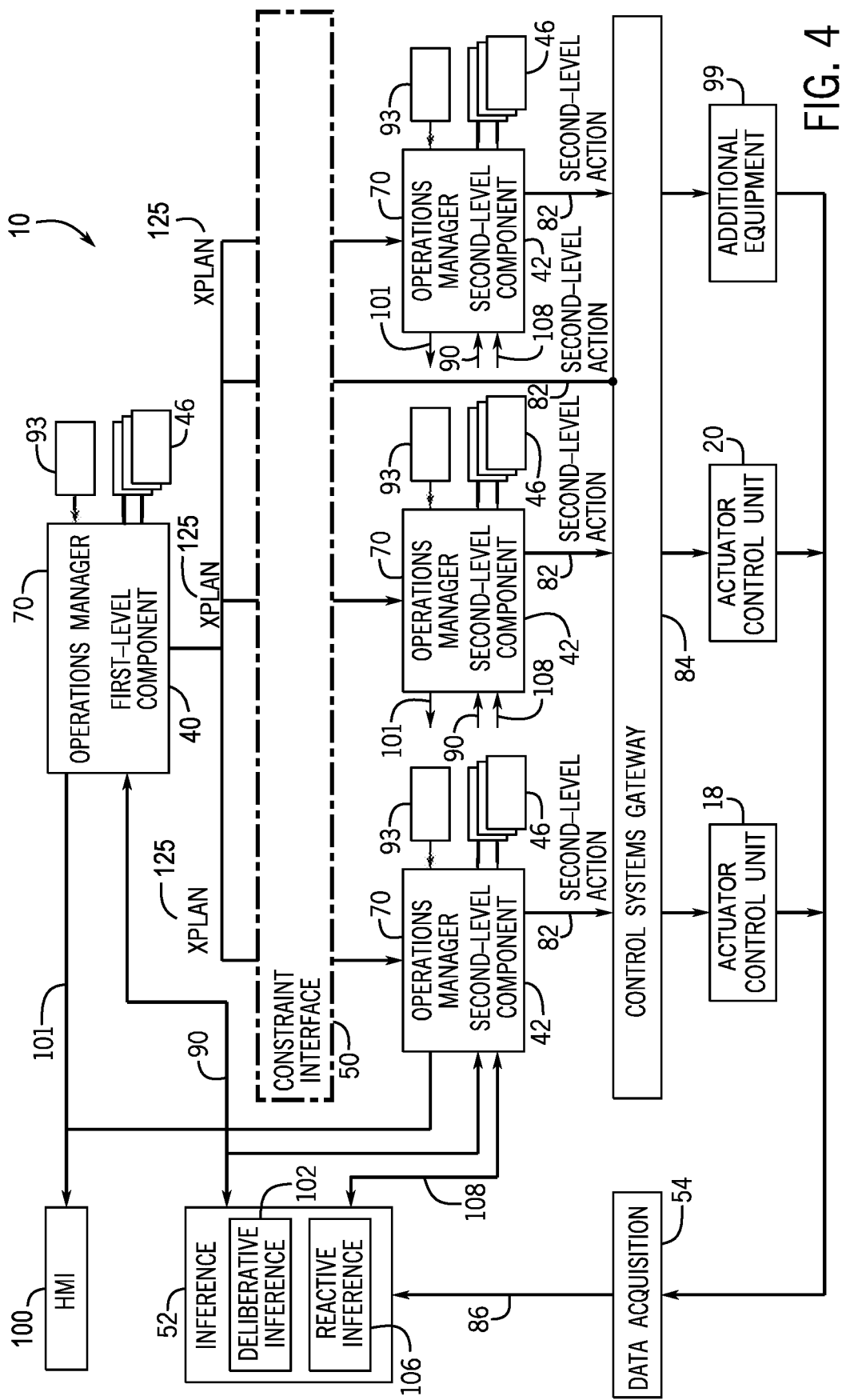
FIG. 4 is a block diagram illustrating scalability of the planning system of FIG. 1, according to one or more embodiments of the present disclosure.

FIG. 4 is a block diagram illustrating scalability of the planning system 10 of FIG. 1, according to an embodiment of the present disclosure. Each of the first-level components 40 and the second-level components 42 may include the operations manager 70 that may include the deliberative control layer 72 (as shown in FIG. 3) that may plan to achieve goals or effects (e.g., 112, 116) relevant to the respective first-level component 40 or second-level component 42. In some embodiments, each first-level component 40 and second-level component 42 may include a POPEX planning system (e.g., as part of a planner component 44 as shown in FIGS. 2-3), and each may receive a PDDL domain model, with its own predicates, functions, and actions, associated with its specific area of responsibility. For each planner component 44, a respective planner component 44 may communicate, through a uniform interface 48 (as shown in FIG. 2), with a collection of specialized subject components 46 (see FIGS. 2-4) relevant to the respective first-level component 40 or second-level component 42. For example, a second-level component 42 representing a drilling application may communicate with models giving rate of penetration optimization (ROPO) and steering advice for the drilling operations. More generally, the specialized subject components 46 may include models (e.g., physics models) that may be consulted while generating a plan (e.g., 74, 94 (FIG. 3)) and enable the planner component 44 to make informed choices regarding properties 47 (FIG. 3) of state, equipment modes, relationships between objects, assignments to numeric variables, and/or the like.

With continued reference to FIG. 4, the operations manager 70 may also include the reactive plan execution layer 76 as shown in FIG. 3, enabling a respective first-level component 40 or second-level component 42 to dispatch and monitor its own actions (e.g., 97). An action 97 in a plan 94 of the first-level component 40 may be a first-level action, such that it may be refined by a more specialized second-level component 42, or a second-level (e.g., concrete) action or command 82 that may be dispatched, via the execution and monitoring component 80 (see FIG. 3), directly to the control systems gateway 84. The action 97 may be performed by equipment 14 and/or actuator control unit(s) 18, 20 (FIG. 1) (e.g., a drilling control unit 18, a mud control unit 20, additional equipment 99 and/or control unit(s) 18, 20, and/or the like) and may include a transition between states. For an action 97 to be applicable, certain preconditions may be detected via sensors (e.g. of a data acquisition system 54) to be in a first state, and, after application, its effects may result in a desired second state. The plan may include a concurrent sequence of actions that starts in an initial state and ends in a goal or final state. In each of the first-level component(s) 40 and the second-level components 42, the plan 74, 94 may be output as an XML document containing annotations describing conditions under which actions 97 are authorized to be dispatched to the execution and monitoring component 80, and constraints that may be observed during execution of the actions 97.

Proper execution may depend upon the constraints, such as invariants related to scheduling or deadlines, being respected. The annotations may enable the execution of the plan 74, 94 to be monitored by the execution and monitoring component 80 to ensure that no constraints are violated. The XML document is referenced as an XPlan 125 and may be a form of communication between a first-level component 40 and one or more second-level component(s) 42. It should be understood that plans of the present disclosure may be referred to by any one or more of a variety of reference numbers (e.g., 74, 94, 125, 200, 240, 248, 249, 242, 252, 282 and/or the like) each of which may refer to a plan or an "XPlan."

In some embodiments, constraints may include Standard Operating Procedures or contractual agreements to be respected (SOPs). SOP constraints may be captured, for example in PDDL, included in the initial state description to the planning system, and/or integrated with dynamic re-planning to ensure dynamic procedural adherence throughout plan generation and execution. In the context of well drilling, SOP constraints may include, for example, methods for ensuring wellbore stability (e.g. flow checks and/or integrity tests at specified points in the borehole), methods for handling unplanned events (e.g. kick, stuck pipe, washout), and/or the like. Operations can be defined for performance, for example, by defining markers at specific points, for example, spatial markers, temporal markers, resource-relative markers (e.g. volume markers), or any other type of marker for constraint. By way of illustration in the drilling context, examples include markers at casing shoes, depth ranges within which operations must be performed, and/or operations to be performed relative to specified phases of the overall drilling process.

If an unplanned event occurs, then the plan is failed under execution and the initial state description is rewritten for re-planning (discussed in further detail below). The rewritten initial state description may include further SOP constraints that are relevant to the diagnosed event to ensure that upon re-planning, the planning system must construct a plan that meets all procedural requirements then known.

Each of the first-level component(s) 40 and the second-level components 42 may be coupled to the control systems gateway 84, through which second-level actions or commands 82 may be sent to control systems (e.g., actuator control unit(s) 18, 20 and/or additional equipment 99) to be executed. The control systems may then adjust operations of equipment 14 to invoke corresponding actions. The control systems gateway 84, as with the inference system 52, may be shared with the entire planning system 10.

Each of the first-level component(s) 40 and the second-level components 42 may therefore plan, dispatch, and monitor actions in its respective domain. The domain may include a description or list of available actions for the respective first-level component 40 or second-level component 42. As illustrated in FIG. 4, each second-level component 42 may receive as an input an XPlan 125 (e.g., with reference to FIG. 3, the XML document containing annotations describing conditions under which actions 97 are authorized to be dispatched to the execution and monitoring component 80, and constraints that may be observed during execution of the actions 97).

An XPlan 125 may include desired times (e.g., timed goals) that the second-level component 42 may attempt to achieve effects or goals 112, 116 and constraints it may attempt to satisfy. A timed goal may be associated with a time point or a time interval that the second-level component 42 should achieve the goal 112, 116. A constraint may include a restriction as to when actions 97 may occur, when plans 74, 94 may be implemented, or by when goals 112, 116 may be achieved. The planner component 44 (FIGS. 2-3) of the operations manager 70 for each first-level component 40 and second-level components 42 may output an XPlan 125 (FIG. 4) that imposes its own constraints on dispatch and execution of its respective actions 97. As such, the planning system 10 may achieve a powerful modularity, which makes it scalable to large numbers of second-level components 42. Additional details with regard to XPlans 125 will be discussed below with reference to FIGS. 20-25.

In some embodiments, plan generation and plan execution within the planning system 10 may be based on rescheduling and/or validation software. In an operations manager 70 (see FIGS. 3-4), rescheduling of planned actions 97 within existing temporal constraints of a plan 74, 94 may occur. Validation may include a step-by-step simulation of the plan 74, 94 under execution. In cases where data-driven inference is not available, validation of plan generation and/or execution may be performed by completely simulating the steps of the plan 74, 94, e.g. via a form of Dead Reckoning inference. In general, a Dead Reckoning inference technique may be used to validate that systems that operate in open-loop control, where there is no feedback from sensors, are operating in a current state. As such, validation of the plan 74, 94 by completely simulating the steps of the plan 74, 94 may not occur without, for example, observing the results of simulating the steps of the plan 74, 94.

Modes of Operation

In some embodiments, the planning system 10 may operate in two distinct modes of operation, an Estimation Mode and an Execution Mode.

1. Estimation Mode
a. General

Estimation Mode includes multi-level planning activity, e.g., construction of a multi-level plan prior to anything being executed. In the Estimation Mode, in an operations manager 70 (see, e.g., FIGS. 3-4) a plan 74, 94 (see, e.g., FIG. 3) may be generated to satisfy first-level goals, using coordinated efforts between the first-level component 40 and the second-level components 42. The plan 74, 94 may include both first level actions that make up the plan 74, 94, which may be refined by the second-level components 42 based on more detailed and application-based (e.g., drilling-based, mud-based, and/or the like) information related to a respective second-level component 42, and actions that the first-level component 40 may dispatch directly (as second-level actions or commands 82) to the control systems gateway 84. In Execution Mode, the first-level component 40 may dispatch the plan 74, 94 to the second-level component 42, which may re-invoke the second-level component 42 to refine the first level actions and send the second-level actions or commands 82 directly to the control systems gateway 84.

Figure 5:
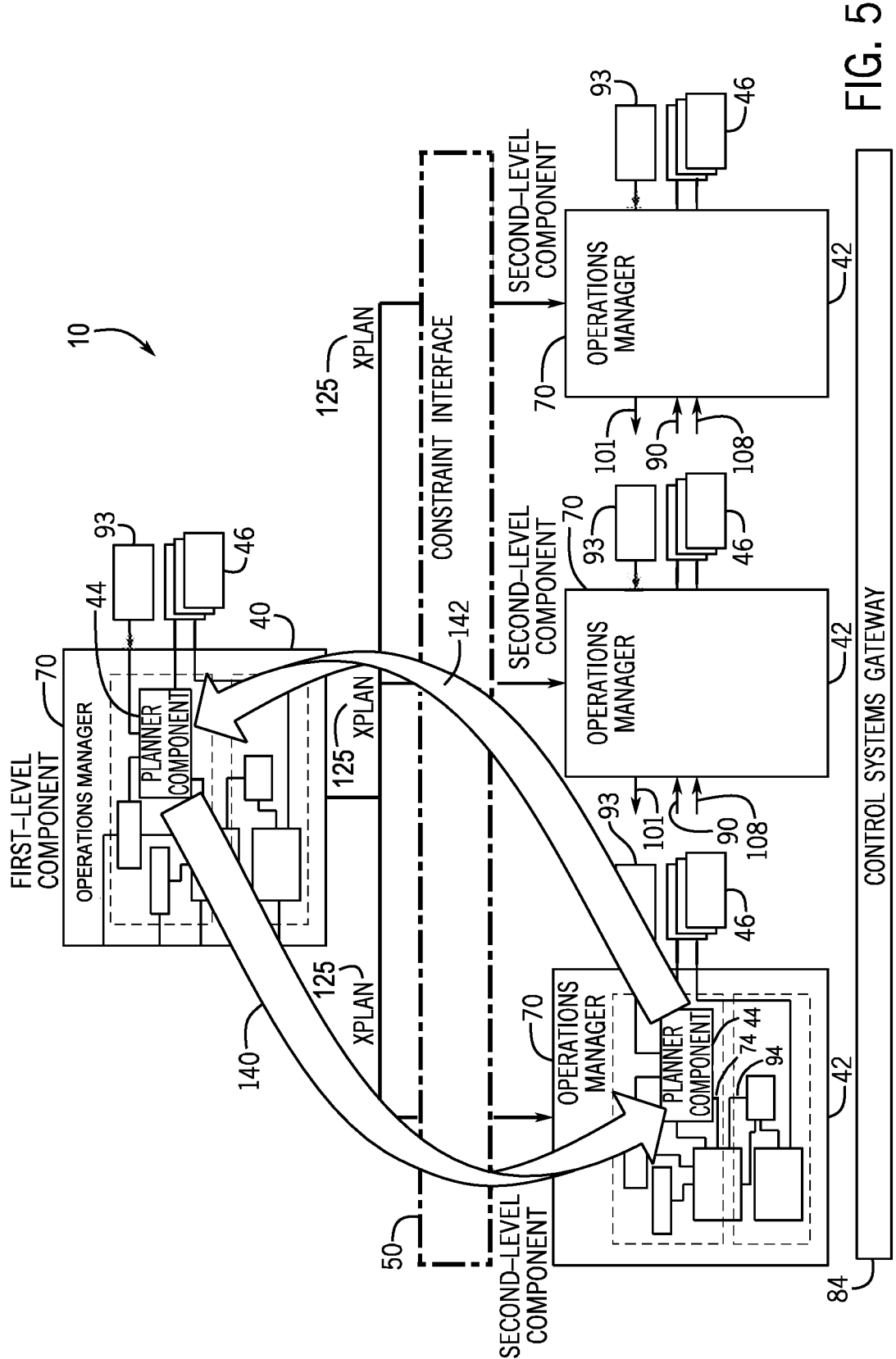
FIG. 5 is a block diagram of the planning system of FIG. 1 operating in the Estimation Mode, according to one or more embodiments of the present disclosure.
Figure 6:
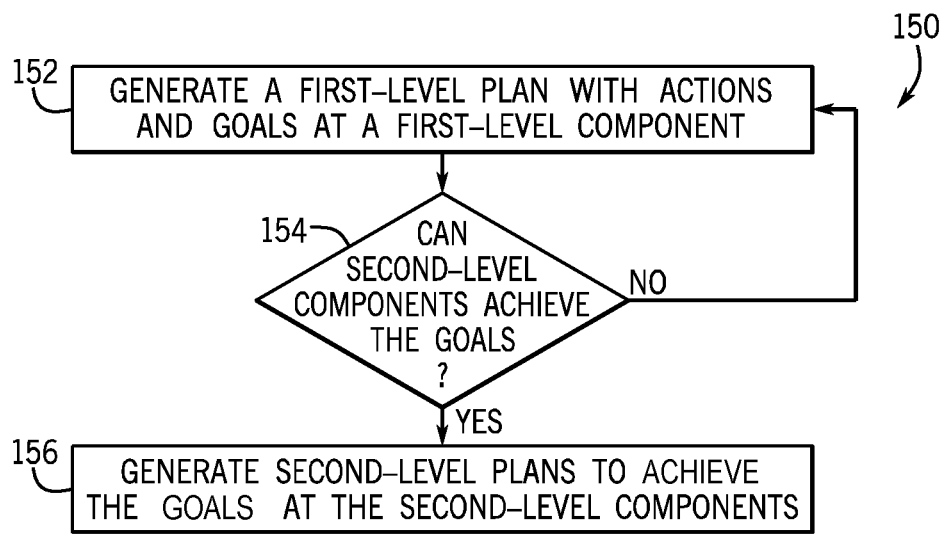
FIG. 6 is a flow diagram of a method for operating the planning system of FIG. 5 in the Estimation Mode, according to one or more embodiments of the present disclosure.

FIG. 5 is a block diagram of the planning system 10 of FIG. 1 operating in Estimation Mode, and FIG. 6 is a flow diagram of a method 150 for operating the planning system 10 of FIG. 5 in the Estimation Mode, according to an embodiment of the present disclosure. The method 150 may be performed by any suitable device or combination of devices that may generate first-level and second-level plans (e.g., at the first-level component 40 level and second-level component 42 level respectively) and determine whether second-level components 42 can achieve goals of the first-level plan. While the method 150 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 150 may be implemented by a processor, such as the processor 24 (FIG. 1). In alternative or additional embodiments, at least some steps of the method 150 may be implemented by any other suitable processor or control logic, for example one or more actuator control unit(s) 18, 20 (e.g., a drilling control unit and/or a mud control unit) and/or associated with additional equipment 99.

With reference to FIG. 5, in the deliberative control layer 72 (see, e.g., FIG. 3) of an operations manager 70 within each of the first-level component(s) 40 and the second-level components 42, the planner component 44 may generate a plan 74 (see, e.g., FIG. 3) using action models (e.g., drawn from a PDDL domain model received from the contextual gateway 93) associated with a specific area of responsibility of the respective first-level component 40 or second-level component 42. For example, with reference to FIGS. 5 and 6, the processor 24 (see FIG. 1) may generate (FIG. 6 process block 152) a first-level plan 74, via the operations manager 70 planner component 44 of the first-level component 40, with associated actions 97 and goals 112, 116 (see, e.g., FIG. 3) for the first-level component 40. The planner component 44 (e.g., of the first-level component 40) may confirm that the second-level components 42 implementing the generated plan 74 may achieve the respective goals, within appropriate constraints. For example, the processor 24 may determine (FIG. 6 decision block 154), via the planner component 44 of the first-level component 40, whether the second-level components 42 associated with the first-level plan 74 can achieve the effects or goals 112, 116 of the first-level plan. The first-level component 40 may include the highest-level domain model. The second-level components 42 may generate second-level (e.g., detailed) plans 74 to accomplish the first-level actions generated at the first-level component 40 level. For example, if the processor 24 determines that the second-level components 42 can achieve the goals 112, 116 of the first-level plan, the processor 24 may generate (FIG. 6 process block 156) the second-level plans 74, via the planner components 44 of the second-level components 42, to achieve the goals or effects of the first-level actions of the first-level plan.

By way of non-limiting example of the above, in the well construction context, a second-level component 42 related to the drilling control unit 18 may generate a second-level plan 74 that achieves the goals or effects of the first-level actions associated with drilling of the first-level plan. Similarly, a second-level component 42 related to the mud control unit 20 may generate a second-level plan 74 that achieves the goals or effects of the first-level actions associated with mud of the first-level plan.

If the processor 24 determines that the second-level components 42 cannot achieve the goals or effects 112, 116 of the first-level plan, the processor 24 may return to process block 152 (FIG. 6) to generate a new first-level plan based on capabilities of the second-level components 42 to determine whether its goals 112, 116 may be implemented by the second-level components 42.

Therefore, with reference to FIG. 5, there is a vertical communication 140, 142 between the first-level component 40 and the second-level components 42 in the planning system 10. In particular, the first-level component 40 may pass problem structures 140 to the second-level components 42, and the second-level components 42 may respond with feedback 142 that may include either "proofs" of feasibility (see, e.g., FIG. 11 at 282), where a proof of feasibility may be or include an XPlan 125, of the second-level constraints or goals 112, 116 imposed by the first-level component 40 (in the form of plans 74, 94) or a set of violated constraints. The set of constraints may be empty, may not be exhaustive, and/or may include out of memory and/or out of time error messages from the planner component 44.

The first-level component 40 may use the feedback 142 to identify constraints and resource demands. Plans 74 and constraints at the second-level component 42 level may be considered to be "estimates" of the resource demands of the second-level component 42 to meet the goals 112, 116 passed to it. As such, the planner component 44 of the first-level component 40 may determine whether the second-level components 42 can achieve the goals 112, 116 of the first-level plan by determining whether each second-level component 42 can meet the goals 112, 116 passed to it within the constraints and resource demands passed to it. Once a plan 74 is generated by the second-level component 42, it may be sent as an XPlan 125 back to the first-level component 40, as described further below with regard to the Overlay Stack Method (see, e.g., FIGS. 9 and 12), thereby allowing its constraints to be absorbed into the first-level plan. When the respective second-level components 42 have sent back their plans 74/125, the first-level component's planner component 44 (e.g., first-level planner component) may continuously monitor data from the data acquisition system 54 to determine whether the first-level plan is still intact to achieve its goals 112, 116.

While the present disclosure illustrates the planning system 10 as a two-level architecture (e.g., the first-level component 40 and the second-level components 42), as indicated above, it should be understood that any suitable number of levels is contemplated (e.g., with multiple first-level components 40, multiple levels of first-level components 40, multiple levels of second-level components 42, higher levels of components, multiple levels of higher-level components, and so on), and that a second-level component 42 may serve as first-level component 40 for yet another high-level (relative second-level) component.

In embodiments, the Estimation Mode may include two assumptions based on properties of domain models and goals. First, the hierarchy of the planning system 10 may have a downward refinement property, whereby, if an executable plan exists for a given goal set, then (with the possible exception of cases where there are fixed time bounds) a first-level plan exists for that goal set, and the first-level plan may be refined to second-level actions without returning to the first-level component 40 for plan adjustment (Estimation Mode Assumption 1). Second, the first-level component 40 may not set timed goals with hard upper or lower limits on the durations of activities. That is, time limits may be extended into the future, or shortened, as the Estimation Mode progresses (Estimation Mode Assumption 2). These two assumptions may be used in Estimation Mode when a plan is constructed before execution begins.

b. Overlay Stack Method

A modular, scalable method, called the Overlay Stack Method, may combine constraints coming from multiple, different second-level components 42 during planning in Estimation Mode. The Overlay Stack Method may result in a plan 74 that meets given constraints and is ready for dispatch. The plan 74 may then be revised/re-planned during execution. In certain cases, where minor timing modifications may be applied, revising a plan 74 may include rescheduling. Re-planning, which may be performed for more substantial modifications, may re-invoke the Estimation Mode and the Overlay Stack Method.

The multi-domain organization and orchestration of the Overlay Stack Method supporting decomposition allows each planning component in the decomposed architecture to be or include associated with its own domain, with dependencies between domains managed by the coordination of goals and constraints. This enables localized monitoring of execution and localized repair. The methods of the present disclosure devolve responsibility for different areas of expertise into different stand-alone subdomains. The methods of the present disclosure also integrate different areas of responsibility into a hierarchy coordinated from a supervisory level. Each planning component at each level of the presently disclosed architecture may operate as a supervisory component for the levels underneath it. In this way the methods of the present disclosure are scalable to many levels and many component domains.

With further reference to FIGS. 3 through 5, the Overlay Stack Method may define an interface (e.g., the constraint interface 50) between the first-level component 40 and the second-level components 42, which may provide two kinds of functionality in Estimation Mode. The first kind of functionality is the rough estimate request, which requests a rough estimate of time and resource demands for an action 97 from the first-level component 40. The rough estimate of time may correspond to an expected range of times in which the action 97 may be expected to be performed or completed. The first-level component 40 may provide the rough estimate based on prior knowledge or by communicating with a respective second-level component 42, depending on how the first-level component 40 is designed and whether the resource demands for the action 97 are context-dependent.

The second kind of functionality is the detailed estimate request, which is obtained by passing a set of timed goals and timeline constraints to a second-level component 42. The second-level component 42 may return a plan 74 demonstrating that the timed goals may be achieved in the context provided by the current state and timeline constraints. If a plan 74 may not be constructed in accord with the timeline constraints or other constraints, the second-level component 42 may return a message indicating that a goal was not met, which may include the constraints that could not be satisfied (e.g., it is not possible to achieve goal g by time t). The first-level component 40 may then attempt to revise the first-level plan or generate a new first-level plan by, for example, changing the goals 112, 116, constraints, or any other suitable parameter.

The first-level component 40 may construct an outline or a skeletal plan by using the rough estimate requests via the constraint interface 50 to second-level components 42. The skeletal plan may express the causal structure of the plan and identify periods of resource contention (e.g., where the same resources are requested) between the second-level components 42. The causal structure may remain unchanged as the estimate is refined, and no second-level component 42 may use a resource within periods in which that resource is in use by another second-level component 42 (in which case the resource is "locked-out"). These causal structures and the periods of resource contention may be expressed as timeline constraints on the second-level components 42 as part of a detailed estimate request.

The skeletal plan may include each action 97 for ensuring the correct causal structure of the complete plan 74, but the skeletal plan may be under-constrained by being based on a predicted current state (instead of a sensed current state as provided by the data acquisition system 54 in the Execution Mode) and therefore may be incorrectly or inaccurately organized in time. As such, while the skeletal plan could be dispatched, because of missing constraints the corresponding goal may not be met, resulting in computationally expensive re-planning efforts. Even if the skeletal plan met its goal, dispatching the skeletal plan would be likely to lead to inefficiency and unproductive time because the rough time estimates in the skeletal plan are uninformed. Therefore, the detailed estimate request may be used to obtain a more efficient and productive plan before execution.

After the skeletal plan is constructed, it may be developed into detail by requesting detailed estimates from each of the second-level components 42 in turn. The detailed estimates may be obtained by calling the second-level components 42 in an order determined by their inter-dependencies (e.g., in drilling a borehole, the detailed drilling component 42 may be called before the detailed mud component 42), which may be obtained by performing a dependency analysis on the domain models of the second-level components 42. To invoke a second-level component 42, the timeline of the current estimate (initially the skeletal plan) may be sent to the second-level component 42. The timeline may include a time window over which states are maintained, time points by which goals may be achieved, and spacers (e.g., temporal window constraints enforcing gaps, where particular resources are unavailable, between actions 97 in the second-level components' plan 74). Spacers primarily are used for communicating resource constraints between components at the same level, and spacers communicating horizontally, or timeline goals for vertical communication, are examples of resource constraints. The time window, time points, and spacers may be timed goals and/or timeline constraints expressed in PDDL.

Starting from an initial state, the first-level component 40 and the second-level components 42 may construct a plan 74 that is ready for dispatch. The development of the plan 74 may follow a forward direction: each second-level component 42 may decide which actions 97 to include in its respective plan 74, causing constraints to be imposed on the second-level components 42 that receive plans. When a second-level component 42 has completed its planning process, the constraints imposed by the resulting plan 74 may be added to the collection of constraints being accumulated by the first-level component 40. In other words, the first-level component 40 may build a stack of overlays, in which each second-level component 42 contributes a single "transparency." When each second-level component 42 has been consulted, the constraints present in the final overlay stack or final overlaid plan may be used to stretch, shrink and reschedule the first-level actions that were planned in the rough estimate phase. This may be possible because the Estimation Mode assumes the downward refinement property (with the possible exception of cases with fixed time bounds), so that first-level actions may not be sub-divided, and unforeseen first-level goals may be achieved without the need for additional actions in the first-level plan.

While the planning system 10, when operating in the Estimation Mode, attempts to determine a plan 74 that may address its corresponding goal, the planning system 10 may not attempt to perfect the plan 74 before execution because the information used to generate the plan 74 (e.g., the sensor information 86, the initial state 90, 108, and/or the like) may be refined and improved as execution proceeds. Additionally, rescheduling may accommodate for additional and/or later actions 97 by second-level components 42. As such, while rescheduling may be used after each second-level component 42 call in the Estimation Mode, re-planning may be used in the Execution Mode.

Because of the downward refinement property of the Estimation Mode (Estimation Mode Assumption 1), if a first-level plan is generated, then an associated second-level plan may be generated using the Overlay Stack Method. And because the first-level component 40 may not set timed goals with hard (e.g., fixed) deadlines in the Estimation Mode (Estimation Mode Assumption 2), a valid plan may be generated from the overlay stack when deadlines and resource bounds are relaxed. If hard deadlines or resource limitations imposed on a plan 74 (e.g., violating Estimation Mode Assumption 2) do not hold, then the goals 112, 116 being addressed during an overlay iteration may be over-constrained, leading to the goals 112, 116 not being met. In such cases in which retiming the overlay stack is insufficient to resolve these constraints, the first-level component 40 may refine the first-level plan or generate a new first-level plan by, for example, changing the goals 112, 116, constraints, or any other suitable parameter.

Figure 8:
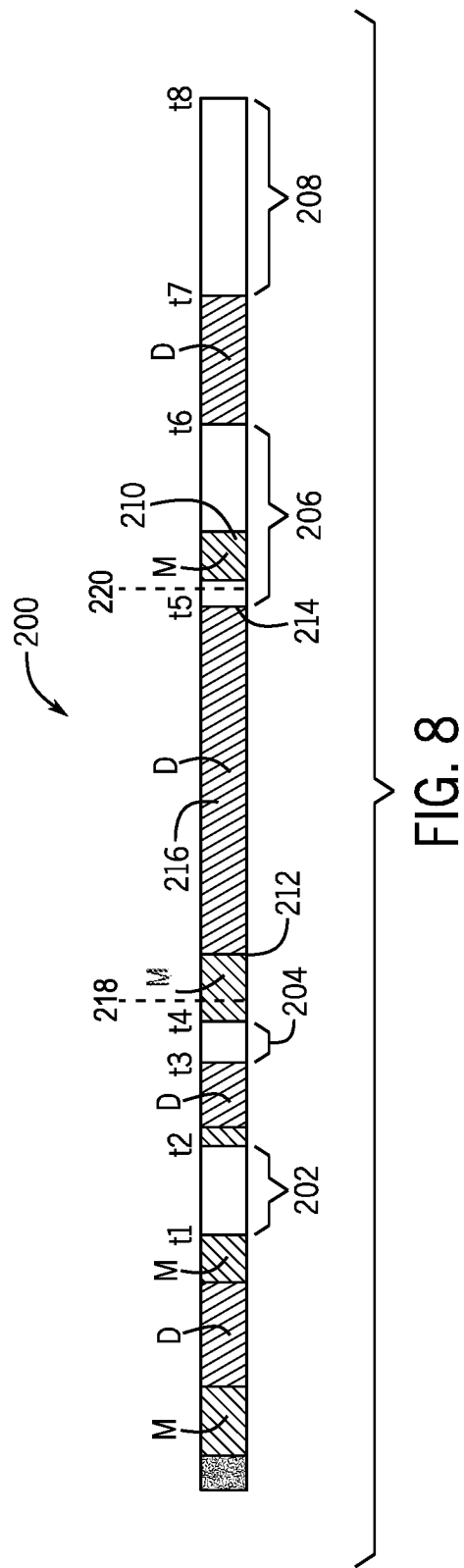
FIG. 8 is a timing diagram of a rough estimate or abstract plan to be refined by performing an Overlay Stack Method in the Estimation Mode, according to one or more embodiments of the present disclosure.
Figure 9:
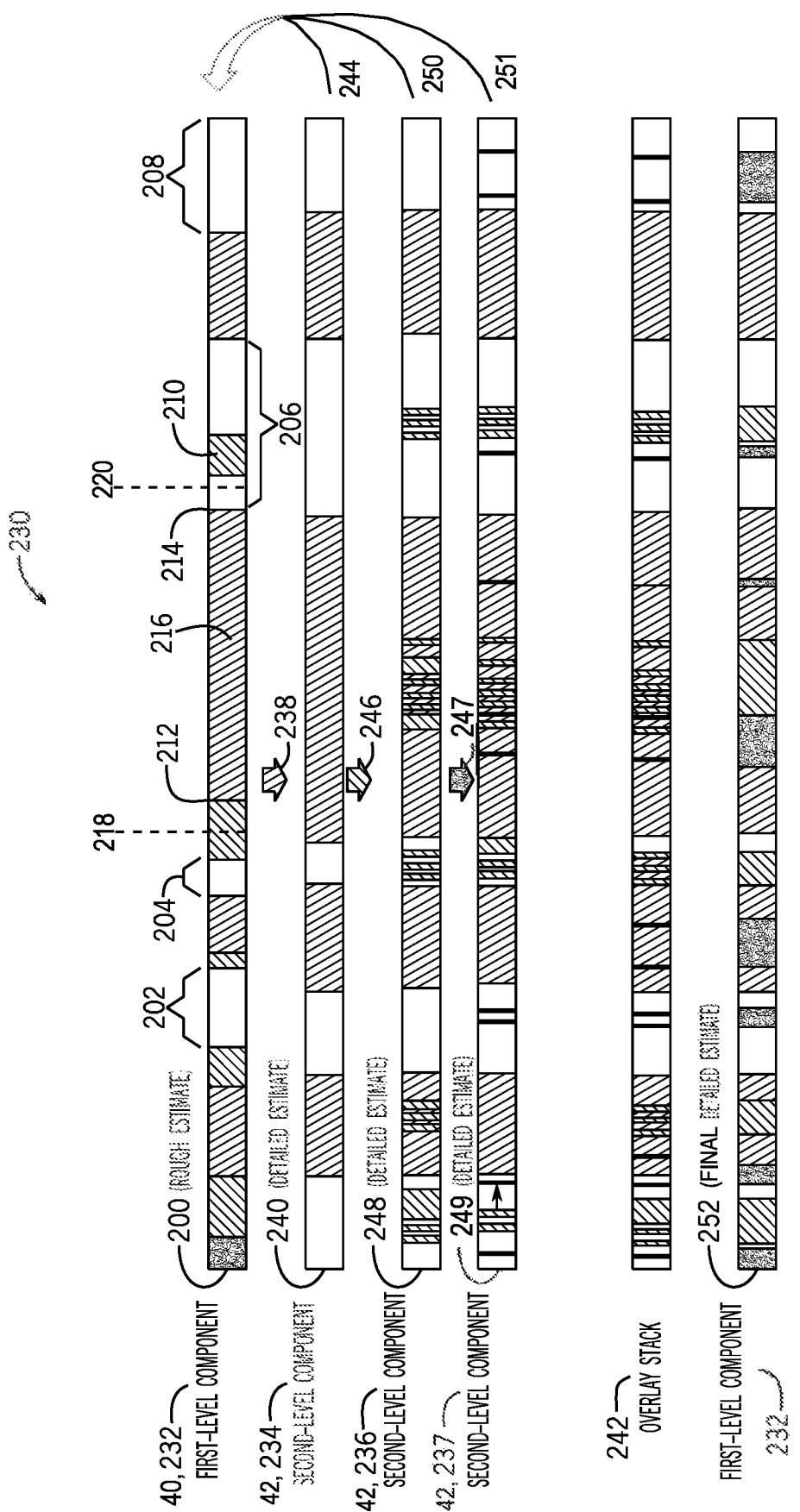
FIG. 9 is a diagram illustrating a sequence of stages involved in performing the Overlay Stack Method in the Estimation Mode on the rough estimate or abstract plan of FIG. 8, according to one or more embodiments of the present disclosure.

FIG. 8 is an exemplary timing trace of a rough estimate plan 200 for performing an Overlay Stack Method (e.g., process block 304 of FIG. 12) in Estimation Mode, according to an embodiment of the present disclosure. FIG. 9 is a diagram illustrating an example 230 of performing an Overlay Stack Method 304 being applied to the rough estimate plan 200 of FIG. 8, according to an embodiment of the present disclosure.

With reference to FIG. 9, an Overlay Stack Method 304 may be performed, for example, wherein a rough estimate 200 of a first-level component 40, 232 may be representative of planning at a higher level that coordinates operations of other components (e.g., a detailed estimate 240 of a first second-level component 42, 234). The first second-level component 234 detailed estimate 240 may be representative of planning for a first subcontractor level (e.g., drilling "D" in the exemplary drilling-context timing trace of a rough estimate plan 200 of FIG. 8), a second second-level component 42, 236 detailed estimate 248 may be representative of planning at a second subcontractor level (e.g., mud management "M" in the exemplary drilling-context timing trace of a rough estimate plan 200 of FIG. 8), and a third second-level component 42, 237 detailed estimate 249 may be representative of planning at an additional subcontractor level for another second-level component 42.

With reference to the generally applicable FIG. 9, and by way of example in a well construction context, the first-level component 40, 232 may determine or receive a goal 112, 116 (see FIG. 3) of drilling a well (e.g., where an initial state includes a site that is ready for drilling activities to commence but in which there is no hole). The first-level component 232 may generate a rough estimate plan 200 to drill the well. The first-level component 232 may then call 238 a first second-level component 42 in the dependency chain, the first second-level component 234, and send it the timed goals and timeline constraints (e.g., 216) that represent the drilling actions 97 (see FIG. 3) in the rough estimate plan 200. In this example, the first second-level component 234 may be the first second-level component 42 in the dependency chain because the other second-level components 42 depend on the actions 97 of the first second-level component 234 (e.g., when drilling activities are performed and/or completed). The first-level component 40, 232 may request a detailed estimate 240 from the first second-level component 42, 234, ultimately resulting in developing the rough estimate plan 200 into a final level of detail 252 appropriate for execution.

Rough estimate 200, detailed estimates 240, 248, 249, overlay stack 242, final detailed estimate 252, plans 74, 94 and an XPlan 125 may be referred to generally, individually, and/or collectively as plans or XPlans.

In particular, the bracketed regions 202, 204, 206, 208 correspond to periods of activity or actions of second-level components 42 other than the first second-level component 234 (e.g., the second second-level component 236) that may contend for one or more resources of the application (e.g., if a well, for casing, cementing, and/or the like). As shown in FIGS. 8 and 9, the time points, t1 to t8, represent the points at which these locked out periods or actions 202, 204, 206, 208 are expected, by the first-level component 232, to start and end. For example, the period 206 is locked out to the first second-level component 234, but not to the second second-level component 236, which has a period 210 of activity in parallel with it. The locked-out periods 202, 204, 206, 208 may be interpreted as spacers by the first second-level component 234. The lengths of these periods 202, 204, 206, 208 may not change in the construction of the first second-level component 234 detailed estimate 240, but the periods 202, 204, 206, 208 may be shifted on the rough estimate plan 200 during the detailed estimate phase, as shown.

With continued reference to FIG. 9, and by way of non-limiting example, drilling or other activities may be planned in detail by the first second-level component 234. In particular, the first second-level component 234 may move the starts (e.g., 212) and ends (e.g., 214) of its periods (e.g., 216) of activity, as long as the spacers (e.g., 204 and 206) are placed between the first second-level component's 234 regions of activity and are of at least the specified length (e.g., t4-t3 for 204 and t6-t5 for 206). In other words, in embodiments, the respective second-level component 42 (e.g., 234, 236, 237) may move start and end times (e.g., 212, 214) of its periods (e.g., 216) of activity of the first-level plan to generate an overlaid plan or overlay stack 242, as long as spacers (e.g., 204, 206) placed between the respective second-level component's 42 regions of activity are maintained (e.g., t4-t3 for 204 and t6-t5 for 206, see FIG. 8).

As illustrated, no bound is placed on the length of the rough estimate plan 200. The detailed estimate plan 240 generated by the first second-level component 234 may become a first layer of an overlay stack 242 by overlaying 244 the detailed estimate plan 240 on the rough estimate plan 200 (see also process block 304 of FIG. 12).

The first-level component 40, 232 may then generate 246 timeline constraints for the next second-level component 42 in the dependency chain (e.g., the second second-level component 236). Specifically, for example, the first-level component 232 may send 246 timeline constraints to the second second-level component 236, requesting from the second second-level component 236 a detailed estimate 248 of the work involved in supplying the drilling periods (e.g., 216) with mud. The second second-level component 236 may receive and/or view the rough estimate plan 200 to schedule effective use of the mud system (e.g., via a mud control unit 20) to achieve the goals implied by the arrangement of the drilling activities (e.g., 216). As the second second-level component 236 determines and details its goals 112, 116 in detail, the second second-level component 236 may generate actions (e.g., 210) that spread or burst across the rough estimate plan 200, meaning that not all of the detailed activity (e.g., 210) associated with a first-level action (e.g., 206) may fit within the bounds marked by the first-level action. Each period of activity or action 210 planned by the second second-level component 236 may fit within the boundaries of the actions 206 planned by the first-level component 232, but there may be flexibility about which first-level actions 210 bound which detailed actions 206.

The second second-level component 236 may return 250 the second-level detailed estimate or plan 248 that achieves each of its goals under the constraints given. The second-level detailed estimate or plan 248 may be disposed or positioned on top of the overlay 242 generated by the first second-level component 234 and the rough estimate plan 200 (e.g., resulting in the overlay stack 242). If the second-level detailed estimate or plan 248 is not determined (e.g., because of excessive constraints), the second second-level component 236 may return an indication of an unmet goal and/or a set of unsatisfiable constraints including timeline constraints. Under Estimation Mode Assumptions 1 and 2 discussed above, the first-level component 232 may reschedule to relax or reduce these constraints by moving the drilling actions (e.g., 216) along the rough estimate plan 200.

When the second second-level component 236 has completed a successful overlay 250, the first-level component 232 may then generate the timeline constraints for the next second-level component 42. Each second-level component 42 call may be an iteration in the Estimation Mode process. For example, a third second-level component 42, 237 may be called 247 to generate a further refined detailed estimate 249, a next overlay 251 to the rough estimate plan 200, leading to another layer in the overlay stack 242. There may be any suitable number of iterations or calls to second-level components 42 to produce the final detailed estimate or dispatchable plan 252. That is, the number of second-level components 42 may not be a limiting factor on the number of iterations.

The overlay stack 242 may ensure that second-level activity (e.g., 216) of a second-level component 42 (e.g., the first second-level component 234) lies within the boundaries of first-level actions belonging to the second-level component 42 on the first-level component 40 (e.g., the first-level component 232) timeline. That is, although a second-level component's 42 activity might spread or burst over the whole timeline of the rough estimate plan 200 (where the second-level component 42 may plan to ensure that it can meet both immediate and future commitments), the second-level component 42 may do so within the boundaries that the first-level component 40 recognizes as higher-level actions. The first-level component 40 may not be concerned with what is inside those boundaries, but with the constraint that a second-level component 42 act strictly within them. This may enable the first-level component 40 to confidently manage coordination and locking of resources. That is, the Overlay Stack Method 304 illustrated in example 230 enables a second-level component 42 to shift actions (e.g., 216) that are relevant to achieving future goals earlier or later on the timeline, as long as the actions remain within the boundaries imposed by the first-level component 40.

As new second-level components 42 are introduced, the planning domain used by the first-level component 40 may be extended to contain abstractions of the second-level components' 42 activities. Additionally, if abstractions already exist, they may be connected to the new second-level components 42. The first-level component 40 may generate a first-level action that accounts for the new second-level components' 42 effects or impacts on first-level plans, the timeline, etc. Similarly, the first-level component 40 may have a first-level representation of the resource lock that prevents two second-level components 42 from using the same resource at the same time.

After each iteration or second-level component call (e.g., 238, 246, 247), the first-level component 40 may confirm that each constraint introduced by a respective second-level component 42 on that iteration is satisfied by rescheduling where possible to reduce unproductive time. The overlay stack 242, after the last iteration, represents the complete or fully tightened version of the entire constraint set 252.

Because the first-level component 40 may not set timed goals with hard deadlines in the Estimation Mode, minor retiming may accommodate new constraints without having to re-plan. This is because, as long as there is no time limit, any suboptimal choice of action by the first-level component 40 or the second-level components 42 may be mitigated, possibly by introducing additional actions 97 in one or more second-level component iterations. When the overlay stack 242 is complete, e.g. in the form of a final detailed estimate 252, the Estimation Mode is complete, and the planning system 10 may perform the Execution Mode.

Figure 10:
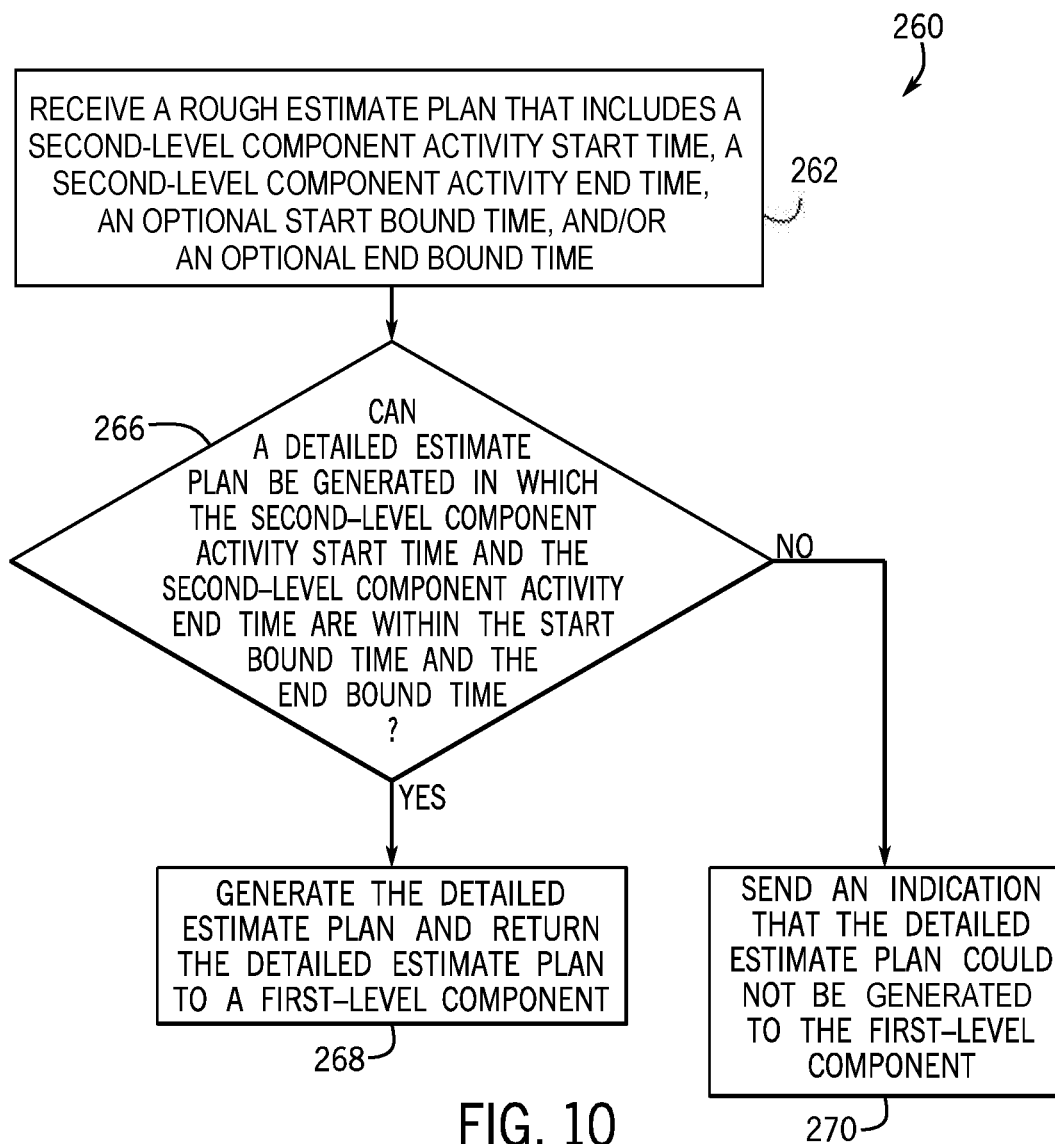
FIG. 10 is a flow diagram of aspects of the Overlay Stack Method in the Estimation Mode, according to one or more embodiments of the present disclosure.

FIG. 10 is a flow diagram of aspects of an Overlay Stack Method 260 (e.g., process block 304 of FIG. 12) in the Estimation Mode, according to an embodiment of the present disclosure. In particular, FIG. 10 illustrates generation of a second-level plan or an indication that the second-level plan could not be generated from the respective second-level component 42 (see, e.g., FIG. 11 proof of feasibility 282 and FIG. 12 process block 296 (each discussed below)). The method 260 may be performed by any suitable device or combination of devices that may receive rough estimate plans and detailed estimate plans. While the method 260 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 260 may be implemented by a second-level component 42. In alternative or additional embodiments, at least some steps of the method 260 may be implemented by any other suitable component or control logic, for example the first-level component 40 or the processor 24.

The second-level component 42 may receive (FIG. 10 process block 262) a rough estimate plan 200 that includes a second-level component activity start time, a second-level component activity end time, a start bound time, and/or an end bound time. For example, as illustrated in FIGS. 8 and 9, the first-level component 40, 232 generates the rough estimate plan 200, which includes a second-level component 42 activity start time 212 and a second-level component activity end time 214. In embodiments, the rough estimate plan 200 also may include timeline constraints in the form of a start bound time 218 and/or an end bound time 220 (e.g., FIGS. 8-9). (As indicated above, the downward refinement property of Estimation Mode Assumption 1 holds subject to possible imposition of time bounds, e.g., a start bound time 218 and an end bound time 220.) Each second-level component 42 may then receive the rough estimate plan 200. For example, as illustrated in FIG. 9, the first second-level component 234 receives 238 the rough estimate plan 200 from the first-level component 232, the second second-level component 236 receives 246 the rough estimate plan 200 from the first-level component 232, and the third second-level component 237 receives 247 the rough estimate plan 200 from the first-level component 232.

The second-level component 42 may then determine (FIG. 10 decision block 266) whether a detailed estimate plan (e.g., 240, 248, 249) may be generated in which the second-level component 42 activity start time 212 and the second-level component 42 activity end time 214 are within the start bound time 218 and the end bound time 220. For example, as illustrated in FIG. 9, to generate the detailed estimate time 240, the first second-level component 234 may shift the second-level component activity start time 212 and/or the second-level component activity end time 214 to meet its goals. The first second-level component 234 may determine whether the shifted second-level component activity start time 212 and/or the second-level component activity end time 214 are within the start bound time 218 and end bound time 220 (if any).

If the second-level component 42 determines that the detailed estimate plan can be generated within the timeline constraints, then the second-level component 42 may generate (FIG. 10 process block 268) the detailed estimate plan and returns the detailed estimate plan to a first-level component 40. For example, as illustrated in FIG. 9, the first second-level component 234 generates the detailed estimate plan 240 and sends 244 the detailed estimate plan 240 back to the first-level component 232. If the second-level component 42 determines that the detailed estimate plan cannot be generated within the timeline constraints, then the second-level component 42 may send (FIG. 10 process block 270) an indication of an unmet goal to the first-level component 40. For example, as illustrated in FIG. 9, if the first second-level component 234 cannot generate the detailed estimate plan 240 within the timeline constraints, the first second-level component 234 may send an indication to the first-level component 232 that the detailed estimate plan 240 could not be generated. In some embodiments, the second-level component 42 may also send a set of constraints found to be unsatisfiable, including timeline constraints, to the first-level component 40.

As noted, the steps 262-270 may be performed for each second-level component 42 (e.g., for each iteration), and any suitable number of iterations is contemplated. Moreover, while one second-level component activity is discussed in association with the second-level component activity start time, the second-level component activity end time, and/or a start bound time and end bound time (if any), it should be understood that any number of second-level component activities may be contemplated in performing the Overlay Stack Method 304, including as described in embodiments with reference to FIG. 9 (e.g., overlay stack 242, 252) and FIG. 10 (e.g., method 260).

Figure 11:
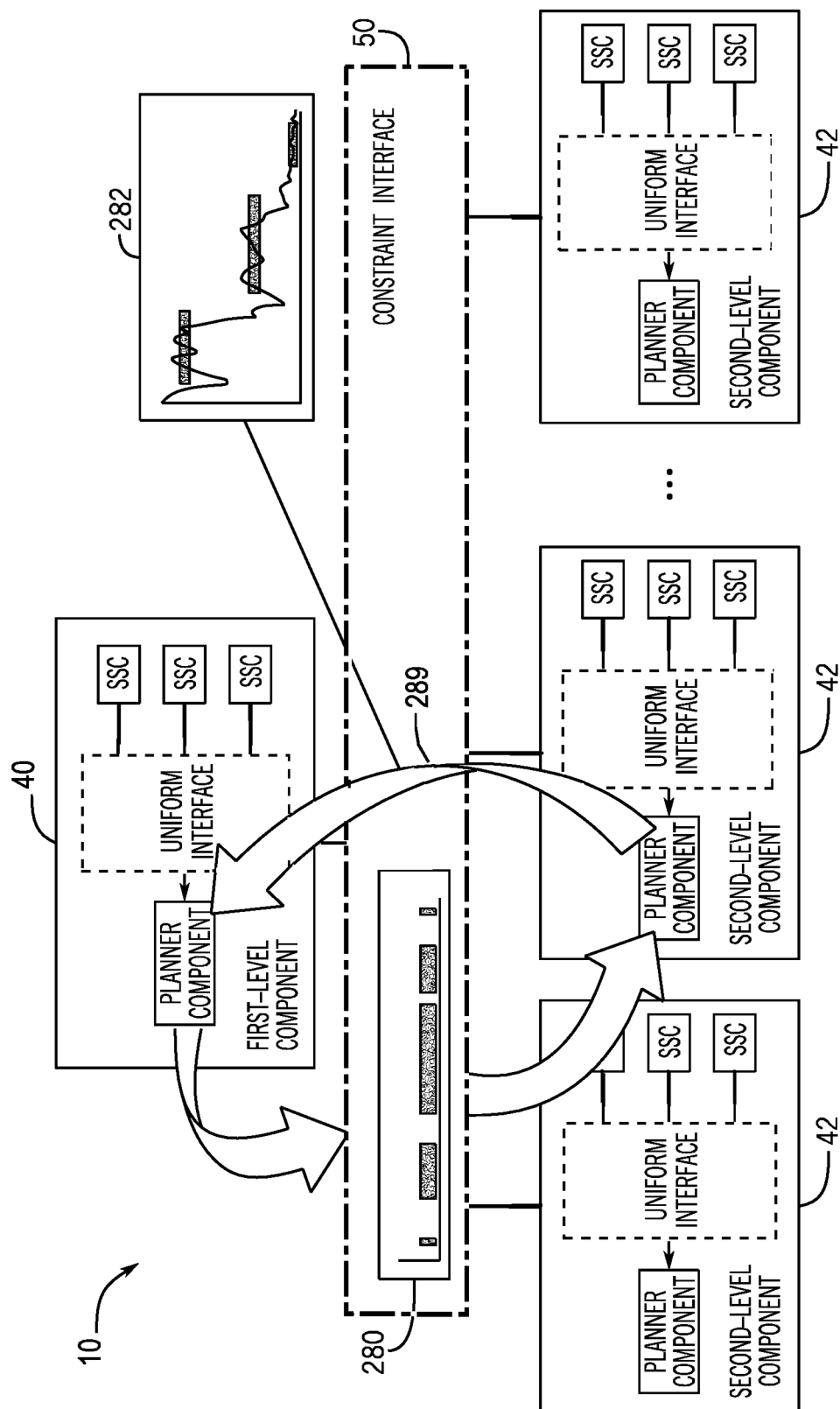
FIG. 11 is a block diagram of the planning system performing the Overlay Stack Method in Estimation Mode, according to one or more embodiments of the present disclosure.

FIG. 11 is a block diagram of the planning system 10 performing the Overlay Stack Method in Estimation Mode, according to an embodiment of the present disclosure. In Estimation Mode, upon receiving its timeline constraints 280 from the first-level component 40 through the constraint interface 50, each second-level component 42 may generate an initial state that captures the spacers, time windows, and timed goals that are relevant to its activity (e.g., FIG. 9 at 238, 246, 247). The second-level component 42 may then determine its plan to achieve its timed goals within these constraints (e.g., FIG. 9 at 240, 248, 249). A proof of feasibility 282 (e.g., an XPlan 125 of FIGS. 4-5 and/or a final detailed estimate XPlan 252 generated from timeline constraints in FIG. 9) is sent back 289 by the second-level component 42 to the first-level component 40 (e.g., FIG. 9 at 244, 250, 251) respecting the timeline constraints 280, to first-level component 40 through the constraint interface 50.

2. Execution Mode
a. General

Figure 7:
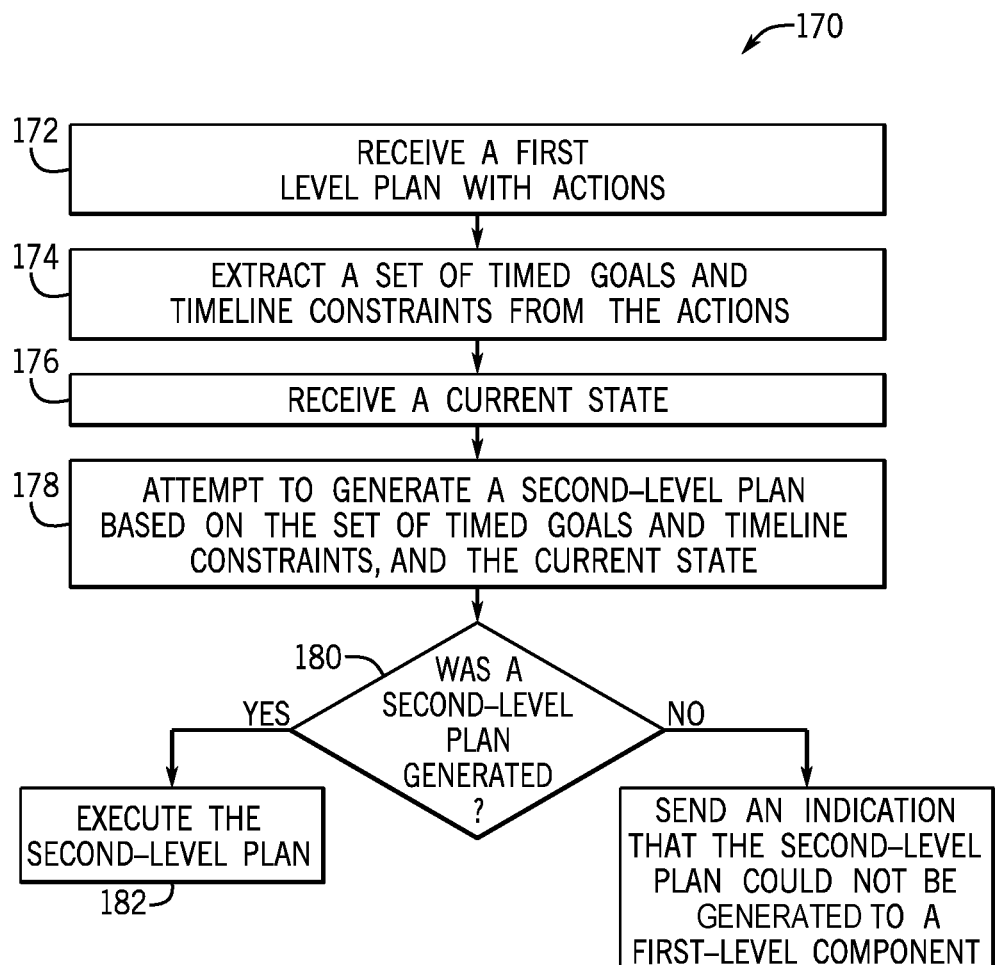
FIG. 7 is a flow diagram of a method for operating the planning system of FIG. 2 in Execution Mode, according to one or more embodiments of the present disclosure.

After the Estimation Mode is completed, the planning system 10 may enter the Execution Mode. FIG. 7 is a flow diagram of a method 170 for operating the planning system 10 of FIG. 2 (for example) in the Execution Mode, according to an embodiment of the present disclosure. The method 170 may be performed by any suitable device or combination of devices that may extract timed goals and timeline constraints from first-level plans, generate a second-level (e.g., detailed) plan based on the timed goals, timeline constraints, and a current state, execute the second-level plan, and send an indication that a goal cannot be met to a first-level component. While the method 170 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 170 may be implemented by a second-level component 42. In alternative or additional embodiments, at least some steps of the method 170 may be implemented by any other suitable component or control logic, for example the first-level component 40, the processor 24, one or more actuator control unit(s) 18, 20 and/or additional equipment 99.

In the Execution Mode, with reference to FIGS. 2-5, 7, and 9, the finished first-level plan 74, 94, 252 (e.g., expressed as an XPlan 125), which may be a result of the Estimation Mode, may be dispatched via the reactive plan execution layer 76 instantiated in the first-level component 40. As such, the second-level component 42 may receive (FIG. 7 process block 172) the finished first-level plan 74, 94, 252 including actions 97 from the first-level component 40.

When a first-level action 97 is dispatched (which may be identified by a corresponding software module for the action) by dispatcher 96, if the action 97 is an abstract action corresponding to an activity corresponding to a second-level component 42, then the relevant second-level component 42 may extract its set of timed goals and timeline constraints from the XPlan 125. For example, the second-level component 42 may extract (FIG. 7 process block 174) the set of timed goals and timeline constraints from the first-level actions. Thus, the second-level component 42 may re-initiate planning, but now at the second-level component level, focusing on addressing the goals (e.g., goals 112, 116) that are the responsibility of that second-level component 42.

There may be more constraints in the Execution Mode than in the Estimation Mode, as each second-level component 42 may have access to more precise sensor information 86 as received from the data acquisition system 54 (compared to predicted state information as received during the Estimation Mode), may receive start and end bounds (218 and 220) from the Estimation Mode, and/or may be called upon to satisfy more constraints than is possible in the abstract level. In the Execution Mode, the constraints on the first-level action (e.g., FIG. 4 XPlan 125) may be consistent with those imposed by the original plan 74 sent by the same second-level component 42 in Estimation Mode (e.g., FIG. 9 final detailed estimate 252).

Alternatively, when a first-level action 97 is dispatched (which may be identified by a corresponding software module for the action) by dispatcher 96, if the action 97 is not an abstract action corresponding to an activity corresponding to a second-level component 42, then it will be dispatched directly to the control systems gateway 84 (see, e.g., discussion below regarding FIG. 13 blocks 314-328).

The current initial state of the planning system 10 may be supplied to the second-level component 42 by the inference system 52 based on the sensor information 86 received from the data acquisition system 54, and thus may be more accurate than the predicted state used in the Estimation Mode. For example, the second-level component 42 may receive (FIG. 7 process block 176) a current state 90, 108. The second-level component 42 may attempt to build the plan 74 using the inferred initial state predicted during the Estimation Mode. For example, the second-level component 42 may attempt (FIG. 7 process block 178) to generate a second-level plan based on the set of timed goals and timeline constraints, and the current state at the second-level component 42. If successful, the second-level component 42 may send the corresponding XPlan 125 to its respective dispatcher 96 for execution.

For example, the second-level component 42 may determine (FIG. 7 decision block 180) whether the second-level plan was generated. If so, the second-level component 42 may execute (FIG. 7 process block 182) the second-level plan. If no plan can be constructed from the current state that meets these constraints, then the second-level component 42 may pass an indication 120 of an unmet goal back to the first-level component 40 for reporting, and, if possible, the set of unsatisfiable constraints which explain the unmet goal. For example, if the second-level component 42 determines that the second-level plan was not generated, the second-level component 42 may send (process block 184) an indication of a goal that cannot be met to the first-level component 40. In some embodiments, the second-level component 42 may send an indication that the second-level plan could not be generated to the first-level component 40. The first-level component 40 may then attempt to revise the first-level plan or generate a new first-level plan by, for example, changing the goals 112, 116, constraints, or any other suitable parameter.

An XPlan 125 (see FIGS. 4 and 5) may include annotations for use by the dispatcher 96 to ensure that executing the XPlan 125 may occur concurrently and asynchronously with the dispatch of the first-level plan and/or other second-level plans. Thus, each dispatcher 96 (e.g., of the first-level component 40 and each second-level component 42) may dispatch its own XPlan 125 (to its respective execution and monitoring component 80), using the annotations in the respective XPlans 125 to constrain timing of activity (resulting in correct interleaving of execution across the planning system 10) and/or to set up monitors to ensure that local and global constraints are not violated.

As in the Estimation Mode, in the Execution Mode constraints may be passed between the first-level component 40 and the second-level components 42 through the constraint interface 50 (see, e.g., FIGS. 2, 4-5, 11). The constraint interface 50 may support passing of timed goals and timeline constraints (e.g., FIG. 11 at 280) in the downward direction (e.g., from the first-level component 40 to a second-level component 42), and plans or proofs of feasibility (e.g., FIGS. 4-5 at 125, FIG. 11 at 282) in the upward direction (e.g., from a second-level component 42 to the first-level component 40).

Timeline constraints may express requirements to be met by a second-level component 42 over the whole timeline of the first-level plan. Timed goals may include all of the goals to be achieved by a second-level component 42 over the whole timeline. If timed goals are infeasible, indications of unmet goals and explanations can be passed upward through the constraint interface 50. Each constraint may be expressible in a modal metric temporal logic language.

Unmet goals may occur during Execution Mode when an attempt to achieve a goal 112, 116 times out or the inference system 52 reports that a monitored constraint has been violated. In these cases, the inference system 52 may receive and interpret the sensor data or signals 86 and determine a new (e.g., current) state 90, 108. In particular, the sensor data or signals 86 may be received from the actuator control unit(s) 18, 20 (e.g., a drilling control unit 18, a mud control unit 20), and/or any additional equipment 99. Re-planning may then be initiated based on the new states 90, 108 as determined via the sensor data or signals 86, first at the second-level component 42 level responsible for the unmet goal (e.g., at which the goal was not met), and then, if the second-level component 42 is unable to find a plan 74 (e.g., for re-planning), at the first-level component 40 level.

The Execution Mode may include two assumptions between the first-level component 40/second-level components 42 and the inference system 52. First, unmet goals may be triggered by detection of a violated invariant specified in an XPlan 125 (e.g., by a respective execution and monitoring component 80), and recognized and flagged to the appropriate first-level component 40 or second-level component 42 by the inference system 52 (Execution Mode Assumption 1). A violation may be detected as a FailedBy condition (see, e.g., FIG. 22 at 598, FIG. 23 at 508). Second, if re-planning is triggered during Execution Mode, the inference system 52 may receive sensor information 86 from the data acquisition system 54 and interpret one or more new initial states (e.g., FIG. 3 at 90) to send to the first-level component 40 and the second-level components 42. The first-level component 40 and the second-level components 42 may then generate actions 97 for a new plan 74 that moves the planning system 10 out of the unmet goal state (Execution Mode Assumption 2).

With reference to FIGS. 3 and 4, during the execution of an XPlan 125, action 97 starts and ends may be dispatched via dispatcher 96 as they are authorized (e.g., AuthorizedBy conditions, see FIG. 22 at 496, FIG. 23 at 560), subject to unmet goal condition monitors (e.g., housed in an execution and monitoring component 80, see FIG. 3) that may monitor and/or indicate 120 when actions and/or goals of the plan 252 (e.g., FIG. 9) are not performed and/or met. The monitors may be set up by the execution and monitoring component 80 and then activated, subject to ConfirmedBy/AuthorizedBy indicators (e.g., FIG. 22 at 496 for ActionStarts and FIG. 23 at 560 and 562 for ActionEnds) that indicate when actions 97 of the plan 94 being dispatched are confirmed/authorized).

With continuing reference to FIGS. 3-4, and as discussed further below with regard to FIG. 13 (e.g., decision block 314 and process block 316), certain first-level actions 97 that may be concrete or performed "as is" by the control systems gateway 84 directly may be unpacked and sent as second-level actions or commands 82 to be executed by the control systems gateway 84. When an action 97 is first-level and not yet concrete, the action 97 may be sent to a corresponding second-level component 42, complete with the associated XPlan 125, 252 (FIGS. 4-5, 9), so that the relevant timed goals and timeline constraints may be extracted at the second-level component 42. The first-level component's 40 XPlan 125, 252 (e.g., first-level XPlan) may include a plan of activity to achieve a first-level goal, such that it includes information for extracting spacers, timed goals, and time windows throughout a timeline of the plan.

With reference to FIGS. 2 and 4, following planning in the Estimation Mode, the first-level plan for execution in the Execution Mode (e.g., the first-level component 40, 232 final detailed estimate 252 (FIG. 9)) may be a refinement of the skeletal plan (e.g., the first-level component 40, 232 rough estimate 200 (FIG. 9)), in which the first-level actions respect each of the second-level component 42 constraints, have proper durations, and are placed in approved positions on the timeline.

In Execution Mode, with reference to FIGS. 3-5 and 9, having constructed a plan 252/XPlan 125, each second-level component 42 may submit its XPlan 125 dispatch through its own dispatcher 96. This dispatch may happen in parallel with the first-level component 40 and other second-level components 42 dispatching their own actions 97. Synchronization of the dispatching may be achieved transparently via authorization and confirmation of conditions. This may support asynchronous dispatch of actions by different second-level components 42. The plan may then be executed through the control systems gateway 84 and/or by the execution systems (e.g., processor 24, actuator control unit(s) 18, 20, additional equipment 99, and/or the like).

b. Unmet Goals and Re-Planning

As described above, in embodiments, multi-domain planning may be performed in Estimation Mode, and execution and monitoring of the multi-domain plan may be performed in Execution Mode. These Estimation and Execution Modes may be interleaved via re-planning in Estimation Mode, as described below.

During the dispatch and execution of a plan, a goal may not be met or achieved (see, e.g., FIG. 3 indication 120 of an unmet goal). The unmet goal may be detected (e.g., as a FailedBy condition, see FIG. 22 at 498, FIG. 23 at 508) as an action timing out, an invariant condition (e.g., an unmet goal condition) being violated during an interval over which the condition is being monitored via the execution and monitoring component 80, and/or the like. XPlan annotations may ensure that any plan under execution is suspended as soon as an unmet goal is detected. The first-level component 40 or second-level component 42 that dispatched via dispatcher 96 the action 97 causing the unmet goal (e.g., discovered as being unmet by the execution and monitoring component 80 and returned) may then re-plan in Estimation Mode. However, the execution system (e.g., control systems gateway 84, processor 24, actuator control unit(s) 18, 20, additional equipment 99, and/or the like) may first stop executing the current plan.

With reference to FIG. 3, when a second-level action 97 is dispatched, the execution and monitoring component 80 of the respective second-level component 42, in which a goal was not met, may send an unmet goal package to the first-level component 40, along with the unpacked action. The unmet goal package may specify what the first-level component 40 should do in the event of not being able to achieve a safe state in which the planning system 10 may remain while re-planning takes place. During a re-planning activity within the first-level component 40 or the second-level component 42, all other actions, within the first-level component 40 and the second-level components 42, may await authorization and/or confirmation before they may be dispatched.

For example, with reference to FIG. 4, in Execution Mode a second-level component 42 may be dispatching its plan when an unmet goal condition (e.g., a FailedBy condition) becomes true. As a result, with a return to Estimation Mode, the second-level component 42 may attempt to re-plan from the state provided by the inference system 52 (e.g., a current state 90, 108). Each second-level component 42 may re-plan locally, as long as plan decisions do not affect or are "invisible" to the first-level component 40 (such that the respective second-level plan may be adjusted without the first-level component 40 having to adjust the first-level plan). While the second-level component 42 is re-planning, no actions of other second-level components 42 (or the first-level component 40) may be dispatched that depend on authorization or confirmation (discussed further with reference to FIGS. 22-25 below) of conditions achieved by the second-level component 42. As soon as a second-level component 42 is unable to complete a re-plan without changing something that affects or is "visible" to the first-level component 40 (such that adjusting the respective second-level plan results in the first-level component 40 having to adjust the first-level plan), the re-plan may be sent to the first-level component 40. If the first-level component 40 re-plans, then the Overlay Stack Method may be re-invoked and each of the second-level components 42 may re-plan.

In some embodiments, rescheduling may be used as part of re-planning to shift or move actions along the timeline (e.g., embodied in XPlan 252 (FIG. 9)) to improve the efficiency of a plan without violating constraints. Similar to re-planning, a second-level component 42 may reschedule (or retime) to fix local timing discrepancies that are invisible to the first-level component 40. If rescheduling affects the timeline constraints sent to the second-level component 42 by the first-level component 40, then those changes are visible to the first-level component 40, and rescheduling is performed at the first-level component 40 level. If the first-level component 40 reschedules in the Execution Mode, then each second-level component 42 may reschedule to ensure consistency with the new timeline generated by the first-level component 40.

The present disclosure illustrates communication occurring both in the vertical direction (e.g., between the first-level component 40 and its second-level components 42), and in the horizontal direction (e.g., between or among components within the same level 40 and/or 42), for example via spacers and timeline goals. However, such communication may occur in either direction, and need not be restricted to one or the other direction or to both directions.

Because of the ability of systems and methods of the present disclosure to asynchronously dispatch plans, a plan might be under dispatch and execution by a second-level component 42 when the first-level component 40 dispatches a first-level action to the second-level component 42. In cases where the second-level component's 42 activity may spread or burst across the timeline embodied in XPlan 252 (such that not all of the second-level component's activity may fit within the bounds marked by the first-level action, as discussed previously with reference to FIG. 9), the first-level action might already have been partly executed by the second-level component 42. For example, the first-level component 40 may dispatch to a second-level component 42 the start of a higher-level action when the second-level component 42 has already dispatched via the dispatcher 96 the (local) actions corresponding to the early stages of the higher-level action. In this case, the second-level component 42 may determine (a) whether the plan under execution can still achieve its timed goals based on the constraints of the newly dispatched plan, and (b) if not, whether the plan under execution may be adjusted by rescheduling to satisfy the new constraints. If the second-level component 42 determines that neither of these scenarios is possible, the second-level component 42 may locally re-plan. That is, the second-level component 42 may re-plan by accounting for actions that are already underway that affect the second-level component's 42 re-planning efforts. The second-level component 42 may interpret the state based on the expected effect of the parts of the plan executed thus far, to anticipate the actions that are already underway, record these in the initial state, and/or re-plan to achieve the new timed goals.

Figure 13:
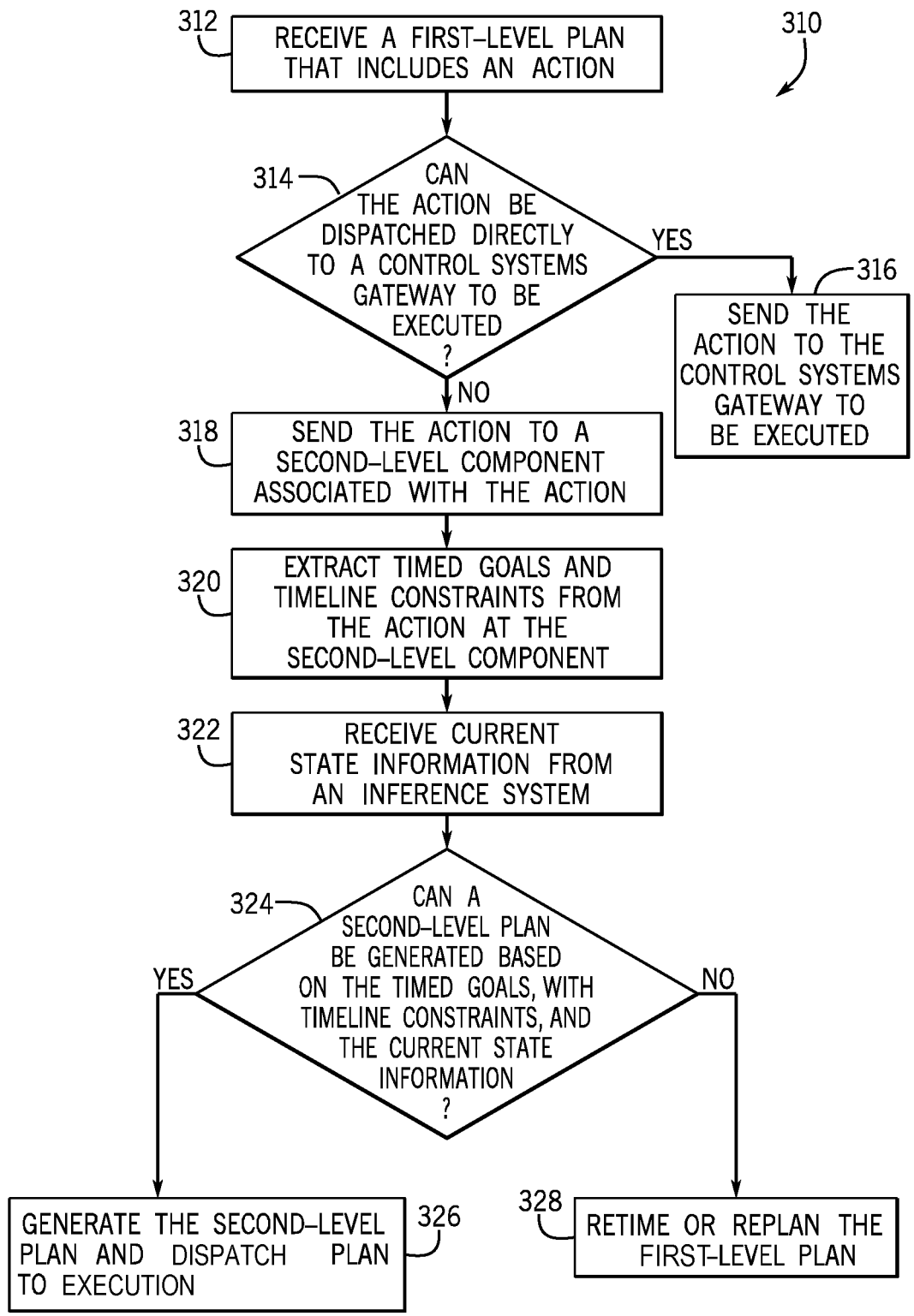
FIG. 13 is a flow diagram of the Overlay Stack Method in the Execution Mode as performed by a second-level component, according to one or more embodiments of the present disclosure.

FIG. 13 is a flow diagram of the Overlay Stack Method 310 in the Execution Mode as performed by first-level component 40, according to an embodiment of the present disclosure. The method 310 may be performed by any suitable device or combination of devices that may receive a first-level plan (e.g., FIG. 9 at 252), determine if an action of the first-level plan is abstract or if it is concrete, i.e. able to be executed directly by the control systems gateway 84, extract timed goals and timeline constraints from the plan, generate a second-level plan (see, e.g., plan(s) 74, 94 of FIGS. 3 and 5), or retime the existing second-level plan. While the method 310 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 310 may be implemented by a second-level component 42 acting as a first-level component 40 at the root of its respective local hierarchy in the multi-level application. The two-layer relationship may be replicated throughout multiple levels in the hierarchy. In alternative or additional embodiments, at least some steps of the method 310 may be implemented by any other suitable processor or control logic, for example the first-level component 40, the processor 24, one or more control unit(s) 18 and/or 20, additional equipment 99, and/or the like.

With further reference to FIG. 13, the first-level dispatcher 96 (see, e.g., FIG. 3) may receive (FIG. 13 process block 312) a first-level plan (e.g., an XPlan 125 or 252) that includes an action 97 (see, e.g., FIG. 3). The first-level component 40 may then determine (decision block 314) whether the action 97 should be dispatched, by the dispatcher 96 via the execution and monitoring component 80, directly to the control systems gateway 84 for execution. That is, the first-level component 40 may determine whether the action is concrete. If so, the first-level component 40 may send (FIG. 13 process block 316) the action 97 to the control systems gateway 84 to be executed.

If the first-level component 40 determines that the action 97 may not be dispatched directly to the control systems gateway 84 for execution, the first-level component 40 may send (FIG. 13 process block 318) the action 97 to a second-level component 42 associated with the action. For example, the first-level component 40 may send the action 97 to a second-level component 42. The second-level component 42 may then extract (FIG. 13 process block 320) timed goals and timeline constraints (analogous to FIG. 11 at 280 but in Execution Mode) from the action. The second-level component 42 may also receive (FIG. 13 process block 322) current state information from an inference system 52.

The second-level component 42 may then determine (FIG. 13 decision block 324) whether a second-level plan (see, e.g., plan(s) 74, 94 of FIGS. 3 and 5) can be generated based on the timed goals, the timeline constraints, and the current state information. If so, the second-level component 42 may generate (FIG. 13 process block 326) the second-level plan (see, e.g., plan(s) 74, 94 of FIGS. 3 and 5) and dispatch the plan to execution. If the second-level component 42 determines that a second-level plan may not be generated and sends an indication (FIG. 7 process block 184), the first-level component 40 may retime or re-plan (FIG. 13 process block 328) the first-level plan 252.

Figure 12:
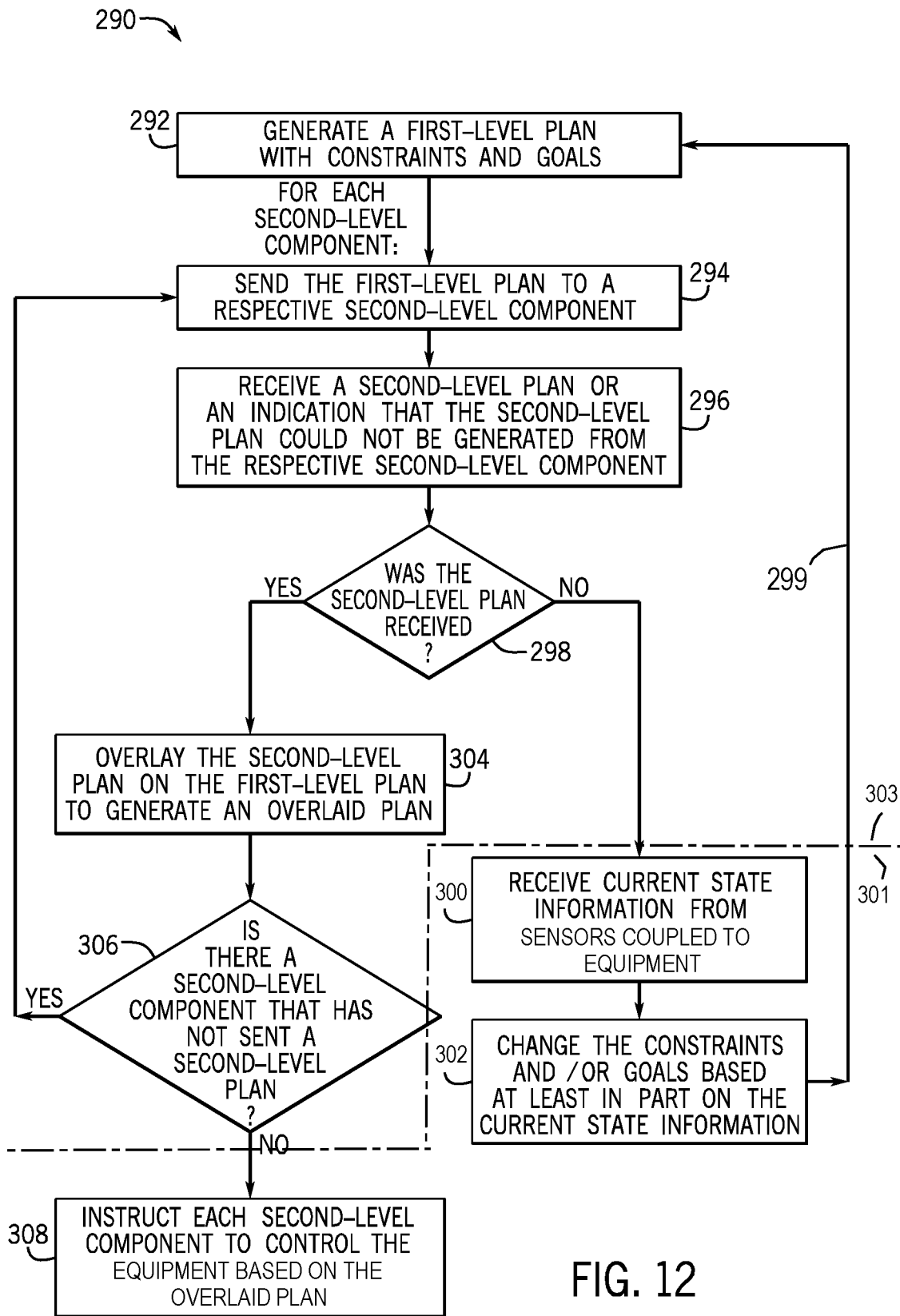
FIG. 12 is a flow diagram of activities in Execution Mode leading to return to the Estimation Mode for re-planning, according to one or more embodiments of the present disclosure.

FIG. 12 is a flow diagram of activities in Execution Mode leading to return to the Estimation Mode for re-planning, according to an embodiment of the present disclosure. The method 290 may be performed by any suitable device or combination of devices that (in Estimation Mode) may generate a first-level plan, send the first-level plan to a second-level component 42, receive a second-level plan from the second-level component 42, and either overlay the second-level plan on the first-level plan and (in Execution Mode) proceed to control of equipment, or (in Execution Mode) receive current state information from sensors coupled to equipment 14, change constraints and/or goals of the first-level plan based at least in part on the current state information, and return to Estimation Mode for re-planning. While the method 290 is described using steps in a specific sequence, it should be understood that the present disclosure contemplates that the described steps may be performed in different sequences than the sequence illustrated, and certain described steps may be skipped or not performed altogether. In embodiments, at least some of the steps of the method 290 may be implemented by the first-level component 40 and/or by any other suitable processor or control logic, for example second-level component(s) 42, the processor 24, actuator control unit(s) 18, 20 of equipment 14, and/or additional equipment 99.

Estimation Mode 303 planning steps (process blocks 292, 294, 296, decision block 298, process block 304, and decision block 306) are the same or similar to those previously described in more detail with regard to the Estimation Mode. In particular, the first-level component 40 may generate (FIG. 12 process block 292) a first-level rough estimate plan with constraints and goals. For each second-level component 42 that may perform an action of the first-level plan, the first-level component 40 may send (FIG. 12 process block 294) the first-level plan to a respective second-level component 42. The first-level component 40 may then receive (FIG. 12 process block 296) a second-level plan, or an indication that the second-level plan could not be generated from the respective second-level component 42 (e.g. if the constraints and goals of the first-level plan are too restrictive).

Still in Estimation Mode 303, the first-level component 40 may determine (FIG. 12 decision block 298) whether the second-level plan was received. If so, as previously described in detail with regard to the Overlay Stack Method (see FIGS. 8-9), the first-level component 40 may overlay (FIG. 12 process block 304) the second-level plan on the first-level plan to generate an overlay stack 242. The first-level component 40 may then determine (FIG. 12 decision block 306) whether a second-level component 42 has not sent a second-level plan to the first-level component 40. If so, i.e. the overlay stack 242 is incomplete, the first-level component 40 may return to process Estimation Mode 303 process block 294 and send the overlay stack 242 to the second-level component 42 that has not provided a layer to provide a new layer to the overlay stack 242. If not, i.e. the overlay stack 242 is a complete overlay stack or plan 252, the first-level component 40 may proceed to Execution Mode 301 to instruct (FIG. 12 process block 308) each second-level component 42 to control the equipment 14 based on the plan 252, as previously described in detail with regard to the Execution Mode. For example, the first-level component 40 may instruct various second-level components 42 (e.g., representing different subcontractor types and/or levels) to send respective actions and/or commands 97, 82 to the plan execution system 56 and/or the control systems gateway 84 to be executed by the respective equipment 14, e.g., by one or more equipment elements or control units 18, 20, to perform operations (e.g., turn on, turn off, operate at a certain speed, operate at a certain power, otherwise control and/or operate, and/or the like) based on associated activities and times indicated in the complete overlaid plan 252.

If on the other hand in Estimation Mode 303 an indication that the second-level plan could not be generated was received (FIG. 12 process block 296), and thus the second-level plan was not received (FIG. 12 decision block 298), proceeding to Execution Mode 301, the first-level component 40 may receive (FIG. 12 process block 300) current state information from sensors coupled to equipment 14. In particular, sensor information 86 (e.g., taken at a current time) may be received at the data acquisition system 54 from the equipment 14, for example from one or more equipment elements and/or control units 18, 20 (etc.) of the equipment 14. The current state information may be directly received from the sensor information 86 and/or may be indirectly received therefrom via processing, the inference system 52, and/or the like.

Upon receipt of the current state information, the first-level component 40 may then change (FIG. 12 process block 302) the constraints and/or goals of the first-level plan based at least in part on the current state information received, e.g. from the inference system 52. For example, the first-level component 40 may prepare to refine the first-level plan or generate a new first-level plan by changing the constraints and/or goals of the first-level plan based on changes between the current state information obtained from sensors in Execution Mode 301 and predicted or expected state information that was generated in the earlier Estimation Mode 303, as the current state information from Execution Mode 301 narrows down variables and/or possibilities of the current state compared to when the current state was predicted in the earlier Estimation Mode. In view of the changed constraints and/or goals of the first-level plan (block 302), the re-planning method 290 may then return 299 the planning system 10 from Execution Mode 301 back to Estimation Mode 303, in which the first-level component 40 may refine the prior first-level plan and/or generate a new first-level plan (block 292) and proceed accordingly.

Example of a Second-Level Component Plan

FIG. 14 shows a human-readable textual representation 285 of an XPlan 125, according to an embodiment of the present disclosure. While an XPlan 125 is in machine-readable and machine-executable format (e.g., FIGS. 20-23 below), the human-readable representation 285 is a simplified format that may lack the detail necessary for machine-readability and machine-execution. The example human-readable textual representation 285 of FIG. 14 was generated by a second-level component 42 for application in well construction to drill a wellbore for a single stand of pipe. The textual representation 285 was produced by an automation platform that executes section drilling by automating a driller's tasks. As illustrated, each line of the textual representation 285 may specify a planned start time 197, the name and parameters of a planned action 97, and a computed duration 297 of the planned action in minutes. Some actions have been planned to execute concurrently. For example, sending a steering demand on bottom 283 and drilling to a next connection point 284 are planned to execute in parallel, at a time of about 196 minutes into the plan. Turning off the pumps 286 and getting in slips 288 are also planned to be done concurrently, at a time of about 243 minutes into the plan.

Figure 15:
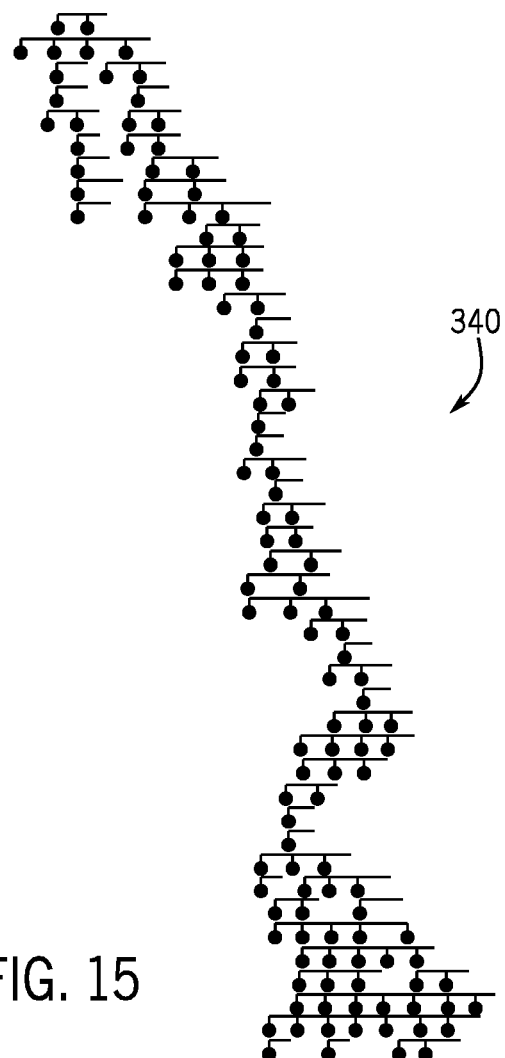
FIG. 15 is an example of a state branching diagram of the states visited in generating the plan of FIG. 14, according to one or more embodiments of the present disclosure.

Generating the example textual representation 285 involved the evaluation of only a small fraction of the possible search space for the particular second-level component 42 that plans the drilling activity. Specifically, eighty-seven states were visited in generating the textual representation 285, as shown in the example state branching diagram 340 of FIG. 15, according to an embodiment of the present disclosure. In this example, the domain model defines about fifty propositional variables and four metric variables, including a continuously changing variable representing hole depth. This implies a state space of some $10^{15}$ states, ignoring the metric dimensions, although only a small subset of these states may be reachable. The domain model for this example second-level component 42 considers only the drilling activity, and not the fluid management necessary to support drilling. The fluid management is the responsibility of another second-level component 42, which must generate plans that coordinate with the drilling plans. The coordination is managed by a first-level component 40 that determines the constraints that each second-level component must satisfy to achieve this coordination. For example, in FIG. 14, between the start of action "break circulation" 287 and the end of action "turn off pumps" 286, the mud circulation system must provide the fluid that the pumps will be circulating in the wellbore, which involves a different second-level component 42 to plan the preparation of the necessary fluid than the second-level component 42 to plan the drilling represented in textual representation 285.

Logical Inference

Embodiments of the present disclosure may include a recursive structure of inference rules enabling the translation of sensed data into high level predicates, used both for authorizing the starts and ends of actions and for detecting violation of invariants, and hence enabling the coordination of the different domains in the multi-domain architecture. The recursively structured rules of the present disclosure may drive inference at different levels and/or across different domains at the same level within the multi-domain architecture. The logical inference system of the present disclosure may traverse up and down a potentially deep hierarchy of rules, linking atomic predicates to high level propositions perhaps many levels of abstraction above and/or may manage interactions between sibling components.

Figure 16:
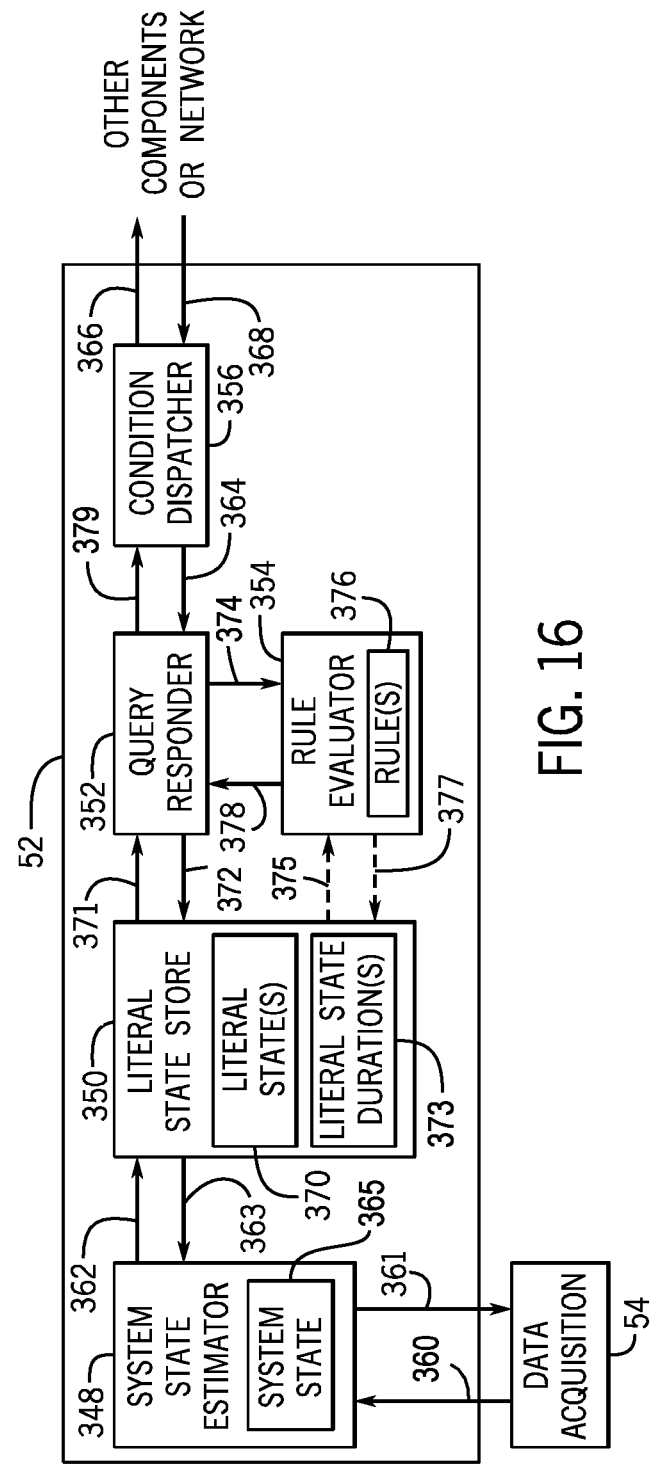
FIG. 16 is a block diagram of example internal components of an inference system of the planning system of FIG. 2, according to one or more embodiments of the present disclosure.

FIG. 16 is a block diagram of example internal components of an inference system 52 of the planning system 10 of FIG. 2 (for example), according to an embodiment of the present disclosure. FIG. 16 illustrates an architecture of the inference system 52, and how information may be communicated, relayed, and used in the inference system 52. The multiple domains in the architecture are connected by a set of inference rules 376 that show how propositions in one domain can be inferred as "true" as a consequence of the achievement of propositions in another domain. These rules 376 also can be used for inferring violation of invariants. In embodiments, the set of inference rules 376 provides the means of translating knowledge between domains. For non-limiting example, the inference rules 376 may step up through layers of abstraction, from propositions that can be directly sensed to the most abstract propositions in the multi-domain application. The set of inference rules 376 is written as part of the multi-domain application of the present disclosure, and is used in both Estimation Mode (e.g., for the generation of timed goals and timeline constraints 280) and in Execution Mode (e.g., for the generation of timed goals and timeline constraints 280 and for the interpretation of data 360 (e.g., sensor data)).

A rule 376 may include a body (antecedent) and a head (implicant). In particular, when prerequisites in the antecedent are true, the implicant is inferred to be true. For non-limiting example, an antecedent of a rule 376 may include prerequisites such as whether a drill is in operation and whether the drill has been operating for greater than a threshold period of time after a last injection of mud. The implicant of the rule 376 may include whether mud should be injected. If the prerequisites in the antecedent are true—the drill is in operation and has been operating for greater than the threshold period of time after the last injection of mud, then the implicant is inferred to be true—mud should be injected.

As discussed above (see, e.g., FIG. 3), an inference system 52 may receive signals or data 86, 360 (e.g., that may include sensor information) from a data acquisition system 54 (e.g., that may include sensors) and, via the use of logical inference rules 376, interpret an associated state 90, 108 to send to a first-level component 40 and second-level components 42. As actions are executed by the planning system 10, knowledge of sensor data 86, 360 may be maintained as a consistent set of facts available to all dispatchers 96 of the first-level component 40 and the second-level components 42.

As illustrated in FIG. 16, the inference system 52 may include a literal state store 350, a query responder 352, a rule evaluator 354, a condition dispatcher 356, and a state estimator 348. The literal state store 350 may store facts or literals (literal states) 370 interpreted by the system state estimator 348 using data 360 acquired via the data acquisition system 54 and/or the application of rules 376 using the rule evaluator 354.

In an example operation, the condition dispatcher 356 may receive queries from the dispatch process (see, e.g., FIG. 3 dispatcher 96 and/or execution and monitoring component 80) required to authorize, confirm, or fail conditions during the execution of an action 97. Sensed data 360 may be necessary to answer these queries, wherein the data may be sensed via physical sensor(s) of various parameter(s) and/or in a purely virtual way, e.g., read from a database, obtained via human-machine interaction, and/or the like. The connection from data 360 to condition dispatcher 356 may be through the chain 362, 371, 379, for example, using the intermediaries of state estimator 348, literal state store 350, query responder 352 as shown, or in other variations more direct or indirect. In some embodiments, the data acquisition system 54 may send the data 360 (e.g., via the state estimator 348 and communications channel, connection or link 362) to the literal state store 350 periodically (e.g., at a certain time interval) or asynchronously (e.g., when the data acquisition system 54 receives new sensor data 86, 360). Additionally, the literal state store 350 may send a request 363 (e.g., via the state estimator 348 and communications channel, connection or link 361) to the data acquisition system 54 for updated sensor data 360, and the data acquisition system 54 may then send 362 the requested sensor data 360 (e.g., via the state estimator 348 and channel 362) to the literal state store 350 in response to the request. The system state 365 housed in the system state estimator 348 is the current estimated state of the system, which may be used to respond 362 to requests 363 from the literal state store 350.

Information recording the persistence of literals 370 may be stored in the literal state store 350, for example within a literal state duration(s) record 373. The data that passes along the communications channels (e.g., 366, 368) may be the consequence of consulting the content of the literal state store 350, including the states of literals 370 and/or the durations 373 over which they have been true.

As a non-limiting example in the well construction context, if a bottom-hole assembly (BHA) of a drilling string cannot go on bottom of the well being drilled unless the mudflow has been measured to be at appropriate flow rate for at least 10 seconds, then it may be confirmed that the literal (mudflow>required rate) must be true in the state store 350, but also its duration 373 must have reached 10 seconds or more. This combination would allow confirmation of the condition for the query responder 352.

In an example operation of embodiments, when a query 368 arrives at the condition dispatcher 356, it is passed via communications link 364 to the query responder 352. The query responder 352 checks 372 the literal state store 350 to see whether the query 368, 364 has already been established and remains true. In some embodiments, the request may involve the rule evaluator 354 evaluating one or more potential rules 376. For example, if the query 368 is abstract, the query responder 352 may request 374 the rule evaluator 354 to find a rule 376 that implies the query 368, 364 (hereinafter "368"). Such a rule 376 is a potential rule. A rule 376 may be potential, for example, when the query 368 is implicant. A potential rule 376 may become active when its antecedent is true; on the other hand, if the antecedent is false or unknown, then the query 368 remains or reverts to potential. When a rule 376 is potential, the situation in which a query 368 is abstract (matches the head or implicant of a rule) may lead to the generation of antecedent queries 378 from the rule evaluator 354 to the query responder 352. The antecedent queries 378 (e.g., antecedent conditions in the body or antecedent of the rule) may have the same or similar recursive hierarchical structure as the relationship between levels of the multi-domain architecture itself but need not be directly linked in any way.

The antecedent queries 378 may be sent 372 from the query responder 352 to the literal state store 350. The literal state(s) 370 may be found true in the literal state store 350 and if so held true for the required duration 373. The state estimator 348 may put literals 370 into the literal state store 350, and when all of the required antecedent queries 378, 372 are in the literal state store 350, then the query responder 352 is notified that the implicant query 368 is true. The potential rule 376 then becomes active. As soon as any antecedent query 378 in the active rule 376 is determined false by the state estimator 348, however, the rule 376 stops being active and becomes potential again. If there are no active rules 376 supporting the implicant query 368, then the query responder 352 may be notified that there is insufficient evidence to determine that the implicant query 368 is true.

In order to monitor the status of antecedents of rules 376, the rule evaluator 354 may notify the literal state store 350 of literals that must be watched 377, and the literal state store 350 may then notify 375 the rule evaluator 354 of changes in status of these watched literals.

With continuing reference to FIG. 16, and in more detail, in embodiments an implicant query 368 sent to the condition dispatcher 356 is passed to the query responder 352 as query 364. The query 364 may facilitate determining whether a query 368 currently exists or is true. To determine a response 379 to the query 364, the query responder 352 may send a request 372 to the literal state store 350 to see whether the condition is true, false, or unknown. The query 364 may be primitive (can be directly sensed) or abstract (the implicant of a rule). Where the query 364 is primitive, the literal state store 350 may send a request 363 to the state estimator 348. When the response 362 is received, the literal state store 350 may send a corresponding response 371 to the query responder 352. Where the query 364 is the implicant of a rule 376, the query responder 352 may also send the request 374 to the rule evaluator 354 to evaluate one or more rules 376 in which the query 364 is the implicant. For example, a rule 376 may be evaluated to determine whether a query 364 is true.

The query responder 352 may then send a response 379 to the condition dispatcher 356 indicating whether the query 364 is true. Based on the response 379, the condition dispatcher 356 may determine whether the query 368 currently exists in the literal state store 350, and/or send the response 366 to the state and goal generator (see, e.g., FIG. 3 at motivation component 98) to generate a state 90, 108 and/or goal 112, 116 based on the response 366. The response 366 also may be sent to the execution and monitoring component 80 and/or the concierge component 88.

The query responder 352 may update the response 378 to the query 364 as the response 378 changes. For example, if the response 378 to the query 364 is false or unknown, and changes to true, then the query responder 352 may update the response 378 as to this change (e.g., by updating the response 378 to "true"). Similarly, if the response 378 to the query 364 is true and changes to false or unknown, then the query responder 352 may update the response 378 as to this change (e.g., by updating the response 378 to "unknown"). The change in the response 378 may occur due to, for example, a change in the sensor data 360, the rules 376, and/or the like.

The state 90, 108 and/or goal 112, 116 may be sent to any suitable component, for example a first-level component 40, a second-level component 42, and/or the like. While the flow of information in the inference system 52 is disclosed in the form of requests (e.g., 374) and/or queries (e.g., 368), it should be understood that any suitable communication may be used, such as messages, registrations, notifications, value-setting, and/or the like.

Figure 17:
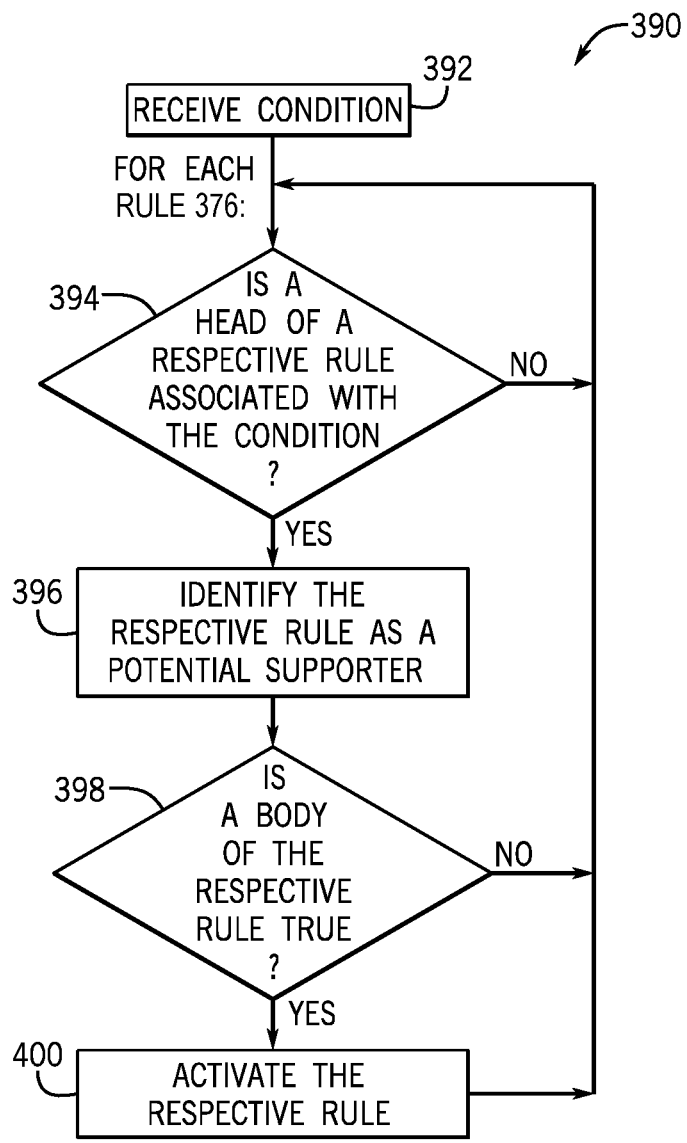
FIG. 17 is a flow diagram of a method for determining which rules to activate with respect to a query, according to one or more embodiments of the present disclosure.

As mentioned above, a rule 376 may be evaluated to determine whether a query 364 is true. To evaluate a rule 376, the rule 376 may first be activated. FIG. 17 is a flow diagram of a method 390 for determining which rules 376 to activate with respect to a query 364, according to an embodiment of the present disclosure. The method 390 may be performed by any suitable device or combination of devices that may determine whether a head (implicant) of a rule 376 is associated with the query 364, determine whether a body (antecedent) of the rule 376 is true, and activate the rule 376. As mentioned above, the rule 376 may include a body and a head (an antecedent and an implicant, respectively). In particular, when prerequisites in the body/antecedent are true, the head/implicant is inferred to be true.

While the method 390 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 390 may be implemented by the rule evaluator 354. In alternative or additional embodiments, at least some steps of the method 390 may be implemented by any other suitable component or control logic, such as the query responder 352, the condition dispatcher 356, or any other component of the inference system 52.

Referring now to FIGS. 16 and 17, the rule evaluator 354 may receive (FIG. 17 process block 392) a query 374. The condition dispatcher 356 may send a query 368 as query 364 to the query responder 352 to facilitate determining whether a condition or fact 368 currently exists or is true, and the query responder 352 may send the query 364 as query 374 to the rule evaluator 354 as shown, or in other variations more direct or indirect.

As discussed above, the rule evaluator 354 may store one or more rules 376 that are used to determine whether a query 364 is true. For each rule 376 stored in the rule evaluator 354, the rule evaluator 354 may determine (FIG. 17 decision block 394) whether a head/implicant of a respective rule 376 is associated with the query 364. As mentioned above, when prerequisites in a body/antecedent of a rule 376 are true, the head/implicant of the rule 376 is inferred to be true. In particular, the rule evaluator 354 may determine whether each stored rule 376 includes the query 364 in its respective head/implicant. If the head/implicant of the respective rule 376 is not associated with the query 364, the rule evaluator 354 may return to decision block 394 to evaluate the next rule 376 stored in the rule evaluator 354.

If the head/implicant of the respective rule 376 is associated with the query 364, then the rule evaluator 354 may identify (FIG. 17 process block 396) the respective rule 376 as a potential supporter of the query 364. As such, a potential supporter is a rule 376 with a head/implicant that is associated with the query 364 and thus may support the query 364. The potential supporter may be an active rule 376 or an inactive rule 376, depending on whether the body/antecedent of the rule is true. When the potential support is an active rule 376, it supports the query 364. When the potential supporter is an inactive rule 376, then it does not support the query 364. For example, the query 364 may include determining whether a temperature in a borehole is over 100 degrees Fahrenheit. Potential supporters of the query 364 may include any rules 376 that have a head/implicant associated with temperature. Active rules 376 may include those potential supporters that have heads/implicants associated with temperatures over 100 degrees Fahrenheit, while inactive rules 376 may include those potential supporters that have heads/implicants associated with temperatures under 100 degrees Fahrenheit.

The rule evaluator 354 may identify the respective rule 376 as a potential supporter of the query 364 by any suitable technique, for example by storing the respective rule 376 in a potential supporter pool, flagging the respective rule 376 as a potential supporter, and/or the like. In some embodiments, the potential supporter may be instantiated in the potential supported pool.

The rule evaluator 354 may then determine (FIG. 17 decision block 398) whether a body/antecedent of the respective rule 376 is true. As mentioned above, when prerequisites in a body/antecedent of a rule 376 are true, the head/implicant of the rule 376 is inferred to be true. In some embodiments, the stored sensor data 372 sent to the rule evaluator 354 may be used to determine whether the body/antecedent of the respective rule 376 is true.

If the rule evaluator 354 determines that the body/antecedent of the respective rule 376 is not true, then the rule evaluator 354 may return to decision block 394 to evaluate the next rule 376 stored in the rule evaluator 354. As such, the respective rule 376 is identified as a potential supporter, but the respective rule 376 is inactive and thus does not support the query 364.

If the rule evaluator 354 determines that the body of the respective rule 376 is true, then the head/implicant of the rule 376 is inferred to be true, and the rule evaluator 354 may activate (FIG. 17 process block 400) the respective rule 376. As such, the respective rule 376 supports the query 364. In this manner, the rule evaluator 354 may determine which rules 376 to activate with respect to a query 364. The active rules 376 may then be evaluated to determine whether the query 364 is true, which may facilitate determining whether a condition or fact 366 currently exists or is true. The condition 366 may be sent to the state and goal generator (e.g., FIG. 3 motivation component 98) to generate a state or goal for the planning system 10.

As mentioned above, the query responder 352 may update the response 378 to the query 364 as the response 378 changes. The response 378 may be updated when rules 376 no longer support the query 364, or when at least one rule 376 supports the query 364 when none supported the query 364 before (e.g., as sensor data 86, 360 is updated and/or rules 376 are changed). Because a rule 376 supports the query 364 when the rule 376 is activated, and the rule 376 is activated when the body/antecedent of the rule 376 is true, updates in the response 378 to the query 364 may be dependent on changes in the body/antecedent of the rule 376. These changes in the body/antecedent of the rule 376 may be based on updated sensor data 360, changes to the rules 376, and/or the like.

Figure 18:
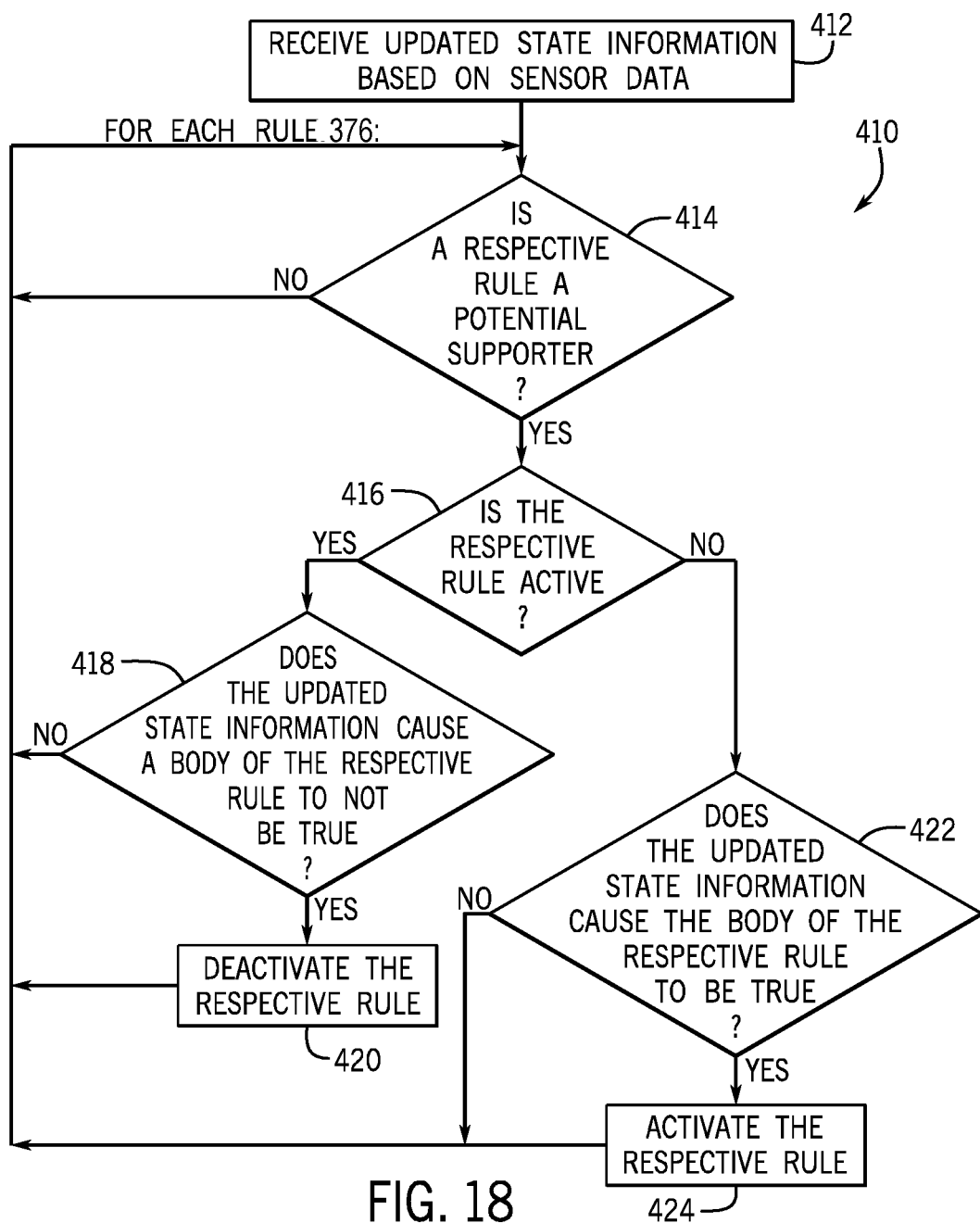
FIG. 18 is a flow diagram of a method for activating and/or deactivating rules based on updated information, according to one or more embodiments of the present disclosure.

With this in mind, FIG. 18 is a flow diagram of a method 410 for activating and/or deactivating rules 376 based on updated information, such as sensor data 86, 360, according to an embodiment of the present disclosure. The method 410 may be performed by any suitable device or combination of devices that may determine whether a rule 376 is identified as a potential supporter, determine whether the rule 376 is active, determine whether a body/antecedent of the rule 376 is true, activate the rule, and deactivate the rule 376. While the method 410 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 410 may be implemented by the rule evaluator 354. In alternative or additional embodiments, at least some steps of the method 410 may be implemented by any other suitable component or control logic, such as the query responder 352, the condition dispatcher 356, or any other component of the inference system 52. Moreover, while the method 410 is based on updated sensor data 86, 360, any suitable information may be substituted to cause activating and/or deactivating a rule 376 as illustrated in FIG. 18, such as changes to the rules 376.

Referring now to FIG. 18 (and with continuing backward reference to those previously described), the rule evaluator 354 may receive (process block 412) sensor data 86, 360 and/or may receive or determine updated state information based thereon. For example, the query responder 352 may send the sensor data 86, 360 from the data acquisition system 54 and/or the stored sensor data 86, 360 stored as literal states 370 in the literal state store 350 to the rule evaluator 354.

For each rule 376 stored in the rule evaluator 354, the rule evaluator 354 may determine (FIG. 18 decision block 414) whether a respective rule 376 is a potential supporter. For example, the rule evaluator 354 may determine whether the respective rule 376 is identified as a potential supporter by determining whether the respective rule 376 is stored in a potential supporter pool, is flagged as a potential supporter, and/or the like. If the rule evaluator 354 determines that the respective rule 376 is not a potential supporter, the rule evaluator 354 may return to decision block 394 (FIG. 17) to evaluate the next rule 376 stored in the rule evaluator 354. In some embodiments, such as methods for activating and/or deactivating a rule 376 based on changes to the rules 376, the rule evaluator 354 may determine whether each respective rule 376 should be (e.g., remain) a potential supporter.

If the rule evaluator 354 determines that the respective rule 376 is a potential supporter, then the rule evaluator 354 may determine (FIG. 18 decision block 416) whether the respective rule 376 is active. If so, then the respective rule 376 is supporting the associated query 364. The rule evaluator 354 then determines (FIG. 18 decision block 418) whether the sensor data (e.g., 360) causes a body of the respective rule 376 to not be true. That is, the sensor data 360 may cause the body of the respective rule 376 to be false or unknown (e.g., it cannot be determined whether the body of the respective rule 376 is true or false). If so, the rule evaluator 354 may deactivate (FIG. 18 process block 420) the respective rule 376 and return to decision block 394 (FIG. 17) to evaluate the next rule 376 stored in the rule evaluator 354.

If the rule evaluator 354 determines (FIG. 18 decision block 418) that the sensor data 360 stored as literal states 370 in the literal state store 350 causes the body/antecedent of the respective rule 376 to be true, then there is no change as the respective rule 376 was already active, and the rule evaluator 354 may return to decision block 394 (FIG. 17) to evaluate the next rule 376 stored in the rule evaluator 354.

If the rule evaluator 354 determines (FIG. 18 decision block 416) that the respective rule 376 is not active, then the respective rule 376 is not supporting the associated query 364. The rule evaluator 354 may then determine (FIG. 18 decision block 422) whether the sensor data 360 causes the body of the respective rule 376 to be true. If so, the rule evaluator 354 may activate (FIG. 18 process block 424) the respective rule 376 and return to decision block 394 (FIG. 17) to evaluate the next rule 376 stored in the rule evaluator 354.

If the rule evaluator 354 determines (FIG. 18 decision block 422) that the sensor data 360 causes the body of the respective rule 376 to not be true, then there is no change as the respective rule 376 was already inactive, and the rule evaluator 354 may return to decision block 394 (FIG. 17) to evaluate the next rule 376 received by the rule evaluator 354. In this manner, the rule evaluator 354 may activate and/or deactivate rules 376 based on updated sensor data 360.

Figure 19:
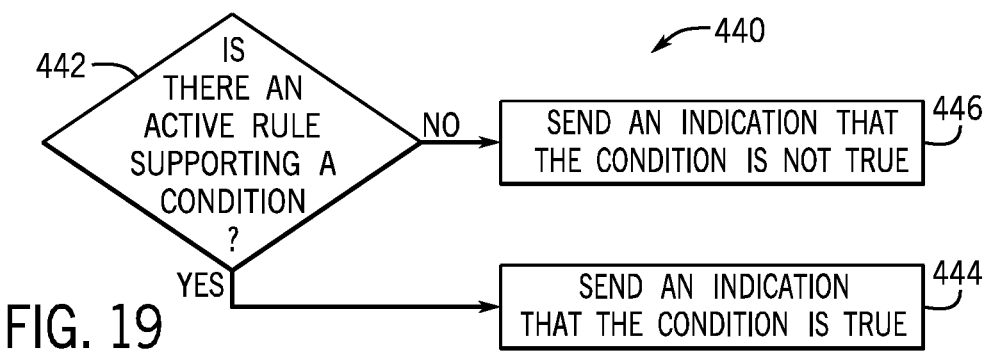
FIG. 19 is a flow diagram of a method for determining whether a query is true, according to one or more embodiments of the present disclosure.

Given the method 390 (FIG. 17) for determining which rules 376 to activate with respect to a query 364 and the method 410 (FIG. 18) for activating and/or deactivating rules 376 based on updated information, FIG. 19 is a flow diagram of a method 440 for determining whether an associated query 364 is true, according to an embodiment of the present disclosure. The method 440 may be performed by any suitable device or combination of devices that may determine whether there is an active rule 376 supporting the query 364 and send an indication that the query 364 is true or false or unknown. While the method 440 is described using steps in a specific sequence, it should be understood that the present disclosure contemplates that the described steps may be performed in different sequences than the sequence illustrated, and certain described steps may be skipped or not performed altogether. In some embodiments, at least some of the steps of the method 440 may be implemented by the rule evaluator 354. In additional embodiments, at least some steps of the method 440 may be implemented by any other suitable component or control logic, such as the query responder 352, the condition dispatcher 356, or any other component of the inference system 52.

Referring now to FIG. 19 with reference to FIG. 16, the rule evaluator 354 may determine (FIG. 19 decision block 442) whether there is an active rule 376 supporting a query 364. In particular, if there is at least one active rule 376 (e.g., of the potential supporters), then the query 364 is supported and, as such, is true. Thus, if the rule evaluator 354 determines that there is an active rule 376, then the rule evaluator 354 may send (FIG. 19 process block 444) an indication (e.g., the response 378) to the query responder 352 that the query 364 is true. In some embodiments, the rule evaluator 354 may send an indication (e.g., the response 378) to the query responder 352 that there is an active rule 376, and the query responder 352 may in turn send an indication (e.g., the response 379) to the condition dispatcher 356 that the query 364 is true.

If there is not at least one active rule 376 (e.g., all potential supporters are inactive rules 376), then the query 364 is unsupported and, as such, is false or unknown (e.g., it cannot be determined whether the body of the respective rule 376 is true or false). Thus, if the rule evaluator 354 determines that there is not an active rule 376, then the rule evaluator 354 may send (FIG. 19 process block 446) an indication (e.g., the response 378) to the query responder 352 that the query 364 is not true. In some embodiments, the rule evaluator 354 may send an indication (e.g., the response 378) to the query responder 352 that there is no active rule 376, and the query responder 352 may in turn send an indication (e.g., the response 379) to the condition dispatcher 356 that the query 364 is not true.

The condition dispatcher 356 may then send a condition 366 that currently exists to the state and goal generator (e.g., FIG. 3 motivation component 98) based on the query 364 being true or not true. The state and goal generator may generate a state 90, 108 and/or goal 112, 116 to a suitable component, for example a first-level component 40, a second-level component 42, and/or the like. The suitable component may generate a plan 74, 94 based on the state 90, 108 and/or goal 112, 116, and thus control equipment 14 (e.g., FIG. 1) based on the state 90, 108 and/or goal 112, 116.

Each of the components of the inference system 52, including the literal state store 350, the query responder 352, the rule evaluator 354, the condition dispatcher 356, and the state estimator 348, may be specific, concrete components that perform specific, concrete tasks that the components are designed to perform. For example, the literal state store 350 is designed to store sensor data 86, 360 received from the data acquisition system 54. A variety of benefits may be realized by using these specific components rather than generic, conventional structures. For example, because these components are specially designed to perform these specific tasks, hardware elements and/or software functions used to perform actions unrelated to the specific tasks that may exist in more generic, conventional components may be reduced or eliminated from the components. As such, the components may operate more efficiently, faster, and with less power consumption. Moreover, the components may operate with each other in a more efficient and cooperative manner because the components may be designed to do so, instead of being generically programmed to interact with components unrelated to the operation of the inference system 52.

XPlan and Dispatch

As described, methods and systems of the present disclosure allow multiple event systems to be operating concurrently, each performing an asynchronous dispatch of action starts and ends of its own plan, and each dispatcher coordinated with other dispatchers via logical inference. Concurrent coordination of multiple event systems is obtained through the application of inference rules, and the planner inside each decomposed component of an overlay stack may generate a dispatchable plan, a structure which carries its own execution constraints and governs its traversal of its local dispatcher. Each such dispatchable plan may achieve, undo, or depend upon conditions connected via inference rules to other domains of expertise, and the dispatchable plan may also govern its coordination with other dispatchers under concurrent operation.

As discussed above, a plan 74, 94, 125, 252 (or before-final 200, 240, 248, 249, 242 and/or the like) generated by the planning system 10 may be output as an XML, document or other machine-readable format, which is referred to herein as an XPlan. An) (Plan may be created by a planner and may conform to a standard that includes annotations describing conditions under which actions 97 are authorized to be dispatched and constraints that may be observed during execution of the actions 97. An XPlan may contain additional information about the expected context for execution in order to allow a plan dispatcher 96 to identify whether and when to dispatch individual actions in the plan to the execution and monitoring component 80, or when to fail the plan. The XPlan format may be a medium of communication between the first-level component 40 and second-level components 42.

Figure 20:
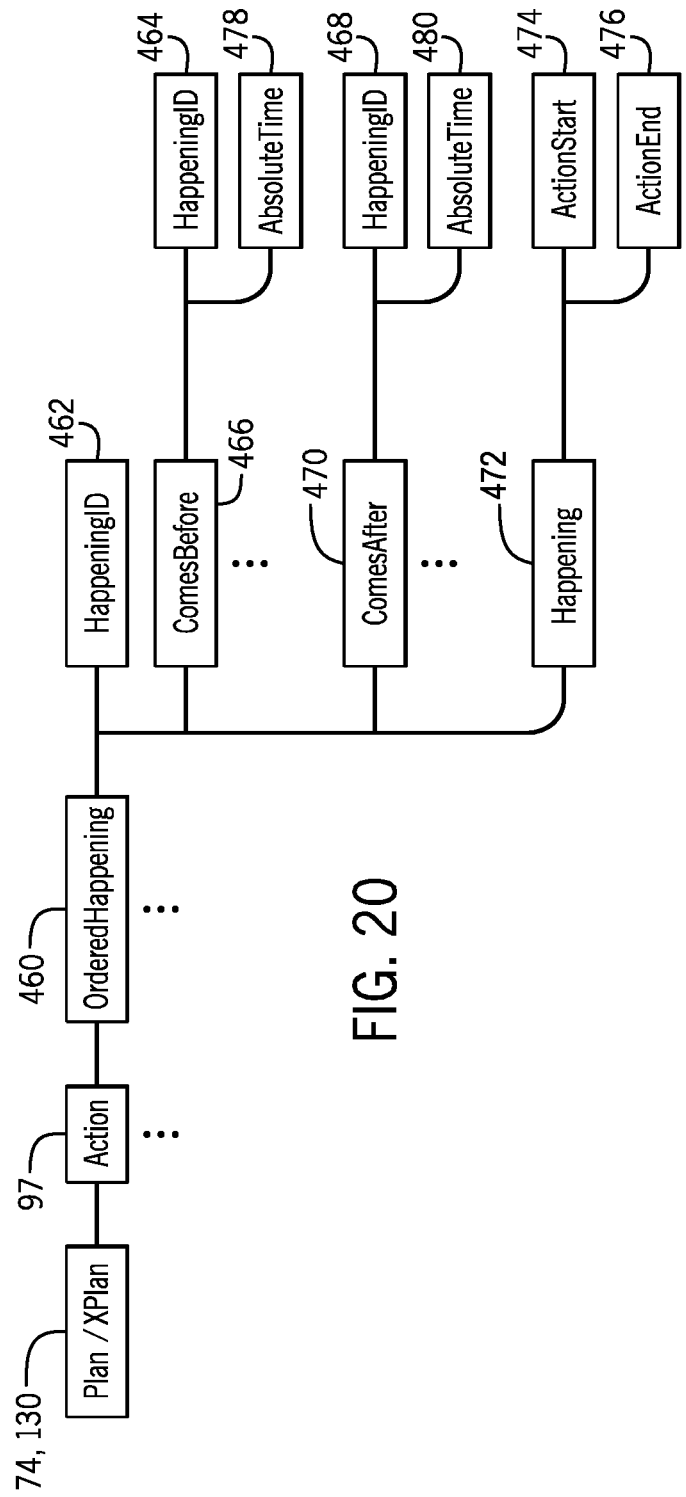
FIG. 20 is a block diagram of example components of an XML, representation of a plan (e.g., an XPlan structure or syntax) of the planning system of FIG. 2, according to one or more embodiments of the present disclosure.

The XPlan structure described in FIGS. 20-23, starting with top-level format or structure 130 in FIG. 20, may include a sequence of ordered happenings ("OrderedHappenings"), which may include components or "subactions" of an action 97 (e.g., a transition between states). Each OrderedHappening may correspond to an event that is expected to occur as part of the execution of the plan. Some of the OrderedHappenings may be executed by, for example, the equipment 14. Other OrderedHappenings may occur as a consequence of physical processes or human intervention in the environment and may be observed by sensors of the data acquisition system 54 and then confirmed via the logical inference system 52. Each OrderedHappening may be identified as an "ActionStart" that defines the conditions under which an action 97 should be initiated (or identified as failed) or an "ActionEnd" that defines when the action 97 ends (or fails). In one example, the OrderedHappening may detail constraints that indicate when the dispatch of an action 97 can proceed and constraints that indicate when a plan execution should not proceed.

FIG. 20 is a block diagram of example structural components of a plan 74 or) (Plan structure 130 of the planning system 10 of FIG. 2, according to some embodiments of the present disclosure. The plan 74 or XPlan structure 130 may include one or more actions 97, each of which may be described by one or more OrderedHappenings 460. In embodiments, each action 97 may be described by at least two OrderedHappenings 460 (e.g., one for an ActionStart and one for an ActionEnd). Each OrderedHappening 460 may include an identifier (a "HappeningID") 462 that may be unique, one or more HappeningIDs 464 of following OrderedHappenings (referred to as "ComesBefore") 466 that the OrderedHappening 460 comes before according to the plan 74, one or more HappeningIDs 468 of preceding OrderedHappenings (referred to as "ComesAfter") 470 that the OrderedHappening 460 comes after according to the plan 74, and an indication (referred to as a "Happening") 472 of whether the OrderedHappening 460 is an ActionStart 474 or an ActionEnd 476. The ComesBefore OrderedHappenings 466 and the ComesAfter OrderedHappenings 470 may also include a time ("AbsoluteTime") 478, 480 that may serve to determine bounds on the absolute time at which the corresponding event must occur in order for the plan to be correctly executed. Such times may correspond to the expected times of expected events outside the control of the planner but that affect the execution of the plan (e.g., nightfall, dawn, delivery arrivals or other events).

In order for a plan to be correctly executed, the ComesBefore OrderedHappenings 466 may not occur before the OrderedHappening 460 but instead should correspond to an event that follows, at some point, the event indicated by the OrderedHappening 460. In embodiments, success of the ComesBefore OrderedHappening 466 may be dependent on performance of the OrderedHappening 460. For example, the ComesBefore OrderedHappening 466 may be related to injecting mud, and the OrderedHappening 460 may involve beginning to drill (spudding-in) a wellbore. As such, the ComesBefore OrderedHappening 466 for injecting mud should be performed after the OrderedHappening 460 of spudding-in a wellbore. However, the ComesBefore OrderedHappenings 466 may not immediately follow the OrderedHappening 460, as other OrderedHappenings (e.g., stopping or starting a drill, moving hoses or piping, and/or the like) may be performed in between the two OrderedHappenings.

Using the example above, the OrderedHappening 460 of spudding-in a wellbore may have a HappeningID 462 of 1, moving mud injection piping to a position over the wellbore may have a HappeningID 462 of 2, and the OrderedHappening 466 of injecting mud may have a HappeningID 462 of 3. For the purposes of this example, it may be assumed that beginning to spud the wellbore comes before injecting the mud (and thus injecting the mud comes after beginning to spud the wellbore), and that moving the mud injection piping comes before the mud injection (and thus the mud injection comes after moving the mud injection piping). As such, Table 1 may apply:

TABLE 1

| ComesAfter | HappeningID | ComesBefore |
|---|---|---|
| {} | 1 | {3} |
| {} | 2 | {3} |
| {1,2} | 3 | {} |

By specifying the HappeningIDs 462 as described above with respect to the respective ComesBefore OrderedHappenings 466 or ComesAfter OrderedHappenings 470, an XPlan structure 130 may enable the planning system 10 to identify which actions may be considered in scope at any point during execution of a plan. Actions that correspond to OrderedHappenings 460 that should occur after some particular OrderedHappening cannot begin before the particular OrderedHappening has occurred (either by observation or by initiation). Moreover, because an XPlan 125 may be an XML document structured according to an XPlan structure 130, the various elements illustrated in FIGS. 20-23 may be represented using annotations, and specifically, opening and closing annotations. As such, the code fragment from an XPlan 125 representing Table 1 may be (partially) expressed below as:

```
<OrderedHappening>
    <HappeningID>1</HappeningID>
    <ComesBefore>
        <HappeningID>3</HappeningID>
    </ComesBefore>
...
<OrderedHappening>
    <HappeningID>2</HappeningID>
    <ComesBefore>
        <HappeningID>3</HappeningID>
    </ComesBefore>
...
<OrderedHappening>
    <HappeningID>3</HappeningID>
    <ComesAfter>
        <HappeningID>1</HappeningID>
        <HappeningID>2</HappeningID>
    </ComesAfter >
```

Figure 21:
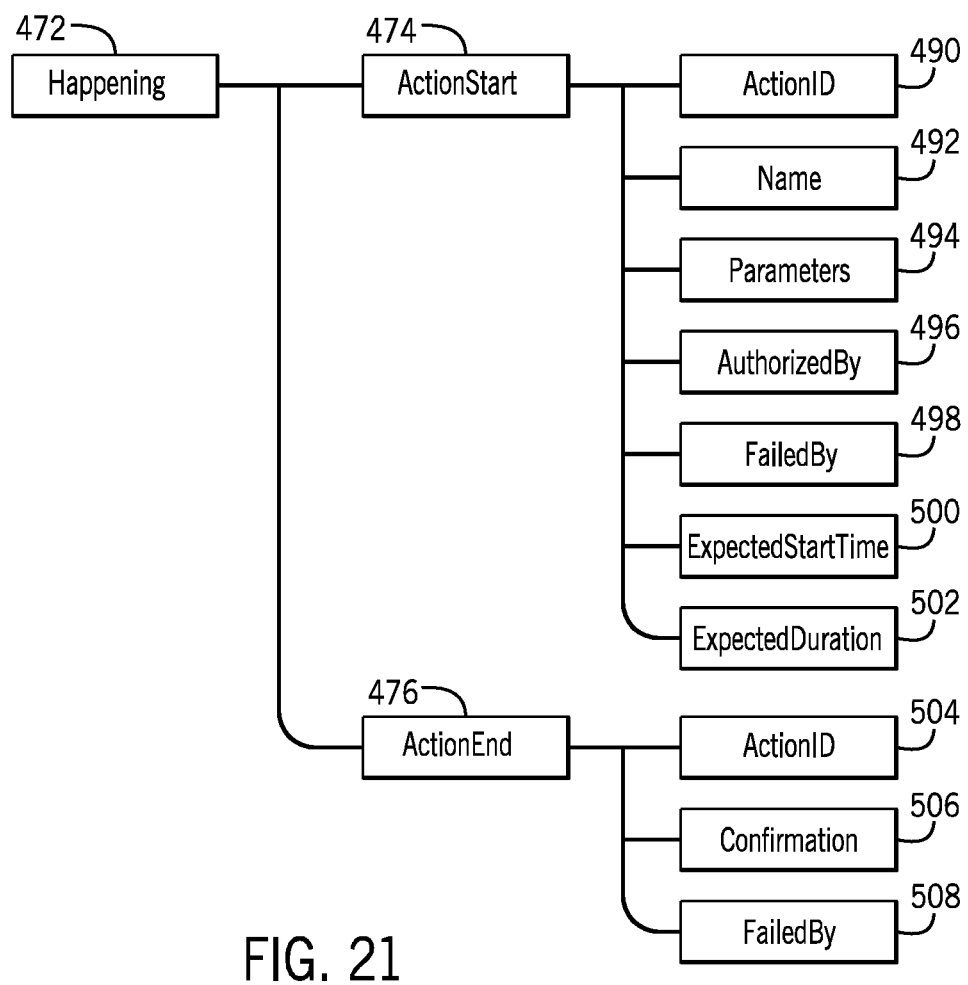
FIG. 21 is a block diagram of example components of an XML representation of an ordered happening of the XPlan of FIG. 20, according to one or more embodiments of the present disclosure.

FIG. 21 is a block diagram of example components of an indication (the Happening 472) of whether an OrderedHappening 460 of FIG. 20 is an ActionStart 474 or ActionEnd 476, according to some embodiments of the present disclosure. The ActionStart 474 is an indication of when the action 97 is initiated and the ActionEnd 476 is an indication of when the action 97 ends. The ActionStart 474 may include an identifier ("ActionID") 490, a name 492, a set of parameters 494 (e.g., associated with components, devices, and/or objects that may be affected by the action 97), a set of conditions (represented by an "AuthorizedBy" indicator) 496 that may authorize the ActionStart 474, a set of conditions (represented by a "FailedBy" indicator) 498 that may restrict whether the ActionStart 474 completes, a time ("ExpectedStartTime") 500 associated with when the action 97 starts, and a period of time ("ExpectedDuration") 502 between when the action 97 starts and when the action 97 ends. The ActionEnd 476 may include an identifier ("ActionID") 504, an indication of confirmation ("Confirmation") 506, and a set of conditions (represented by a "FailedBy" indicator) 508 that may restrict whether the ActionEnd 476 completes. The ActionIDs for start and end of the same action may be the same, for example to ensure that the two parts are correctly linked.

Figure 22:
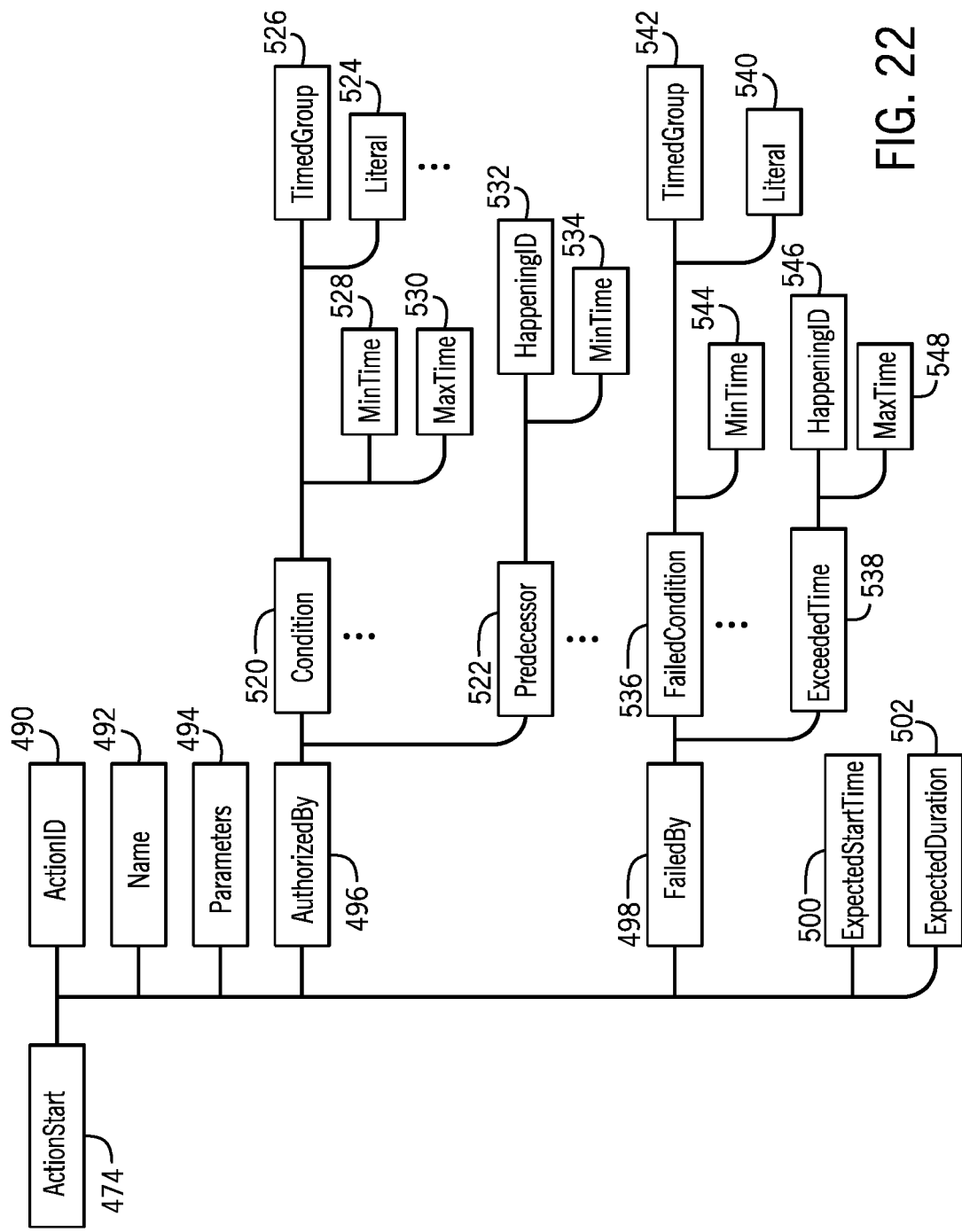
FIG. 22 is a block diagram of example components of an XML representation of a planned action start component within a plan of FIG. 20, according to one or more embodiments of the present disclosure.
Figure 23:
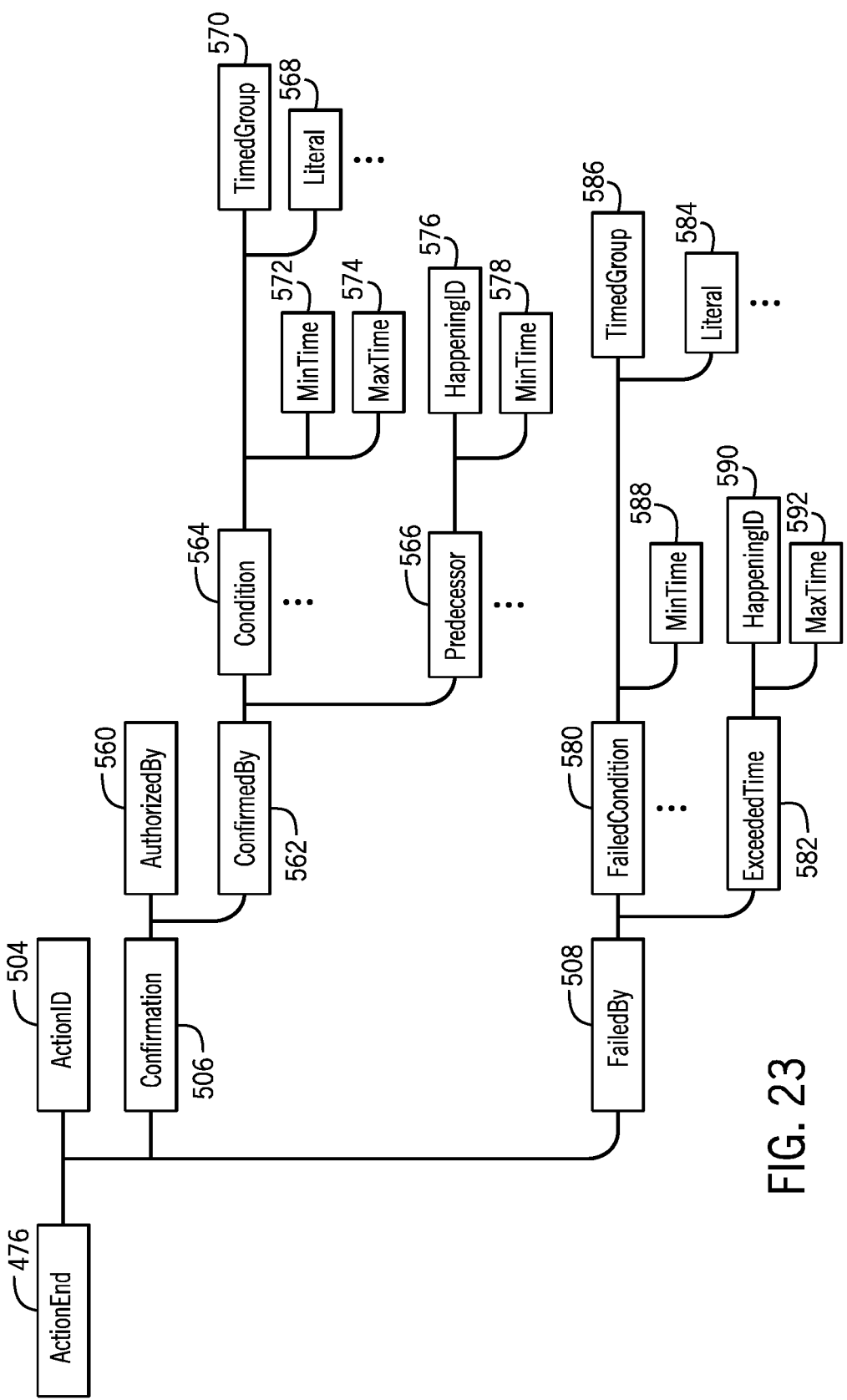
FIG. 23 is a block diagram of example components of an indication of when an action has ended, according to one or more embodiments of the present disclosure.

FIG. 22 is a block diagram of example components of an indication of when the action 97 is initiated (the ActionStart 474), according to some embodiments of the present disclosure. FIG. 23 is a block diagram of example components of an indication of when the action 97 ends (the ActionEnd 476), according to some (same or different) embodiments of the present disclosure. As shown, the example components of FIG. 22 (ActionStart) and FIG. 23 (ActionEnd) are similar in some respects (see, e.g., failed conditions) and differ as to others (see, e.g., confirmation).

With reference to FIG. 22, the AuthorizedBy indicator 496 of the ActionStart 474 may include one or more Conditions 520 and one or more predecessor Happenings ("Predecessors") 522. The AuthorizedBy indicator 496 may authorize an associated ActionStart 474 if the one or more Conditions 520 are met and the one or more Predecessors 522 have completed.

The inference system 52 is the mechanism used to determine whether a literal is true or false or unknown. A Condition 520 may include one or more Literals 524, together with one or more associated time windows ("TimedGroups") 526. A Literal 524 is an expression that may be true or false or unknown depending on a state for which the Literal 524 is evaluated. For example, during a drilling state, a Literal 524 representing that a drill is operating is true. Similarly, during a mud injection state in which the drill is not operating, the Literal 524 is false.

The Condition 520 (FIG. 22; see also FIG. 23 at 564) may be met if the one or more Literals 524 (FIG. 22; see also FIG. 23 at 568) of the Condition 520, 564 are true for at least a minimum time ("MinTime") 528 (FIG. 22; see also FIG. 23 at 572) of the Condition 520, 564 and for no more than a maximum time ("MaxTime") 530 (FIG. 22; see also FIG. 23 at 574) of the Condition 520, 564. A Predecessor 522 (FIG. 22; see also FIG. 23 at 566) may be represented by a HappeningID 532 (FIG. 22; see also FIG. 23 at 576) and/or a MinTime 534 (FIG. 22; see also FIG. 23 at 578). A TimedGroup 526 (FIG. 22; see also FIG. 23 at 570) may be, for example, a collection of literals or literal states (FIG. 16 at 370) in the literal state store (FIG. 16 at 350) associated with a time window, e.g., a MinTime to MaxTime time window (e.g., FIG. 22 at 528, 530; FIG. 23 at 572, 574).

The FailedBy indicator 498 (FIG. 22; see also FIG. 23 at 508) may include one or more FailedConditions 536 (FIG. 22; see also FIG. 23 at 580). A FailedCondition 536, 580 becomes true when a Condition 520, 564 that an associated Happening 472 (FIG. 20) depends upon becomes false. The Condition 520, 564 may become false because something unexpected occurs during execution of the plan 74, the Condition 520, 564 exceeds a threshold time ("ExceededTime") 538 (FIG. 22; see also FIG. 23 at 582), and/or the like.

The FailedCondition 536 (FIG. 22; see also FIG. 23 at 580) may include one or more Literals 540 (FIG. 22; see also FIG. 23 at 584) and/or one or more associated TimedGroups 542 (FIG. 22; see also FIG. 23 at 586). The FailedCondition 536, 580 may be met if the one or more Literals 540, 584 of the FailedCondition 536, 580 are true for at least a minimum time ("MinTime") 544 (FIG. 22; see also FIG. 23 at 588) of the FailedCondition 536, 580. The ExceededTime 538 (FIG. 22; see also FIG. 23 at 582) may include a HappeningID 546 (FIG. 22; see also FIG. 23 at 590) and/or a MaxTime 548 (FIG. 22; see also FIG. 23 at 592).

With reference to FIG. 23, the Confirmation 506 of the ActionEnd 476 may include a set of conditions (represented by the "AuthorizedBy" indicator) 560 that confirms the ActionEnd 476 if one or more Conditions 564 are met and one or more Predecessors 566 occur. As indicated above, the structure/organization of the Conditions 564 and Predecessors 566 of the ActionEnd 476 may be similar or identical to the structure/organization of the Conditions 520 and Predecessors 522 of the ActionStart 474 shown in FIG. 22. For example, a Predecessor 566 may include a HappeningID 576 and/or a MinTime 578.

Additionally, the Confirmation 506 may include a set of conditions (represented by a "ConfirmedBy" indicator) 562 that may confirm the ActionEnd 476 if one or more Conditions 564 are met and one or more Predecessors 566 occur. As with the set of conditions represented by the AuthorizedBy indicator 560, a ConfirmedBy indicator 562 may include one or more Conditions 564, and a Condition 564 may include one or more Literals 568 together with one or more associated TimedGroups 570. A Condition 564 may be met if the one or more Literals 568 of the Condition 564 are true for at least a MinTime 572 of the Condition 564 and for no more than a MaxTime 574 of the Condition 564. A Literal 568 is an expression that may be true or false or unknown depending on a state for which the Literal 568 is evaluated.

The XPlan syntax 130 described in FIGS. 20-23 provides precise explanation for the planning system 10 to execute plans 74, 94 (noting generally that pointers in figures to lines of communication also may refer to plans along those lines of communication, e.g., XPlans 125). The XPlan syntax 130 may enable the dispatcher 96 (FIG. 3) to dispatch software (e.g., plans 94, actions 97, and/or the like) that uses the components of the planning system 10, may execute when authorized, and when conditions are detected as true by the logical inference system 52 described above. In particular, when compared to conventional software languages, the XPlan syntax 130 differs advantageously by being asynchronous or agnostic as related to time. That is, events (e.g., happenings) occurring as implemented by the XPlan syntax 130 are not driven or triggered based on clock values, but instead by other events occurring (e.g., conditions being met). As such, multiple dispatchers 96 (associated with different applications, e.g. drilling, mud, or any other application) may execute in parallel with interactions between states of each application. The planning system 10, by using the XPlan syntax 130, may thus interact asynchronously (e.g., be event-driven) rather than synchronously (which may result in timeouts that cause the planning system 10 to stall or stop operating as desired). The planning system 10 may realize an efficiency gain by using the XPlan syntax 130 as actions 97 may be performed by the planning system 10 immediately when conditions (e.g., AuthorizedBy conditions 496, 560, ConfirmedBy conditions 562, and/or the like) are met, rather than waiting for certain clock values or ticks before acting.

Additional description of the interrelationship among FIGS. 20-23 follows. With reference to FIG. 20, an OrderedHappening 460 of an action 97 consists of a HappeningID 462, which uniquely identifies this OrderedHappening, a set of ComesBefore elements 466, a set of ComesAfter elements 470 and the Happening itself, 472. Each ComesBefore element 466 identifies either a HappeningID 464 or an AbsoluteTime 478. Each ComesAfter element 470 also identifies either a HappeningID 468 or an AbsoluteTime 480. This structure communicates the intention of the planner component 44 that the HappeningID 462 lies after the ComesAfter elements and before the ComesBefore elements in the temporal ordering of a plan 74. As shown in FIG. 20, Happenings 472 in a plan 74 each may appear as part of an OrderedHappening 460. As shown in FIG. 21, a Happening 472 can be, for example, an ActionStart 474 or an ActionEnd 476.

In embodiments, an OrderedHappening 460 (FIG. 20) may include a set of authorizing Conditions 520, 564 (FIGS. 22-23), e.g., as indicated by an AuthorizedBy indicator 496, 560 that may authorize an ActionStart 474 or ActionEnd 476. When the plan 74 including an OrderedHappening 460 is implemented (e.g., by the execution and monitoring component 80), the execution and monitoring component 80 may determine whether the set of authorizing Conditions 520, 564 has been met, and, in response to determining that the set of authorizing Conditions 520, 564 has been met, the execution and monitoring component 80 may execute the OrderedHappening 460.

In embodiments, an OrderedHappening 460 (FIG. 20) may include a set of FailedConditions 536, 580 (FIGS. 22-23), e.g., as indicated by a FailedBy indicator 498, 508 that may restrict whether an ActionStart 474 or ActionEnd 476 completes. When the plan 74 including the OrderedHappening 460 is implemented implemented (e.g., by the execution and monitoring component 80), the execution and monitoring component 80 may determine whether the set of FailedConditions 536, 580 has been met, and, in response to determining that the set of FailedConditions 536, 580 has been met, the execution and monitoring component 80 may cease executing the OrderedHappening 460. As such, in embodiments, methods of the present disclosure may allow isolation of areas of failure while allowing other areas to continue operations while the failure is being addressed.

Furthermore, the OrderedHappening 460 (FIG. 20) may include timing constraints, such as an expected period of time, e.g., as indicated by an ExpectedDuration 502 (FIG. 22), for which the action 97 should be under execution. If the action 97 is not completed by the expiration of the ExpectedDuration 502 (after the action 97 begins executing), then the execution and monitoring component 80 may wait for its completion until any specified FailedBy 508 ExceededTime 582 (FIG. 23) is reached. This ExceededTime 582 element will specify the MaxTime 592 associated with the HappeningID 590 corresponding to the HappeningID 462 of the ActionStart 474 corresponding to the action 97 under execution.

The planner component 44 may also generate OrderedHappening elements 460 (FIG. 20) that include an ActionEnd 476 (FIG. 21), which may include a Confirmation 506 (FIG. 23), which may be a set of authorizing conditions (AuthorizedBy 560) or confirming conditions (ConfirmedBy 562) that may authorize or confirm the ActionEnd 476. When the plan 74, 94 including such an OrderedHappening 460 is implemented, the execution and monitoring component 80 may determine whether the Confirmation 506 ConfirmedBy 562 Conditions 564, or the Conditions which appear in the AuthorizedBy 560 (which analogously appear as Conditions 520 in the AuthorizedBy 496 component of FIG. 22) have been met, and in response determine that the set of authorizing or confirming Conditions have been met and execute the OrderedHappening 460. When the plan 74, 94 including the ActionStart 474 and/or ActionEnd 476 OrderedHappening(s) 460 (FIGS. 20-21) is implemented, the execution and monitoring component 80 may determine whether the set of FailedCondition elements 536, 580 (FIGS. 22-23) have been met, and in response to determining that the set of failure conditions 580 have been met, cease executing the plan 74, 94. Furthermore, if ExceededTime 582 (FIG. 23) is passed, then the execution and monitoring component 80 may cease executing the plan 74.

Figure 24:
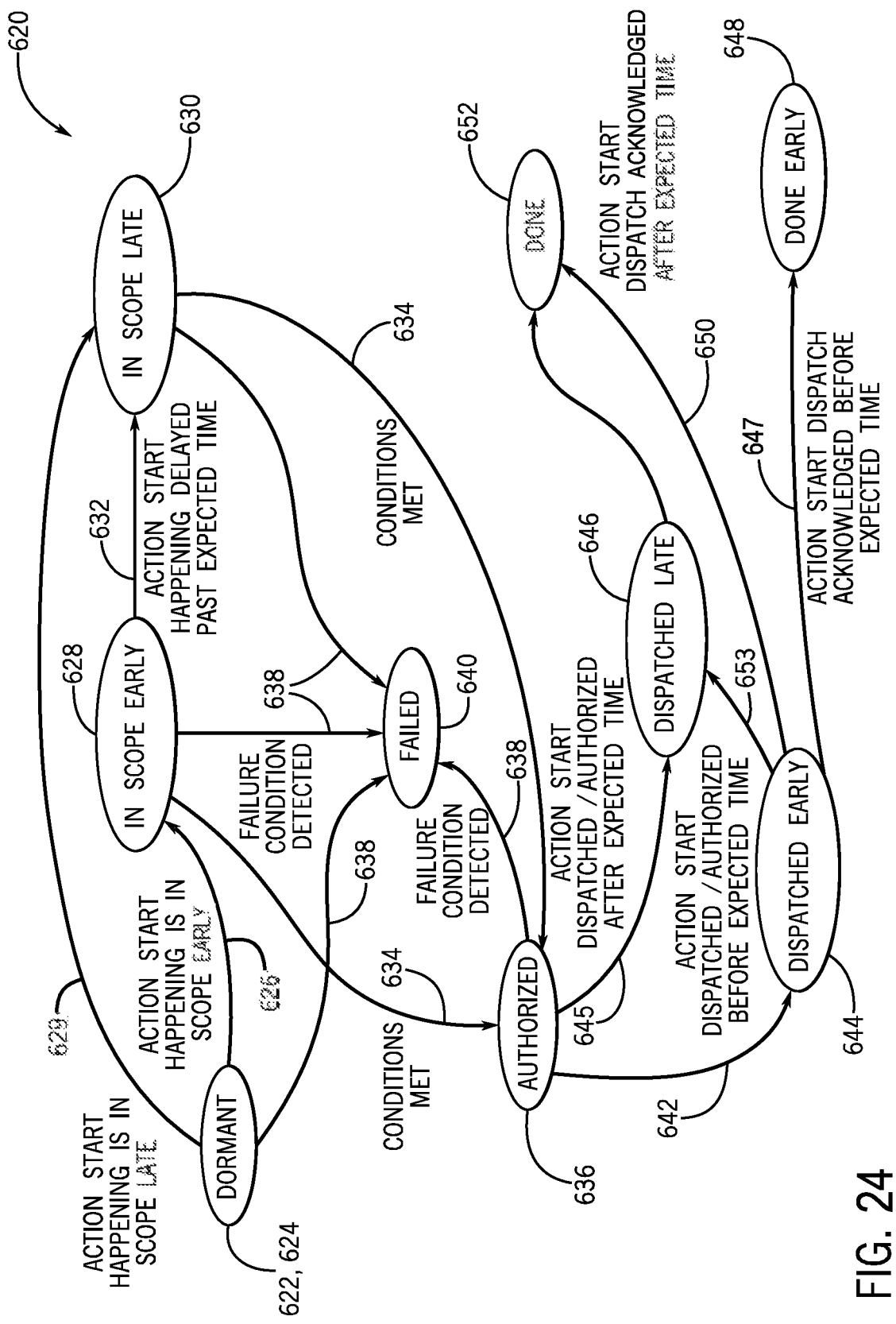
FIG. 24 is a state diagram of a timed hybrid automaton that tracks states of happenings that denote action starts in a plan of the planning system of FIG. 2, according to one or more embodiments of the present disclosure.
Figure 25:
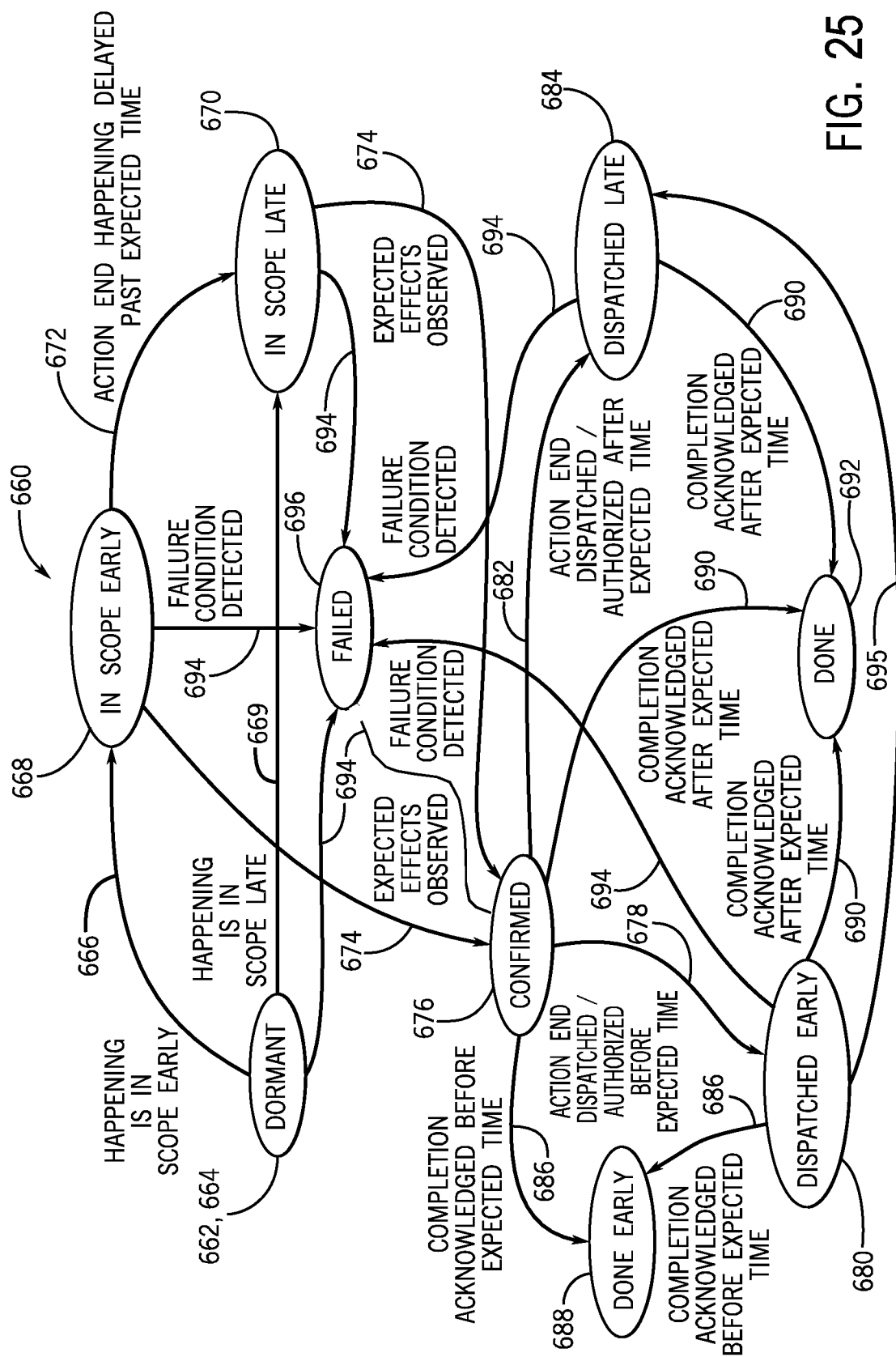
FIG. 25 is a state diagram of a timed hybrid automaton that tracks states of happenings that denote action ends in a plan of the planning system of FIG. 2, according to one or more embodiments of the present disclosure.

With reference to FIGS. 24 and 25, in which ovals denote states (generically referred to as 622, 662), and lines (e.g., 629, 666) indicate transitions, finite state machines (FSMs) and timed hybrid automata (THAs) may be used to capture plan execution semantics and to track and manage plan execution. A THA is an instance of an FSM that may track a state of a Happening 472 (see, e.g., FIGS. 21-23) in a plan 74, 94 by tracking the passage of time and corresponding implications on the values of state variables that are affected by continuous processes. When the Happening is an ActionStart (e.g. 474 of FIG. 22), it may go through a THA as schematically shown in FIG. 24. When the Happening is an ActionEnd (e.g. 476 of FIG. 23), it may go through a THA as schematically shown in FIG. 25.

In a non-limiting well construction context, in an example operation, a THA may track the increasing hole depth as time passes. For example, when the ActionStart 474 of a "drilling" action is successfully dispatched, the corresponding Happening 472 enters a Done state 652 (FIG. 24). Then the ActionEnd 476 Happening 472 enters an In Scope state 668 or 670 (FIG. 25) and remains there until the target hole depth for this drilling action is declared to be reached by the logical inference system 52 (FIG. 16). The expected effects are observed. At this point, the ActionEnd 476 ConfirmedBy 562 Conditions 564 (FIG. 23) are satisfied and the Happening 472 enters the Confirmed state 676 (FIG. 25). Advantageously, the illustrated THAs enable the planning system 10 to be driven by events (e.g., as conditions are met), rather than waiting for certain clock values or ticks before acting.

For the execution of a plan 74, 94, both the amount of time spent in states and the observed values of relevant state variables may trigger transitions through the states in the THA. For example, the Happening 472 may enter a failure state, Failed 640 (FIG. 24), 696 (FIG. 25), if an observation is not made within a time threshold, or by observing values that fall outside an expected envelope.

With reference to FIG. 24, a Happening 472 denoting an ActionStart 474 (see also FIGS. 21-22) may pass through states corresponding to the Happening 472 being In Scope 628, 630 (e.g., awaiting satisfaction of authorizing conditions 520), being Authorized 636 (e.g., licensed to be Dispatched 644, 646), and being Done 648, 652 (e.g., the Happening 472 has been sent to an execution component, such as the execution and monitoring component 80, the plan execution system 56, and/or the like).

In embodiments, the THA 620 in FIG. 24 may track whether the states are entered early or late relative to expectation (e.g., for audit purposes) via, for example, times associated with the Happening 472, such as the time ("ExpectedStartTime") 500 associated with when the action 97 starts as illustrated in FIG. 22, the period of time ("ExpectedDuration") 502 between when the action 97 starts and when the action 97 ends, and/or the like. (A Happening 472 entering scope precisely on time may be arbitrarily treated as either entering scope early or late.) The states referred to are In Scope Early 628, In Scope Late 630, Dispatched Early 644, Dispatched Late 646, Done Early 648, and Done 652 (FIG. 24).

With reference to FIG. 25, a Happening 472 denoting an ActionEnd 476 (see also FIGS. 21 and 23) is managed slightly differently, because such Happenings 472 fall into two classes: Happenings 472 that are confirmed by observation, e.g. transitions 686 and 690, and Happenings 472 where there is an act required to terminate the action (authorizing conditions are met and the executive terminates the authorizing action), e.g. transitions 678 and 682.

In the examples of FIGS. 24 and 25, there is a further distinction between ActionStart 474 and ActionEnd 476 happenings: ActionStart 474 happenings may be completed without acknowledgement from the execution and monitoring component 80, while ActionEnd 476 happenings are completed with acknowledgement from the execution and monitoring component 80. This is because an ActionStart 474 happening may be monitored during execution, so if a dispatch signal was not received (e.g., from the dispatcher 96), the monitoring process may observe the lack of response. On the other hand, an ActionEnd 476 happening marks the conclusion of monitoring a corresponding action, 97, so it may be important to receive an acknowledgement or a timeout indication if the acknowledgement is not received within an appropriate interval.

The instantiation of relevant conditions that may be met to enter or exit a state 622, 662 (which may be referred to as "jump conditions"), the conditions that must hold while occupying a state 622, 662 (known as "state conditions"), and the flow of time ("flow conditions"), may be automatically populated by output of the planner component 44 using a domain model and the content of an operational file, which specify conditions that may be used during execution, such as timeout conditions or properties, which may bound how long the plan execution system 56 (FIG. 2) should wait for a dispatch signal before indicating failure.

With this in mind, and in more detail, FIG. 24 is a state diagram of a THA 620 that tracks states 622 of ActionStart 474 happenings in a plan 74, according to an embodiment of the present disclosure. In some embodiments, a processor 24 and/or a planner component 44 (see, e.g., FIGS. 1-2) may implement the THA 620. In additional embodiments, any other suitable component or control logic may implement the THA 620, for example the execution and monitoring component 80 or the goal arbitration component 114 (see, e.g., FIG. 3).

With reference to FIG. 24 and further to FIGS. 21-22, each ActionStart 474 happening may begin in a Dormant state 624 in the THA 620. An ActionStart 474 happening may enter scope once each Predecessor 522 (if any) of the ActionStart 474 happening has completed (e.g., entered a done state). "Entering scope" means that Conditions 520 associated with the ActionStart 474 happening are being monitored, for example by the inference system 52, to authorize the ActionStart 474 happening.

As illustrated, when the ActionStart 474 happening comes in scope early 626 (e.g., relative to expectation), the ActionStart 474 happening enters an In Scope Early state 628. When the ActionStart 474 happening comes in scope late 629 (e.g., relative to expectation), the ActionStart 474 happening enters an In Scope Late state 630. (A state entering scope precisely on time may be arbitrarily treated as either entering scope early or late.) In some instances, the ActionStart 474 happening in the In Scope Early state 628 may be delayed past an expected execution time 632, and, as such, may enter the In Scope Late state 630.

If conditions related to authorizing the ActionStart 474 happening are met 634, then the ActionStart 474 happening may enter an Authorized state 636 from either the In Scope Early state 628 or the In Scope Late state 630. Regardless of whether the ActionStart 474 happening is in the Dormant state 624, the In Scope Early state 628, the In Scope Late state 630, or the Authorized state 636, if a failure condition (e.g., such as a timeout condition being met) is detected 638, the ActionStart 474 happening enters a Failure state 640.

When the ActionStart 474 happening is in the Authorized state 636, the dispatcher 96 (FIG. 3) may dispatch the corresponding ActionStart 474. When the ActionStart 474 is dispatched and/or authorized early 642 (e.g., relative to an expected execution time), the ActionStart 474 happening enters a Dispatched Early state 644. When the ActionStart 474 is dispatched and/or authorized late 645 (e.g., relative to an expected execution time), the ActionStart 474 happening enters a Dispatched Late state 646. If the ActionStart 474 happening enters the Dispatched Early state 644 because it was authorized early 642, but is dispatched late 653 (e.g., relative to an expected execution time), then the ActionStart 474 happening enters the Dispatched Late state 646.

With continued reference to FIG. 24 and others above, the execution and monitoring component 80 (FIG. 3) may then acknowledge the ActionStart 474. If the ActionStart 474 happening is in the Dispatched Early state 644 and the execution and monitoring component 80 acknowledges the ActionStart 474 early 647 (e.g., relative to an expected execution time), then the ActionStart 474 happening enters a Done Early state 648. Otherwise, if the execution and monitoring component 80 acknowledges the ActionStart 474 late 650 (e.g., relative to an expected execution time), then the ActionStart 474 happening enters a Done state 652. (If the execution and monitoring component 80 acknowledges the ActionStart 474 precisely on time, then the ActionStart 474 happening may be arbitrarily treated as either being acknowledged early or late.)

As another example, FIG. 25 is a state diagram of a THA 660 that tracks states 662 of ActionEnd 476 happenings in a plan 74, according to an embodiment of the present disclosure. In some embodiments, a processor 24 and/or a planner component 44 (see, e.g., FIGS. 1-2) may implement the THA 660. In additional embodiments, any other suitable component or control logic may implement the THA 660, for example the execution and monitoring component 80 or the goal arbitration component 114 (see, e.g., FIG. 3).

Referring now to FIG. 25 with further reference to FIGS. 21 and 23, each ActionEnd 476 happening may begin in a Dormant state 664 in the THA 660. An ActionEnd 476 happening enters scope once the Happening 472 denoting the corresponding ActionStart 474 has completed (e.g., entered a Done state 652). As illustrated, when the ActionEnd 476 happening comes in scope early 666 (e.g., relative to an expectation), the ActionEnd 476 happening enters an In Scope Early state 668. When the ActionEnd 476 happening comes in scope late 669 (e.g., relative to an expectation), the ActionEnd 476 happening enters an In Scope Late state 670. (An ActionEnd 476 happening entering scope precisely on time may be arbitrarily treated as either entering scope early or late.) In some instances, the ActionEnd 476 happening in the In Scope Early state 668 may be delayed past an expected execution time 672, and, as such, may enter the In Scope Late state 670.

If effects that are expected to occur as a result of the Happening 472 are observed 674, then the ActionEnd 476 happening may enter a Confirmed state 676 from either the In Scope Early state 668 or the In Scope Late state 670. When the ActionEnd 476 happening is in the Confirmed state 676, the dispatcher 96 (FIG. 3) may dispatch the corresponding ActionEnd 476. When the ActionEnd 476 is dispatched and/or authorized early 678 (e.g., relative to an expected execution time), the ActionEnd 476 happening enters a Dispatched Early state 680. When the ActionEnd 476 is dispatched and/or authorized late 682 (e.g., relative to an expected execution time), the ActionEnd 476 happening enters a Dispatched Late state 684. If the ActionEnd 476 happening enters the Dispatched Early state 680 because it was authorized early 678, but is dispatched late 695 (e.g., relative to an expected execution time), then the ActionEnd 476 happening enters the Dispatched Late state 684.

The execution and monitoring component 80 may acknowledge the ActionEnd 476, for example, for actions that the planning system 10 does not intervene with but merely observes to completion. If the ActionEnd 476 happening is in the Confirmed state 676 or the Dispatched Early state 680, and the execution and monitoring component 80 acknowledges the ActionEnd 476 early 686 (e.g., relative to an expected execution time), then the ActionEnd 476 happening enters a Done Early state 688. Otherwise, if the execution and monitoring component 80 acknowledges the ActionEnd 476 late 690 (e.g., relative to an expected execution time), then the ActionEnd 476 happening enters a Done state 692. (If the execution and monitoring component 80 acknowledges the ActionEnd 476 precisely on time, then the ActionEnd 476 happening may be arbitrarily treated as either being acknowledged early or late.)

Regardless of whether the ActionEnd 476 happening is in the Dormant state 664, the In Scope Early state 668, the In Scope Late state 670, the Confirmed state 676, the Dispatched Early state 680, or the Dispatched Late state 684, if a failure condition (e.g., such as a timeout condition being met) is detected 694, the ActionEnd 476 happening enters a Failure state 696.

In this manner, the THA 620 of FIG. 24 and THA 660 of FIG. 25 may track states 622 of ActionStart 474 happenings and states 662 of ActionEnd 476 happenings in a plan 74.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment. Although the present disclosure has been described with respect to specific details, it is not intended that such details should be regarded as limitations on the scope of the present disclosure, except to the extent that they are included in the accompanying claims.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
  a first set of equipment;
  a second set of equipment; and
  a computing device communicatively coupled to the first and second sets of equipment, wherein the computing device comprises:
    one or more first components configured to control the first set of equipment to execute a plan based at least in part on a state of the system;
    one or more second components configured to control the second set of equipment to execute the plan based at least in part on the state of the system; and
    an inference system coupled to the one or more first components and the one or more second components, the inference system being configured to determine the state of the system based on sensor data received via one or more sensors on the first set of equipment, wherein the inference system comprises:
      a condition dispatcher configured to receive a request of a condition of the system from the one or more second components, the one or more second components being separate from the one or more first components;
      a query responder configured to determine a validity of the condition based at least in part on an evaluation of a rule associated with the condition, wherein the rule corresponds to the state of the system; and
      a rule evaluator configured to evaluate the rule to determine the validity of the condition based on whether one or more properties associated with the condition correspond to the state of the system, wherein the condition dispatcher is configured to transmit an indication associated with the validity of the condition to the one or more second components, and wherein the one or more second components are configured to receive the indication and, in response, control the second set of equipment based on the validity of the condition.

2. The system of claim 1, wherein the computing device comprises a data acquisition system coupled to the inference system and configured to acquire the sensor data from the one or more sensors on the first set of equipment.

3. The system of claim 2, wherein the inference system comprises a system state estimator configured to receive the sensor data from the data acquisition system and determine the state of the system based at least in part on the sensor data.

4. The system of claim 3, wherein the inference system comprises a literal state store configured to determine a state of a literal, wherein the literal comprises a positive or negative atomic propositional expression.

5. The system of claim 4, wherein the query responder is configured to determine the validity of the condition based at least in part on the state of the literal.

6. The system of claim 4, wherein the literal state store is configured to determine a duration of the state of the literal.

7. The system of claim 6, wherein the query responder is configured to determine the validity of the condition based at least in part on the duration of the state of the literal.

8. The system of claim 1, wherein the query responder is configured to determine a duration of the validity of the condition.

9. The system of claim 8, wherein the condition dispatcher is configured to authorize an action of the system based at least in part on the duration of the validity of the condition.

10. A method, comprising:
controlling, by one or more first components, a first set of equipment to execute a plan based at least in part on a state of the system, the one or more first components being coupled to an inference system being configured to determine the state of the system based on sensor data received via one or more sensors on the first set of equipment;
controlling, by one or more second components, a second set of equipment to execute the plan based at least in part on the state of the system, the one or more second components being coupled to the inference system;
receiving, by a condition dispatcher on the inference system, a request of a condition of the system from the one or more second components, the one or more second components being separate from the one or more first components;

determining, by a query responder on the inference system, a validity of the condition based at least in part on an evaluation of a rule associated with the condition, wherein the rule corresponds to the state of the system; and evaluating, by the rule configurator on the inference system, the rule to determine the validity of the condition based on whether one or more properties associated with the condition corresponds to the state of the system, and wherein the condition dispatcher is configured to transmit an indication associated with the validity of the condition to the one or more second components, and wherein the one or more second components are configured to receive the indication and, in response, control the second set of equipment based on the validity of the condition.

11. The method of claim 10, further comprising acquiring, by a data acquisition system coupled to the inference system, the sensor data from the one or more sensors on the first set of equipment.

12. The method of claim 11, further comprising:
receiving, by a system state estimator on the inference system, the sensor data from the data acquisition system; and
determining, by the system state estimator, the state of the system based at least in part on the sensor data.

13. The method of claim 12, wherein the inference system comprises a literal state store configured to determine a state of a literal, wherein the literal comprises a positive or negative atomic propositional expression.

14. The method of claim 13, wherein the query responder is configured to determine the validity of the condition based at least in part on the state of the literal.

15. The method of claim 13, wherein the literal state store is configured to determine a duration of the state of the literal.

16. The method of claim 15, wherein the query responder is configured to determine the validity of the condition based at least in part on the duration of the state of the literal.

17. The method of claim 10, wherein the query responder is configured to determine a duration of the validity of the condition.

18. The method of claim 17, wherein the condition dispatcher is configured to authorize an action of the system based at least in part on the duration of the validity of the condition.

\* \* \* \* \*